(12) United States Patent
Calzi et al.

(10) Patent No.: US 12,514,464 B2
(45) Date of Patent: Jan. 6, 2026

(54) SYSTEMS AND METHODS FOR LOCATING AND/OR CHARACTERIZING INTRAGASTRIC DEVICES

(71) Applicant: Reshape Lifesciences Inc., San Clemente, CA (US)

(72) Inventors: Federico Calzi, Encinitas, CA (US); Sheldon Nelson, Vista, CA (US); Mark C. Brister, Encinitas, CA (US)

(73) Assignee: RESHAPE LIFESCIENCES INC., Eden Prairie, MN (US)

( * ) Notice: Subject to any disclaimer, the term of this patent is extended or adjusted under 35 U.S.C. 154(b) by 0 days.

(21) Appl. No.: 17/366,947

(22) Filed: Jul. 2, 2021

(65) Prior Publication Data
US 2021/0401321 A1 Dec. 30, 2021

Related U.S. Application Data

(63) Continuation of application No. 16/030,702, filed on Jul. 9, 2018, now abandoned.

(60) Provisional application No. 62/644,310, filed on Mar. 16, 2018, provisional application No. 62/536,389, filed on Jul. 24, 2017.

(51) Int. Cl.
*A61B 5/06* (2006.01)
*A61B 5/07* (2006.01)
*A61F 5/00* (2006.01)
*A61B 5/00* (2006.01)
*A61M 25/10* (2013.01)

(52) U.S. Cl.
CPC ............ *A61B 5/062* (2013.01); *A61B 5/073* (2013.01); *A61F 5/003* (2013.01); *A61F 5/0036* (2013.01); *A61B 5/6853* (2013.01); *A61B 5/743* (2013.01); *A61M 25/10185* (2013.11); *A61M 2025/1088* (2013.01)

(58) Field of Classification Search
CPC ........ A61B 5/062; A61B 5/073; A61B 5/6853; A61B 5/743; A61B 5/6871; A61B 5/6861; A61F 5/003; A61F 5/0036; A61F 5/0046; A61F 2005/0016; A61M 25/10185; A61M 2025/1088
See application file for complete search history.

(56) References Cited

U.S. PATENT DOCUMENTS 2,183,900 A 12/1939 Voit et al.
3,788,322 A 1/1974 Michaels
(Continued)

FOREIGN PATENT DOCUMENTS

CN 101980673 2/2011
DE 3540936 10/1986
(Continued)

OTHER PUBLICATIONS

Al Kahtani et al., Aug. 28, 2008, Bio-Enteric Intragastric Balloon In Obese Patients: A Retrospective Analysis Of King Faisal Specialist Hospital Experience; Obesity Surgery, 8 pp.
(Continued)

*Primary Examiner* — Kaitlyn E Sebastian
(74) *Attorney, Agent, or Firm* — Knobbe, Martens, Olson & Bear LLP

(57) ABSTRACT

Devices and methods for treating obesity are provided. More particularly, intragastric devices and methods of tracking and locating the same are provided.

20 Claims, 12 Drawing Sheets

(56) References Cited

U.S. PATENT DOCUMENTS

| | | |
|---|---|---|
| 3,797,492 A | 3/1974 | Place |
| 4,133,315 A | 1/1979 | Berman et al. |
| 4,234,454 A | 11/1980 | Strope |
| 4,236,521 A | 12/1980 | Lauterjung |
| 4,246,893 A | 1/1981 | Berson |
| 4,340,626 A | 7/1982 | Rudy |
| 4,416,267 A | 11/1983 | Garren |
| 4,485,805 A | 12/1984 | Foster, Jr. |
| 4,489,440 A | 12/1984 | Chaoui |
| 4,517,979 A | 5/1985 | Pecenka |
| 4,545,367 A | 10/1985 | Tucci |
| 4,560,392 A | 12/1985 | Basevi |
| 4,607,618 A | 8/1986 | Angelchik |
| 4,694,827 A | 9/1987 | Weiner et al. |
| 4,718,639 A | 1/1988 | Sherwood et al. |
| 4,723,547 A | 2/1988 | Kullas et al. |
| 4,739,758 A | 4/1988 | Lai et al. |
| 4,748,562 A | 5/1988 | Miller et al. |
| 4,812,315 A | 3/1989 | Tarabishi |
| 4,813,934 A | 3/1989 | Engelson et al. |
| 4,819,637 A | 4/1989 | Dormandy et al. |
| 4,857,029 A | 8/1989 | Dierick et al. |
| 4,899,747 A | 2/1990 | Garren et al. |
| 4,917,885 A | 4/1990 | Chiba et al. |
| 4,925,446 A | 5/1990 | Garay et al. |
| 4,929,214 A | 5/1990 | Liebermann |
| 5,049,106 A | 9/1991 | Kim et al. |
| 5,084,061 A | 1/1992 | Gau et al. |
| 5,129,915 A | 7/1992 | Cantenys et al. |
| 5,234,454 A | 8/1993 | Bangs |
| 5,259,399 A | 11/1993 | Brown |
| 5,308,326 A | 5/1994 | Zimmon |
| 5,425,382 A | 6/1995 | Golden et al. |
| 5,431,917 A | 7/1995 | Yamamoto et al. |
| 5,622,169 A | 4/1997 | Golden et al. |
| 5,713,141 A | 2/1998 | Mitchell et al. |
| 5,728,119 A | 3/1998 | Smith et al. |
| 5,769,843 A | 6/1998 | Abela et al. |
| 5,852,889 A | 12/1998 | Rinaldi |
| 5,868,141 A | 2/1999 | Ellias |
| 5,879,297 A | 3/1999 | Haynor et al. |
| 5,897,205 A | 4/1999 | Sinsteden |
| 5,910,128 A | 6/1999 | Quinn |
| 5,948,227 A | 9/1999 | Dubrow |
| 6,042,710 A | 3/2000 | Dubrow |
| 6,129,668 A | 10/2000 | Haynor et al. |
| 6,216,028 B1 | 4/2001 | Haynor et al. |
| 6,263,230 B1 | 7/2001 | Haynor et al. |
| 6,427,089 B1 | 7/2002 | Knowlton |
| 6,454,785 B2 | 9/2002 | De Hoyos Garza |
| 6,579,301 B1 | 6/2003 | Bales et al. |
| 6,632,175 B1 | 10/2003 | Marshall |
| 6,682,473 B1 | 1/2004 | Matsuura et al. |
| 6,733,512 B2 | 5/2004 | McGhan et al. |
| 6,764,733 B1 | 7/2004 | Clarke |
| 6,981,980 B2 | 1/2006 | Sampson et al. |
| 6,988,983 B2 | 1/2006 | Connors et al. |
| 7,031,946 B1 | 4/2006 | Tamal et al. |
| 7,032,822 B2 | 4/2006 | Waters |
| 7,035,818 B1 | 4/2006 | Bandy et al. |
| 7,035,877 B2 | 4/2006 | Markham |
| 7,192,397 B2 | 3/2007 | Lewkowicz et al. |
| 7,682,306 B2 | 3/2010 | Shah |
| 7,699,863 B2 | 4/2010 | Marco et al. |
| 7,854,745 B2 | 12/2010 | Brister et al. |
| 8,083,757 B2 | 12/2011 | Gannoe et al. |
| 8,105,247 B2 | 1/2012 | Buchwald |
| 8,162,969 B2 | 4/2012 | Brister et al. |
| 8,202,291 B1 | 6/2012 | Brister et al. |
| 8,226,602 B2 | 7/2012 | Quijana et al. |
| 8,282,666 B2 | 10/2012 | Birk |
| 8,292,911 B2 | 10/2012 | Brister et al. |
| 8,428,691 B2 | 4/2013 | Byrd et al. |
| 8,491,464 B2 | 7/2013 | Yokoi et al. |
| 8,535,230 B2 | 9/2013 | Maschke |
| 8,562,589 B2 | 10/2013 | Imran |
| 8,647,358 B2 | 2/2014 | Brister et al. |
| 8,718,193 B2 | 5/2014 | Arne et al. |
| 8,721,620 B2 | 5/2014 | Imran |
| 8,734,429 B2 | 5/2014 | Imran et al. |
| 8,740,927 B2 | 6/2014 | Brister et al. |
| 8,809,269 B2 | 8/2014 | Imran |
| 8,809,271 B2 | 8/2014 | Imran |
| 8,836,513 B2 | 9/2014 | Hafezi et al. |
| 8,845,674 B2 | 9/2014 | Brister et al. |
| 8,847,766 B2 | 9/2014 | Zdeblick et al. |
| 8,858,432 B2 | 10/2014 | Robertson et al. |
| 8,870,966 B2 | 10/2014 | Schwab et al. |
| 8,992,561 B2 | 3/2015 | Brister et al. |
| 9,011,477 B2 | 4/2015 | Brister et al. |
| 9,072,583 B2 | 7/2015 | Brister et al. |
| 9,173,758 B2 | 11/2015 | Brister et al. |
| 9,351,862 B2 | 5/2016 | Brister et al. |
| 9,468,550 B2 | 10/2016 | Brister et al. |
| 9,539,132 B2 | 1/2017 | Brister et al. |
| 9,662,239 B2 | 5/2017 | Brister et al. |
| 9,827,128 B2 | 11/2017 | Brister et al. |
| 9,895,248 B2 | 2/2018 | Brister et al. |
| 10,085,865 B2 | 10/2018 | Brister et al. |
| 10,137,023 B2 | 11/2018 | Connor |
| 10,264,995 B2 | 4/2019 | Brister et al. |
| 10,327,936 B2 | 6/2019 | Brister et al. |
| 10,335,303 B2 | 7/2019 | Brister et al. |
| 10,350,100 B2 | 7/2019 | Nelson et al. |
| 10,463,520 B2 | 11/2019 | Brister et al. |
| 10,537,453 B2 | 1/2020 | Brister et al. |
| 10,610,396 B2 | 4/2020 | Brister et al. |
| 10,617,545 B2 | 4/2020 | Brister et al. |
| 10,660,778 B2 | 5/2020 | McCarthey et al. |
| 10,675,165 B2 | 6/2020 | Brister et al. |
| 10,709,592 B2 | 7/2020 | Brister et al. |
| 10,772,752 B2 | 9/2020 | Brister et al. |
| 10,773,061 B2 | 9/2020 | Brister et al. |
| 10,874,537 B2 | 12/2020 | Brister et al. |
| 11,219,543 B2 | 1/2022 | Brister |
| 11,730,619 B2 | 8/2023 | Brister et al. |
| 11,819,433 B2 | 11/2023 | Brister et al. |
| 12,090,075 B2 | 9/2024 | Brister |
| 12,102,547 B2 | 10/2024 | Brister |
| 2002/0198676 A1 | 12/2002 | Kirsch et al. |
| 2003/0021822 A1 | 1/2003 | Lloyd |
| 2003/0171768 A1 | 9/2003 | McGhan |
| 2004/0044351 A1 | 3/2004 | Searle |
| 2004/0102677 A1 | 5/2004 | Frering |
| 2004/0102696 A1 | 5/2004 | Govari |
| 2004/0133095 A1 | 7/2004 | Dunki-Jacobs et al. |
| 2004/0186502 A1 | 9/2004 | Sampson |
| 2005/0033331 A1 | 2/2005 | Burnett et al. |
| 2005/0124875 A1 | 6/2005 | Kawano |
| 2005/0131281 A1 | 6/2005 | Ayer et al. |
| 2005/0154284 A1 | 7/2005 | Wright |
| 2005/0192614 A1 | 9/2005 | Binmoeller |
| 2005/0222329 A1 | 10/2005 | Shah et al. |
| 2005/0245814 A1 | 11/2005 | Anderson et al. |
| 2005/0266109 A1 | 12/2005 | Chin et al. |
| 2005/0267405 A1 | 12/2005 | Shah |
| 2005/0267595 A1 | 12/2005 | Chen et al. |
| 2006/0058829 A1 | 3/2006 | Sampson et al. |
| 2006/0178691 A1 | 8/2006 | Binmoeller |
| 2006/0224145 A1 | 10/2006 | Gillis et al. |
| 2006/0247530 A1 | 11/2006 | Hardin et al. |
| 2007/0078476 A1 | 4/2007 | Hull et al. |
| 2007/0100208 A1 | 5/2007 | Lewkowicz et al. |
| 2007/0100367 A1 | 5/2007 | Quijano et al. |
| 2007/0100369 A1 | 5/2007 | Cragg et al. |
| 2007/0104754 A1 | 5/2007 | Sterling et al. |
| 2007/0104755 A1 | 5/2007 | Sterling et al. |
| 2007/0110934 A1 | 5/2007 | Goldman |
| 2007/0129735 A1 | 6/2007 | Filipi et al. |
| 2007/0149994 A1 | 6/2007 | Sosnowski et al. |
| 2007/0156248 A1 | 7/2007 | Marco et al. |
| 2007/0173881 A1 | 7/2007 | Birk et al. |
| 2007/0207199 A1 | 9/2007 | Sogin et al. |
| 2007/0212559 A1 | 9/2007 | Shah |

(56) References Cited

U.S. PATENT DOCUMENTS

| | | |
|---|---|---|
| 2007/0250101 A1 | 10/2007 | Horn et al. |
| 2007/0288033 A1 | 12/2007 | Murature et al. |
| 2007/0293885 A1 | 12/2007 | Binmoeller |
| 2008/0020037 A1 | 1/2008 | Robertson et al. |
| 2008/0051866 A1 | 2/2008 | Chen et al. |
| 2008/0172079 A1 | 7/2008 | Birk |
| 2008/0243071 A1 | 10/2008 | Quijano et al. |
| 2008/0255601 A1 | 10/2008 | Birk |
| 2008/0306506 A1 | 12/2008 | Leatherman et al. |
| 2009/0012372 A1 | 1/2009 | Burnett |
| 2009/0058575 A1 | 3/2009 | Pizzuto |
| 2009/0082644 A1 | 3/2009 | Li |
| 2009/0118756 A1 | 5/2009 | Valencon et al. |
| 2009/0131784 A1 | 5/2009 | Betesh |
| 2009/0182368 A1 | 7/2009 | Lunsford et al. |
| 2009/0182424 A1 | 7/2009 | Marco et al. |
| 2009/0187206 A1 | 7/2009 | Binmoeller et al. |
| 2009/0192535 A1 | 7/2009 | Kasic, II et al. |
| 2009/0222065 A1 | 9/2009 | Dlugos et al. |
| 2009/0259246 A1 | 10/2009 | Eskaros et al. |
| 2009/0299174 A1 | 12/2009 | Wright |
| 2010/0063530 A1 | 3/2010 | Valencon |
| 2010/0094116 A1 | 4/2010 | Silverstein |
| 2010/0100115 A1 | 4/2010 | Soetermans et al. |
| 2010/0100116 A1 | 4/2010 | Brister et al. |
| 2010/0100117 A1 | 4/2010 | Brister et al. |
| 2010/0106011 A1* | 4/2010 | Byrd ............... A61B 8/4263 600/424 |
| 2010/0137897 A1 | 6/2010 | Brister et al. |
| 2010/0168782 A1 | 7/2010 | Hancock |
| 2010/0198249 A1 | 8/2010 | Sabliere |
| 2010/0222802 A1 | 9/2010 | Gillespie et al. |
| 2011/0004059 A1* | 1/2011 | Arneson ............... A61B 1/0004 600/109 |
| 2011/0021881 A1 | 1/2011 | Wenchell et al. |
| 2011/0125007 A1 | 5/2011 | Steinberg et al. |
| 2011/0152639 A1 | 6/2011 | Matott |
| 2011/0184279 A1 | 7/2011 | Massonneau |
| 2011/0196411 A1 | 8/2011 | Forsell |
| 2011/0202127 A1 | 8/2011 | Mauch et al. |
| 2011/0295300 A1 | 12/2011 | Verd et al. |
| 2011/0301497 A1 | 12/2011 | Shachar et al. |
| 2012/0004540 A1 | 1/2012 | Liu et al. |
| 2012/0010590 A1 | 1/2012 | Imran |
| 2012/0071710 A1 | 3/2012 | Gazdzinski |
| 2012/0191123 A1 | 7/2012 | Brister et al. |
| 2012/0191124 A1 | 7/2012 | Brister et al. |
| 2012/0232576 A1 | 9/2012 | Brister et al. |
| 2012/0265234 A1 | 10/2012 | Brister et al. |
| 2012/0296365 A1 | 11/2012 | Nguyen |
| 2013/0012980 A1 | 1/2013 | Brister et al. |
| 2013/0032498 A1 | 2/2013 | Ouzts et al. |
| 2013/0165859 A1 | 6/2013 | Imran |
| 2013/0190796 A1 | 7/2013 | Tilson et al. |
| 2013/0211261 A1 | 8/2013 | Wang |
| 2013/0218190 A1 | 8/2013 | Gaur |
| 2013/0226219 A1 | 8/2013 | Brister et al. |
| 2013/0267983 A1 | 10/2013 | Pavlovic et al. |
| 2013/0281863 A1 | 10/2013 | Chiang |
| 2013/0289604 A1 | 10/2013 | Brister et al. |
| 2014/0066968 A1 | 3/2014 | Pavlovic et al. |
| 2014/0188151 A1 | 7/2014 | Gaur |
| 2014/0221912 A1 | 8/2014 | Imran |
| 2014/0221927 A1 | 8/2014 | Imran et al. |
| 2015/0008914 A1 | 1/2015 | Hartwig et al. |
| 2015/0196408 A1 | 7/2015 | Moss |
| 2015/0374525 A1 | 12/2015 | Brister et al. |
| 2016/0000356 A1* | 1/2016 | Brown ............... A61B 5/064 600/424 |
| 2016/0029998 A1* | 2/2016 | Brister ............... A61B 5/065 600/424 |
| 2016/0058322 A1 | 3/2016 | Brister et al. |
| 2016/0095731 A1 | 4/2016 | Connor |
| 2016/0193064 A1 | 7/2016 | Brister et al. |
| 2016/0256308 A1 | 9/2016 | Brister et al. |
| 2016/0310306 A1 | 10/2016 | Brister et al. |
| 2017/0027728 A1 | 2/2017 | Brister et al. |
| 2017/0290693 A1 | 10/2017 | Nelson et al. |
| 2018/0055575 A1* | 3/2018 | Krimsky ............... A61B 90/37 |
| 2018/0116849 A1 | 5/2018 | Brister et al. |
| 2018/0125690 A1 | 5/2018 | Brister et al. |
| 2018/0221633 A1 | 8/2018 | Brister et al. |
| 2019/0021629 A1 | 1/2019 | Calzi et al. |
| 2019/0298561 A1 | 10/2019 | Brister et al. |
| 2019/0365277 A1 | 12/2019 | Brister et al. |
| 2020/0100925 A1 | 4/2020 | Brister |
| 2020/0100926 A1 | 4/2020 | Brister et al. |
| 2020/0179147 A1 | 6/2020 | Brister |
| 2020/0237543 A1 | 7/2020 | McCarthy |
| 2020/0253767 A1 | 8/2020 | Brister |
| 2021/0196496 A1 | 7/2021 | Brister et al. |
| 2022/0031489 A1 | 2/2022 | Calzi |
| 2022/0105323 A1 | 4/2022 | Brister |
| 2022/0218505 A1 | 7/2022 | Brister et al. |
| 2022/0273479 A1 | 9/2022 | Brister |

FOREIGN PATENT DOCUMENTS

| | | |
|---|---|---|
| EP | 0 103 481 | 3/1984 |
| EP | 0 246 999 | 11/1987 |
| JP | 62-286470 | 12/1987 |
| JP | 10-230016 | 9/1998 |
| JP | 2004-073284 | 3/2004 |
| JP | 2007-500538 | 1/2007 |
| JP | 2008-178686 | 8/2008 |
| JP | 2009-519086 | 5/2009 |
| JP | 2011-509116 | 3/2011 |
| JP | 2011-510740 | 4/2011 |
| WO | WO 87/00034 | 1/1987 |
| WO | WO 99/25418 | 5/1999 |
| WO | WO 01/068007 | 9/2001 |
| WO | WO 02/016001 | 2/2002 |
| WO | WO 02/040081 | 5/2002 |
| WO | WO 02/091961 | 11/2002 |
| WO | WO 03/055420 | 7/2003 |
| WO | WO 04/045374 | 6/2004 |
| WO | WO 04/084763 | 10/2004 |
| WO | WO 04/091361 | 10/2004 |
| WO | WO 06/020929 | 2/2006 |
| WO | WO 06/116718 | 11/2006 |
| WO | WO 07/053556 | 5/2007 |
| WO | WO 07/074445 | 7/2007 |
| WO | WO 07/136735 | 11/2007 |
| WO | WO 08/052136 | 5/2008 |
| WO | WO 09/055386 | 4/2009 |
| WO | WO 09/059803 | 5/2009 |
| WO | WO 09/086119 | 7/2009 |
| WO | WO 10/045477 | 4/2010 |
| WO | WO 10/045482 | 4/2010 |
| WO | WO 10/097774 | 8/2010 |
| WO | WO 11/136745 | 11/2011 |
| WO | WO 12/099610 | 7/2012 |
| WO | WO 13/120184 | 8/2013 |
| WO | WO 14/081725 | 5/2014 |
| WO | WO 16/187456 | 11/2016 |

OTHER PUBLICATIONS

Almeida et al., 2008, Capsule endoscopy assisted by traditional upper endoscopy Revista Española De Enfermedades Digestivas, 100(12):758-763.

Al-Momen et al., 2005, Intragastric Balloon For Obesity: A Retrospective Evaluation Of Tolerance And Efficacy, Obesity Surgery, 15(1):101-105.

Ambe et al., 2012, Swallowed Foreign Bodies in Adults Dtsch Arztebl Int, 109(50):869-875.

Bar-Shalom et al., 1988, Tracking And Data Association, Academic Press, Inc., Boston.

Benjamin et al., Sep. 1988, Double-Blind Controlled Trial of the Garren-Edwards Gastric Bubble: An Adjunctive Treatment for Exogenous Obesity, Gastroenterology, 95(3):581-588.

(56) References Cited

OTHER PUBLICATIONS

Carvalho et al., 2008, An Improved Intragastric Balloon Procedure Using A New Balloon: Preliminary Analysis Of Safety And Efficacy, Obesity Surgery, 6 pp.
Coskun et al., Sep. 2008, Bioenterics Intragastric Balloon: Clinical Outcomes Of The First 100 Patients—A Turkish Experience, Obesity Surgery, 18(9):1154-1156.
Dastis et al., Jul. 2008, Intragastric Balloon For Weight Loss: Results In 100 Individuals Followed For At Least 2.5 Years; Endoscopy, 41(7):575-580.
De Waele et al., Apr. 2001, Endoscopic Volume Adjustment Of Intragastric Balloons For Intolerance, Obesity Surgery, 11(2):223-224.
Doldi et al., 2002, Treatment Of Morbid Obesity With Intragastric Balloon In Association With Diet; Obesity Surgery, 12(4):583-587.
Dumonceau, Dec. 2008, Evidence-Based Review Of The Bioenterics Intragastric Balloon For Weight Loss, Obesity Surgery, 18(12):1611-1617.
Durrans et al., 1989, Comparison Of Weight Loss With Short Term Dietary And Intragastric Balloon Treatment; Gut, 30:565-568.
Eckhauser et al., 1984, Hydrostatic Balloon Dilation for Stomal Stenosis after Gastric Partitioning, Surgical Gastroenterology, 3(1):43-50.
Evans et al., 2001, Intragastric Balloon In The Treatment Of Patients With Morbid Obesity, British Journal of Surgery, 88:1245-1248.
Fernandes et al., Jan. 24, 2007, Intragastric Balloon For Obesity (Review), The Cochrane Collaboration, John Wiley & Sons, Ltd., Issue 1, 57 pp.
Forestieri et al., May 2006, Heliosphere Bag In The Treatment Of Severe Obesity: Preliminary Experience, Obesity Surgery, 16(5):635-637.
Gaggiotti et al., 2007, Adjustable Totally Implanted Intragastric Prosthesis (ATIIP). Endogast For Treatment Of Morbid Obesity: One Year Follow-Up Of A Multicenter Prospective Clinical Survey; Obesity Surgery, 17:949-956.
Geliebter et al., 1990, Gastric balloon to treat obesity: a double-blind study in nondieting subjects, The American Journal of Clinical Nutrition, 51:584-588.
Genco et al., Jan. 2006, Bioenterics Intragastric Balloon (BIB): A Short-Term, Double-Blind, Randomized, Controlled, Crossover Study On Weight Reduction In Morbidly Obese Patients, International Journal of Obesity, 30(1):129-133.
Genco et al., 2005, Bioenterics Intragastric Balloon: The Italian Experience With 2,515 Patients; Obesity Surgery, 15(8):1161-1164.
Genco et al., 2008, Intragastric Balloon Or Diet Alone? A Retrospective Evaluation, Obesity Surgery, 18(8):989-992.
Genco et al., 2009, Laparoscopic Sleeve Gastrectomy Versus Intragastric Balloon: A Case-Control Study, Surg Endosc. Springer Science & Business Media, 4 pp.
Gottig et al., Jun. 2009, Analysis Of Safety And Efficacy Of Intragastric Balloon In Extremely Obese Patients, Obesity Surgery, 19(6):677-683.
Imaz et al., Jul. 2008, Safety And Effectiveness Of The Intragastric Balloon For Obesity. A Meta-Analysis; Obesity Surgery; 18(7):841-846.
Langer, Apr. 30, 1998, Drug delivery and targeting, Nature, 392 Supp(6679):5-10.
Mackay, 2.9. Power Sources, in Bio-Medical Telemetry: Sensing and Transmitting Biological Information from Animals and Man, 2d ed., IEEE Press, New York, 1993, pp. 62-70.
Malik, 2006, Endoluminal And Transluminal Surgery: Current Status And Future Possibilities; Surgical Endoscopy, 20(8):1179-1192.
Martin et al., Jul. 2007, Safety of the Ullorex Oral Intragastric Balloon for the Treatment of Obesity, Journal of Diabetic Science and Technology, 1(4):574-581.

Mathus-Vliegen et al., Aug. 1990, Intragastric Ballon in the Treatment of Super-morbid Obesity—Double-Blind, Sham-Controlled, Crossover Evaluation of 500-Milliliter Balloon, Gastroenterology, 99(2):362-369.
Melissas et al., 2006, The Intragastric Balloon—Smoothing The Path To Bariatric Surgery, Obesity Surgery, 16:897-902.
Mion et al., Jul. 2007, Tolerance And Efficacy Of An Air-Filled Balloon In Non-Morbidly Obese Patients: Results Of A Prospective Multicenter Study; Obesity Surgery, 17(7):764-769.
Nieben et al., Jan. 1982, Ingtragastric Balloon as an Artificial Bezoar for Treatment of Obesity, The Lancet, 1(8265):198-199.
Ramhamadany et al, 1989, Effect Of The Gastric Balloon Versus Sham Procedure On Weight Loss In Obese Subjects; Gut, 30:1054-1057.
Remington's Pharmaceutical Sciences, Mace Publishing Company, Philadelphia, Pa., 17th ed. (1985).
Rodriguez-Hermosa et al., 2009, Gastric Necrosis: A Possible Complication Of The Use Of The Intragastric Balloon In A Patient Previously Submitted To Nissen Fundoplication; Obesity Surgery, 19:1456-1459.
Roman et al., Apr. 2004, Intragastric Balloon For "Non-Morbid" Obesity: A Retrospective Evaluation Of Tolerance And Efficacy; Obesity Surgery, 14(4):539-544.
Sallet et al., Aug. 2004, Brazilian Multicenter Study of the Intragastric Balloon, Obesity Surgery, 14(7):991-998.
Sherlock II Tip Location System, Bard Access Systems, Imaging Technologies http://www.bardaccess.com/loc-sherlock.php, 1 p.
Torres et al., 2009, Management of contact dermatitis due to nickel allergy: an update, Clinical, Cosmetic and Investigational Dermatology, 2:39-48.
Totte et al., Aug. 2001, Weight Reduction By Means Of Intragastric Device: Experience With The Bioenterics Intragastric Balloon, Obesity Surgery, 11(4):519-523.
Trande et al., Dec. 2008, Efficacy, Tolerance And Safety Of New Intragastric Air-Filled Balloon (Heliosphere BAG) For Obesity: The Experience Of 17 Cases; Obesity Surgery, 4 pp.
U.S. Food and Drug Administration. Jul. 29, 2009. 510(k) substantial equivalence clearance, Given PillCam Platform with PillCam SB Capsules with PillCam SensorBelt http://www.accessdata.fda.gov/scripts/cdrh/cfdocs/cfpmn/pmn.cfm?id=k091405, 2 pp.
U.S. Food and Drug Administration. Jun. 2, 2006. 510(k) substantial equivalence clearance, Sherlock tip location system (TLS) detector and accessories. http://www.accessdata.fda.gov/scripts/cdrh/cfdocs/cfpmn/pmn.cfm?id=k061240, 2 pp.
U.S. Food and Drug Administration. Sep. 7, 2000. 510(k) substantial equivalence clearance, Zotran Detector. http://www.accessdata.fda.gov/scripts/cdrh/cfdocs/cfpmn/pmn.cfm?id=k000997, 2 pp.
Välean et al., Jun. 2005, Pill Esophagitis: Two Cases Reports Romanian Journal of Gastroenterology, 14(2):159-163.
VanSonnenberg et al., Aug. 1984, Percutaneous Gastrostomy: Use of Intragastric Ballon Support, Radiology, 152(2):531-532.
Vijaysadan et al., Sep.-Oct. 2006, Revisiting Swallowed Troubles: Intestinal Complications Caused by Two Magnets—A Case Report, Review and Proposed Revision to the Algorithm for the Management of Foreign Body Ingestion, JABFM, 19(5):511-516.
Wahlen et al., 2001, The Bioenterics Intragastric Balloon (BIB): How To Use It; Obesity Surgery, 11(4):524-527.
Yoshihisa et al., 2012, Metal Allergy and Systemic Contact Dermatitis: An Overview Dermatology Research and Practice, 2012:1-5, Article ID 749561.
U.S. Appl. No. 60/866,581, filed Nov. 20, 2006, titled: "In-Vivo Transmission Decoder".
U.S. Appl. No. 60/889,868, filed Feb. 14, 2007, titled: "Pharma Informatics System Power Source".
U.S. Appl. No. 60/889,871, filed Feb. 14, 2007, titled: "Pharma Informatics System Having Short Resistant Series Battery".
International Search Report and Written Opinion dated Oct. 1, 2018 in PCT/US18/41296.

\* cited by examiner

SYSTEMS AND METHODS FOR LOCATING AND/OR CHARACTERIZING INTRAGASTRIC DEVICES

INCORPORATION BY REFERENCE TO RELATED APPLICATIONS

Any and all priority claims identified in the Application Data Sheet, or any correction thereto, are hereby incorporated by reference under 37 CFR 1.57. This application is a continuation of U.S. application Ser. No. 16/030,702, filed Jul. 9, 2018, which claims priority to U.S. Application No. 62/536,389, filed Jul. 24, 2017, and U.S. Application No. 62/644,310, filed Mar. 16, 2018. Each of the aforementioned applications is incorporated by reference herein in its entirety, and each is hereby expressly made a part of this specification.

FIELD OF THE INVENTION

Devices and methods for treating obesity are provided. More particularly, devices and methods of deploying, inflating, locating, tracking, and monitoring the same are provided.

BACKGROUND

Obesity is a major health problem in developed countries. Obesity puts you at greater risk of developing high blood pressure, diabetes and many other serious health problems. In the United States, the complications of being overweight or obese are estimated to affect nearly one in three American adults, with an annual medical cost of over $80 billion and, including indirect costs such as lost wages, a total annual economic cost of over $120 billion. Except for rare pathological conditions, weight gain is directly correlated to overeating.

On noninvasive method for reducing weight includes treatment with inflatable intragastric balloons, which occupy space within the stomach and thereby provide the patient a feeling of satiety after having eaten only small amounts of food. Thus, the caloric intake is diminished while the person is satisfied with a feeling of fullness. Proper timing of inflation of an intragastric balloon is a factor in successful deployment of the intragastric devices of various embodiments. Timing must be selected to avoid premature inflation in the esophagus that could lead to an esophageal obstruction or belated inflation that could lead to intestinal obstruction.

Methods, for verifying that the intragastric device is in the stomach, are useful in that they do not rely on mere timing after administration of the intragastric device. Verification of location can be done with radiography. After a patient swallows an encapsulated balloon, radiography can be done to ensure the balloon is in the stomach after swallowing, with the encapsulated balloon visualized by a radio-opaque marker. Radiographic techniques include x-ray or fluoroscopy techniques that provide real-time images of the balloon using radiation. However, radiation may be harmful to the body if prolonged or administered in high doses. While fluoroscopy typically uses low doses of radiation, repeated use may create a risk of harm to a patient. Further, there is the risk of accidental administration of too high of a dose to a patient. It is not unusual for x-ray and fluoroscopy images of the intragastric balloon marker in the stomach to be unclear and difficult to interpret. Inability to correctly determine if a swallowed intragastric balloon is located in the stomach increases the risk of accidentally inflating the balloon in a constrained space, such as the esophagus, and subsequent patient injury. Injuries due to inflation of a balloon in the esophagus can be severe and even lead to death of the patient.

SUMMARY

There remains a need for a device and method of locating and characterizing in vivo an intragastric volume-occupying device in real time that has capabilities beyond the prior art and that avoids one or more of the aforementioned drawbacks.

Non-invasive systems and methods for accurately tracking and locating swallowed intragastric devices in three dimensional space and in real time are provided, and may be employed for treating over weight and obese individuals.

In a preferred embodiment, the intragastric device employs a delivery state in which the intragastric device is packaged such that the device may be swallowed by normal peristalsis while producing minimal discomfort to the patient. In the delivery state, the intragastric device may be packaged into a capsule or coated with a material operable to confine the intragastric device and facilitate swallowing. The intragastric device is releasably attached to an inflation catheter for inflating the intragastric device after it has been delivered to the stomach.

In some embodiments, the intragastric device or an attached catheter incorporates a tracking or visualization component that enables users to determine the location and/or orientation of the intragastric device within the patient's body using electromagnetic methods. The intragastric device may be tracked and located using such an electromagnetic energy sensor that is incorporated into the intragastric device or the attached catheter. Such techniques may also be used to obtain certain device-specific information and specifications while the intragastric device remains inside the patient's body, e.g., in vivo, including but not limited to intragastric device location and orientation as it travels inside the body. This information can then be interpreted to identify the intragastric device's location and orientation in 3-dimensional space while still inside the body. An electromagnetic system provides a simple, non-invasive and less harmful method of tracking, locating and characterizing in vivo intragastric devices.

In a first aspect, a system is provided for electromagnetically locating an intragastric device in three dimensional space, in real time. The system includes an electromagnetic field generator, a removably attachable inductive reference sensor, a swallowable target sensor, a processor, and a display. The electromagnetic field generator is configured to generate an electromagnetic field. The reference sensor is adapted to be removably attached to a body that is positioned within the electromagnetic field generated by the electromagnetic field generator. When the reference sensor is positioned within the electromagnetic field, a reference sensor signal is generated. The reference sensor signal carries reference sensor position information that is associated with the position of the reference sensor within the electromagnetic field at an instance in time. The swallowable target sensor is also adapted to be positioned within the electromagnetic field, and thereby generate a target sensor signal. The target sensor signal carries target sensor position information that is associated with the position of the target sensor within the electromagnetic field at the instance in time. The processor is adapted to be in electronic communication with the reference sensor and the target sensor, so as to receive the reference sensor signal and the target sensor signal. The processor processes the reference sensor signal so as to create one or more reference indicia associated with the position of the reference sensor at the instance in time, and the processor processes the target sensor signal so as to create one or more target indicia associated with the position of the target sensor at the instance in time. The display is adapted to be in electronic communication with the processor and configured to display the one or more reference indicia and the one or more target indicia.

In an embodiment of the first aspect, the instance in time is a plurality of instances in time. In a further embodiment, the processor iteratively processes the received reference sensor signal information, which is associated with the plurality of instances in time, so as to generate a first series of indicia associated with each of the plurality of instances in time; the processor iteratively processes the received target sensor position information associated with the plurality of instances in time, so as to generate a second series of indicia associated with each of the plurality of instances in time; and the display displays the first series of indicia and the second series of indicia.

In another embodiment of the first aspect, the one or more reference indicia and/or the one or more target indicia includes at least one of a graphical representation associated with the body, and a reference sensor icon.

In another embodiment of the first aspect, the position of the target sensor inside the body is the stomach.

In yet another embodiment of the first aspect, the system for electromagnetically locating an intragastric device in three dimensional space, in real time, includes a swallowable intragastric device that includes the target sensor. In a further embodiment, when the target sensor is swallowed, the target sensor position information is associated with the locations of the target sensor at each of the plurality of instances in time. In another further embodiment, the swallowable intragastric device includes a swallowable inflatable intragastric balloon and an inflation catheter. In yet another further embodiment, the swallowable intragastric device includes an inflation catheter, and a distal end of the inflation catheter includes the target sensor.

In another embodiment of the first aspect, the swallowable intragastric device includes an intragastric balloon. In a further embodiment, intragastric balloon includes a polymeric wall, a valve system and an initial fill gas. The polymeric wall has one or more layers, is configured to have, under in vivo conditions, a permeability to $CO_2$ of more than 10 $cc/m^2/day$, and is also configured such that, in vivo, the balloon gains in volume and in pressure during its useful life when filled with the initial fill gas. The valve system is configured for introducing an initial fill gas into the balloon in vivo. The initial fill gas consists of one or more inert gasses that are selected from the group consisting of nitrogen, $SF_6$, $C_2F_6$, $C_3F_8$, $C_4F_{10}$, $C_4F_8$, $C_4F_8$, $C_3F_6$, $CF_4$, and $C(ClF_2)$—$CF_3$.

In a second aspect, a method for electromagnetically locating an intragastric device inside the body of a patient is provided. The method includes the steps of placing a reference sensor on a fixed location on a surface of a patient's body and then positioning a target sensor on the patient's body. The reference sensor is configured to sense an electromagnetic field directed at the body of the patient, and also to produce a reference sensor signal in response to the sensed electromagnetic field, wherein the reference sensor signal is associated with the reference sensor location. The target sensor is configured to sense the electromagnetic field, and also to produce a target sensor signal in response to the sensed electromagnetic field, wherein the target sensor signal is associated with a plurality of target sensor locations along the path. The method also includes the steps of creating one or more indicia by processing the signals associated with the locations of the reference and target sensors using a processor. Then, an intragastric device is introduced into the body of the patient, via swallowing, wherein the target sensor is releasably coupled with the intragastric device. Next, a target sensor signal is produced; wherein the target sensor signal is associated with a plurality of intragastric device locations within the patient's body. Then the location of the intragastric device inside the patient's body is confirmed, based on the signal associated with the plurality of intragastric device locations within the patient's body. And then, the one or more indicia and an icon indicative of a current location of the intragastric device is displayed on a display.

In an embodiment of the second aspect, the one or more indicia includes at least one of a graphical representation associated with the patient's body, and a reference sensor icon.

In another embodiment of the second aspect, confirming the location of the intragastric device inside the patient's body further includes at least one step of: on a display, observing the one or more target sensor indicia offsetting left of lateral from an initial vertical track; observing the track suddenly accelerating left of lateral; observing rotation of the one or more target sensor indicia rotating from a vertical configuration to a horizontal configuration; and observing vertical movement of the one or more target sensor indicia upon patient deep respiration.

In yet another embodiment of the second aspect, the location of the intragastric device inside the patient's body is the patient's stomach.

In yet another embodiment of the second aspect, when the icon is displayed in a position relative to the one or more indicia, wherein the displayed position is indicative of the intragastric device being in the patient's stomach, the method includes introducing an initial fill fluid into a lumen of the intragastric device through a releasable fluidly coupled catheter, whereby the intragastric device is inflated. Inflating the intragastric device is followed with the step of exposing the inflated intragastric device to the in vivo intragastric environment for a useful life of at least 30 days.

In a further embodiment, the polymeric wall of the inflated intragastric device in the in vivo gastric environment has a permeability to $CO_2$ of more than 10 $cc/m^2/day$, and has a three layer $CO_2$ barrier material that includes a nylon layer, a polyvinylidene chloride layer, and a polyethylene layer.

In another further embodiment, the polymeric wall of the inflated intragastric device in the in vivo gastric environment has a permeability to $CO_2$ of more than 10 $cc/m^2/day$, and has a three layer $CO_2$ barrier material that includes a nylon layer, an ethylene vinyl alcohol layer, and a polyethylene layer.

In yet another further embodiment, the polymeric wall of the inflated intragastric device in the in vivo gastric environment has a permeability to $CO_2$ of more than 10 $cc/m^2/day$, and includes a two layer $CO_2$ barrier material that has a nylon layer and a polyethylene layer.

In still another further embodiment, the polymeric wall of the inflated intragastric device in the in vivo gastric environment has a permeability to $CO_2$ of more than 10 $cc/m^2/day$, and includes a $CO_2$ barrier material with an ethylene vinyl alcohol layer.

In yet another embodiment of the second aspect, the initial fill fluid comprises $SF_6$ in one or more of liquid form, vapor form, or gaseous form. In a further embodiment, the initial fill fluid comprises gaseous $N_2$ and gaseous $SF_6$.

In another further embodiment, the polymeric wall of the inflated intragastric device has, under conditions of an in vivo gastric environment, a permeability to $CO_2$ of more than 50 cc/m²/day.

In yet another further embodiment, the target sensor is coupled with the catheter.

DETAILED DESCRIPTION

Figure 1:
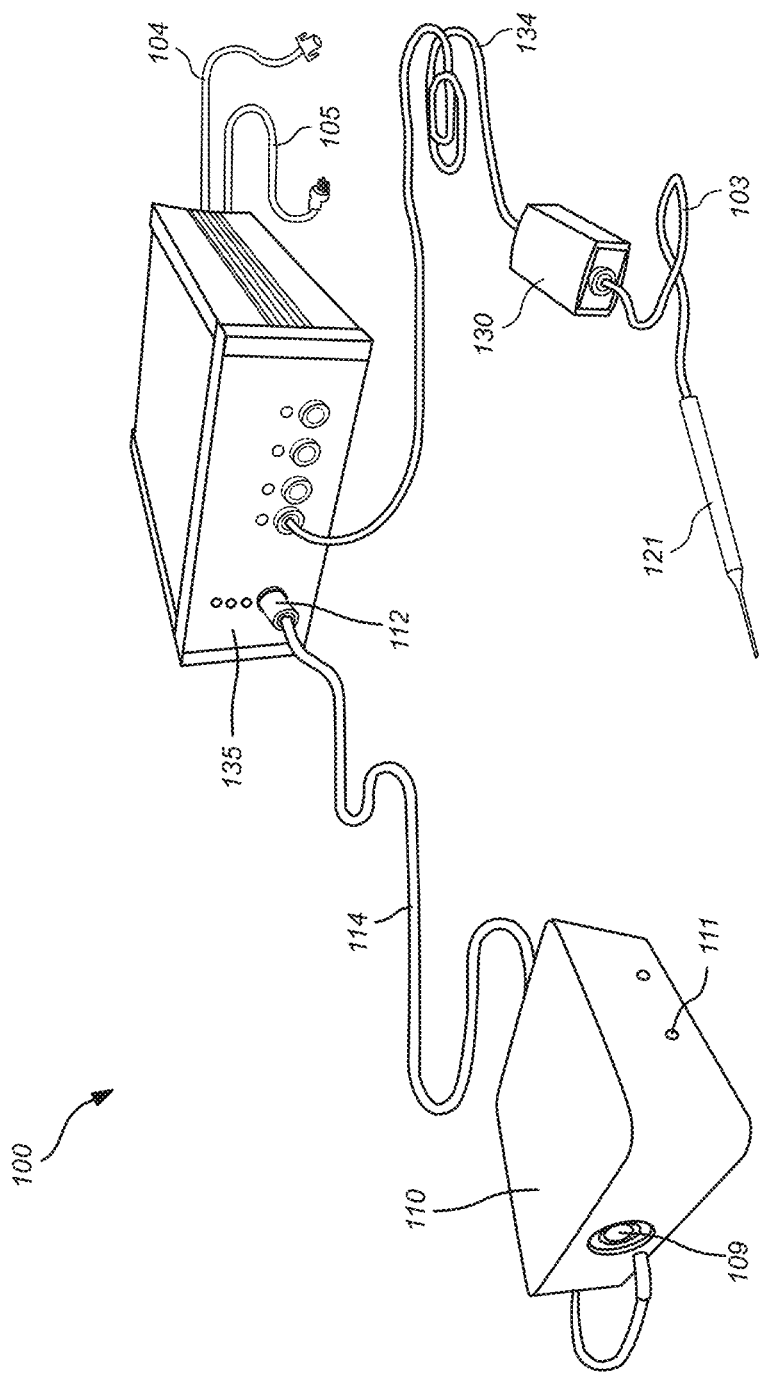
FIG. 1 depicts an embodiment of an electromagnetic tracking system 100 for locating a sensor 121.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

The term "degradable" as used herein is a broad term, and is to be given its ordinary and customary meaning to a person of ordinary skill in the art (and is not to be limited to a special or customized meaning), and refers without limitation to a process by which structural integrity of the intragastric device, e.g., balloon, is compromised (e.g., by chemical, mechanical, or other means (e.g., light, radiation, heat, etc.) such that deflation occurs. The degradation process can include erosion, dissolution, separation, digestion, disintegration, delamination, comminution, and other such processes. Degradation after a predetermined time, or within a predetermined window of time, after ingestion is particularly preferred.

The term "in vivo" as used herein is a broad term, and is to be given its ordinary and customary meaning to a person of ordinary skill in the art (and is not to be limited to a special or customized meaning), and refers without limitation to the state of being located within a patient's body, such as but not limited to within the alimentary canal or portions thereof.

The term "ex vivo" as used herein is a broad term, and is to be given its ordinary and customary meaning to a person of ordinary skill in the art (and is not to be limited to a special or customized meaning), and refers without limitation to the state of being located outside a patient's body, such as but not limited to contacting or near the patient's skin.

The term "$CO_2$ barrier material" as used herein is a broad term, and is to be given its ordinary and customary meaning to a person of ordinary skill in the art (and is not to be limited to a special or customized meaning), and refers without limitation to a material having a permeability to $CO_2$ of 10 cc/m$^2$/day or less under simulated in vivo conditions (100% humidity and body temperature of 37° C.). As used herein, the term "in vivo conditions" as used herein refers to both actual in vivo conditions, such as in vivo intragastric conditions, and simulated in vivo conditions. The permeability of a material to $CO_2$ may vary depending upon the conditions under which it is measured.

The term "swallowable" as used herein is a broad term, and is to be given its ordinary and customary meaning to a person of ordinary skill in the art (and is not to be limited to a special or customized meaning), and refers without limitation to ingestion of an intragastric device by a patient such that the outer capsule and its constituents are delivered to the stomach via normal peristalsis movement. While the systems of preferred embodiments are swallowable, they are also configured by ingestion by methods other than swallowing. The system may be self-inflating or manually inflated. For self-inflating systems, the swallowability of the system is derived, at least in part, by the outer container size. For the self-inflating system, the outer capsule is sufficient to contain the inner container and its constituents, an amount of activation agent injected prior to administration, the intragastric device size, and the intragastric device material thickness, such as is described elsewhere herein. For manually inflated systems, the swallowability of the system is derived, at least in part, by the catheter and outer container size. The system is preferably of a size less than the average normal esophagus internal diameter, which is approximately three quarters of an inch (2 cm) in an adult.

The term "target sensor" as used herein is a broad term, and is to be given its ordinary and customary meaning to a person of ordinary skill in the art (and is not to be limited to a special or customized meaning), and refers without limitation a sensor that is associated with or included with an intragastric device, and is therefore swallowed with the intragastric device. Once swallowed, the target sensor becomes an in vivo sensor. The target sensor is mobile.

The term "reference sensor" as used herein is a broad term, and is to be given its ordinary and customary meaning to a person of ordinary skill in the art (and is not to be limited to a special or customized meaning), and refers without limitation a sensor that is placed on or adjacent to the outside of the body, and therefore is ex vivo. The reference sensor is stationary with respect to the patient's body. The system uses the reference sensor for orientation with respect to the patient's body and the electromagnetic field. The reference sensor may be placed directly on the patient's skin, or on a garment that is worn by the patient holds the reference sensor stationary on the patient's body.

In certain embodiments, the terms "non-mobile" and "stationary" may be used interchangeably and can be used with respect to the reference sensor, which is affixed to the patient's body and therefore does not move independently of the patient's body. In certain embodiments, the term "mobile" is used with respect to the target sensor, and means that the target sensor may move or be moved in three-dimensional space.

Described herein is a system for an orally ingestible device with electromagnetic locating, tracking, and/or otherwise sensing of the device or state of the device. In preferred embodiments, the device can traverse the alimentary canal. The device may be useful, for example, as an intragastric volume-occupying device. The device overcomes one or more of the above-described problems and shortcomings found in current intragastric volume-occupying devices. While in certain embodiments specific devices are described, it is understood that the materials and methods can also be applied to other devices.

In order to more clearly describe the subject matter of the preferred embodiments, different embodiments of the same subcomponent will be described under a single relevantly-titled subheading. This organization is not intended to limit the manner in which embodiments of different subcomponents may be combined in accordance with the present invention. The various subcomponents for use in the presently disclosed electromagnetic systems may be discussed under their respective subheaded sections or in any other section, including any section or sections discussing various tracking and visualization subcomponents.

System for Determining the Location of an Intragastric Device During Swallowing With reference to FIGS. 1-16, systems and methods are provided for locating a free-floating or tethered intragastric volume occupying device (e.g., "intragastric device" or "balloon") within the human body, in real time, by using a system of 6-degrees of freedom (6 DOF) sensors and/or 5-degrees of freedom (5 DOF) sensors. The system of the preferred embodiments uses an EM field, instead of X-ray, to aid the user in deciding whether or not a swallowed balloon is located in the stomach, where the balloon can be safely inflated. Radiographic data can be confusing and difficult to interpret, thereby making it difficult to accurately identify a swallowed balloon's location within the body, which may lead to accidental inflation of the balloon in a constrained space, such as the esophagus, and resulting patient injury. Advantageously, the system of the embodiments is simple to use and provides clear and accurate results. Accordingly, patient safety is improved by reducing user error (e.g., when determining when the balloon has been successfully swallowed, or if the balloon is in the stomach or is constrained in the esophagus), while simultaneously reducing the amount of radiation to which the patient is exposed.

In particular, the system of the embodiments enables the physician, who is administering an encapsulated intragastric balloon to a patient, to determine when it is safe to inflate the balloon, by monitoring the progress of the swallowed capsule (e.g., containing the balloon) as it passes down the patient's esophagus, through the gastroesophageal junction ("GE junction"), and then into the stomach, all in real-time. If the physician begins inflating the balloon while it is still in the patient's esophagus, the patient will be severely injured and may even die. However, if the physician begins balloon inflation only after the balloon is located in the patient's stomach, no patient injury should occur, thereby enabling the procedure to be completed quickly, so that the patient may go home. Since many medical facilities lack convenient or easy access to x-ray equipment, replacing x-ray location of the swallowed balloon with the present system for pre-inflation tracking and locating the swallowed balloon facilitates improved patient access to obesity treatment with swallowable, inflatable intragastric balloons.

Electromagnetic Tracking

In certain embodiments, an electromagnetic tracking technology as is commercially available is employed. Suitable systems include, but are not limited to, the Sherlock* II Tip Location System as manufactured by Bard Access Systems of Salt Lake City, UT, or the Aurora Electromagnetic Tracking System manufactured by NDI Medical, Inc. of Ontario, Canada.

In some embodiments, a catheter is adapted to integrate the Aurora System sensors by situating the sensors inside the catheter. In other embodiments, the sensors may be situated in other components of the system, such as the balloon or intragastric device, or other features as described herein. The compatible NDI Aurora System Hardware components allow for tracking of the sensors placed inside the swallowable catheter using real time electromagnetic tracking system that delivers sub-millimetric, sub-degree accuracy. The software was modified to make the graphic user interface appropriate for GE use and detection of the capsule in the alimentary canal.

FIG. 1 depicts an embodiment of an electromagnetic tracking system 100 for locating a sensor 121. The system 100 includes a field generator 110, a system control unit 135, the sensor interface unit 130, and a catheter 103 having a distal sensor 121. In the embodiment shown, the field generator 110 generates an electromagnetic field ("EM field"). The field generator 110 may include one or more mounting holes 111, which allow the field generator 110 to be mounted to a wall, support, or other attachments. A field generator connector 112 connects a field generator cable 114 to the system control unit 135.

As shown, the field generator 110 may be planar. A planar field generator 110 emits a low-intensity, varying EM field and establishes the position of a tracking volume. The planar field generator 110 contains a number of large coils (not shown) that generate known EM fields. The field generator 110 produces a series of varying magnetic fields, creating a known volume of varying magnetic flux. This volume is referred to as the characterized measurement volume. The shape of the characterized measurement volume is dependent on the field generator type and how it was characterized. The characterized measurement volume is the volume where data was collected and used to characterize the field generator 110. It is a subset of the detection region. The detection region is the total volume in which the field generator can detect a sensor, regardless of accuracy. The measurement volumes for the generated magnetic fields are discussed in further detail herein, for example with respect to FIG. 5. The volume is projected outwards from the field generator's 110 front face, offset by 50 mm from the field generator 110.

Figure 3A:
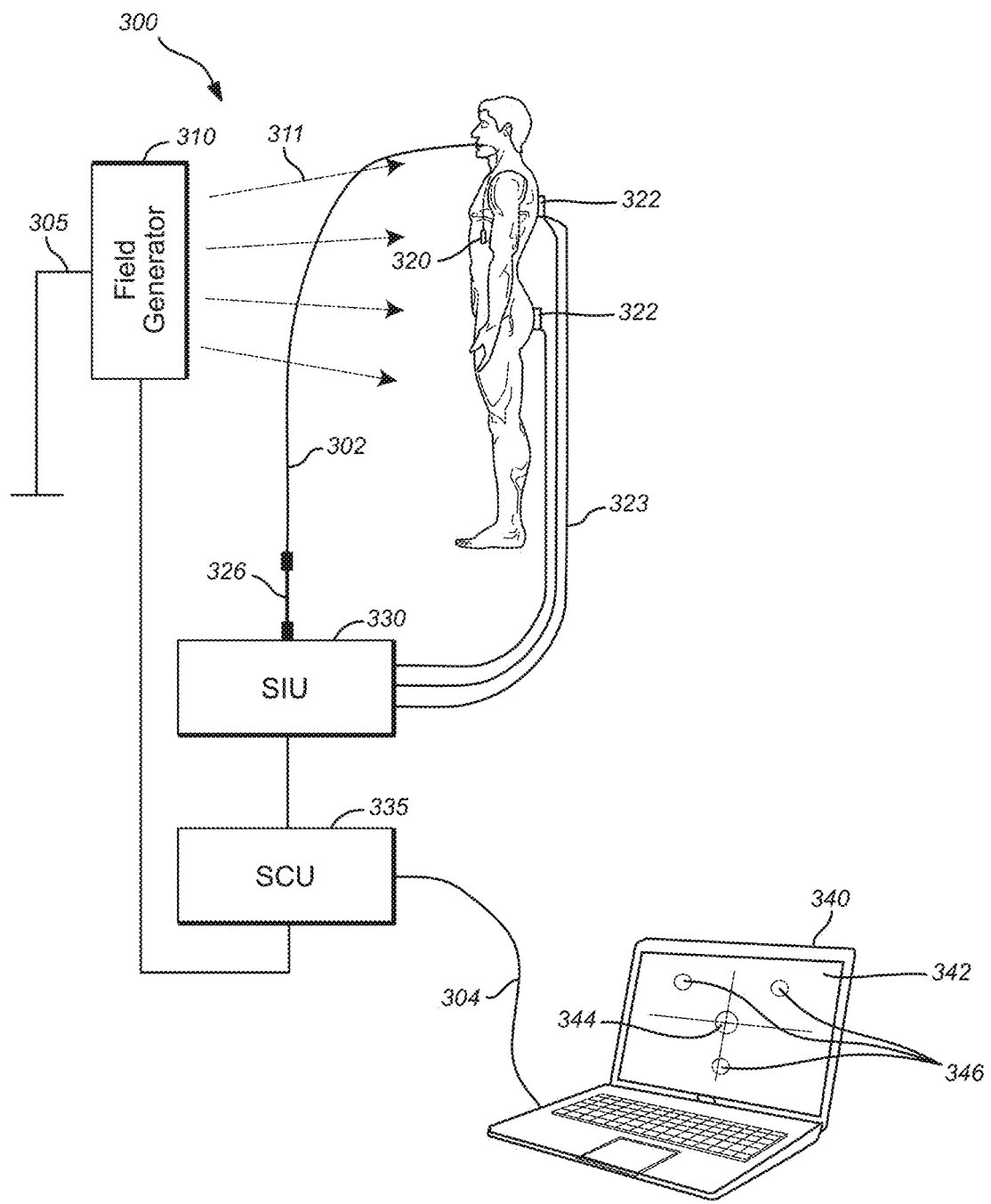
FIG. 3A depicts an embodiment of an electromagnetic tracking system 300 for using a sensor 320 to locate an intragastric device inside the body of a human patient.
Figure 3B:
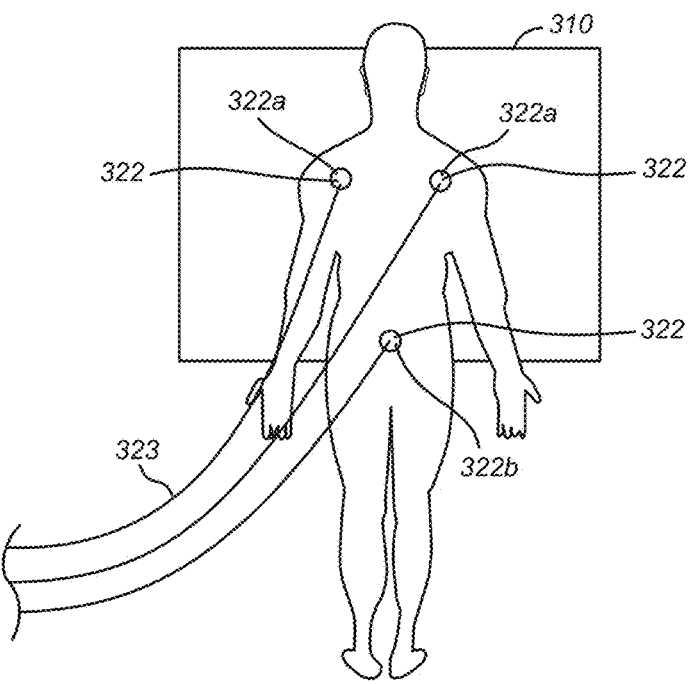
FIG. 3B is a rear view of the patient of FIG. 3A showing an embodiment of external reference sensors 322 for an anatomical frame of reference.
Figure 3C:
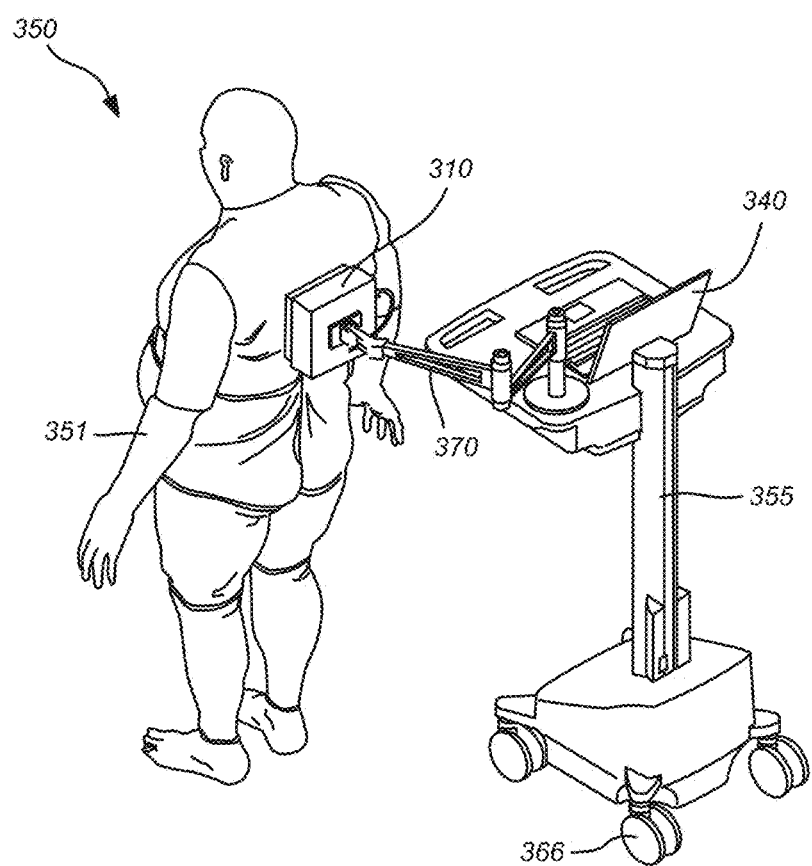
FIG. 3C depicts an embodiment of an electromagnetic tracking system 350 on a support 355 that uses a sensor to locate an intragastric device inside the body 351 of a human patient.

The planar field generator 110 may have a mounting point 109 designed to attach the field generator 110 to a mounting arm, as shown in FIG. 3C. Alternatively, the field generator 110 may be a tabletop field generator (not shown).

The field generator 110 is connected to the system control unit 135. The field generator 110 may be connected to the system control unit 135 by the cable 114 allowing for communication of signals therebetween. The system control unit 135 is connected to the sensor interface unit 130. The system control unit 135 may be connected to the sensor interface unit 130 by a cable 134. There may be more than one system interface unit 130 connected to the system control unit 135 via multiple cables 134. The cables 134 allow for electronic communication of signals between the system control unit 135 and the one or more sensor interface units 130. The system control unit 135 may include one or more cables 104, 105 for connecting to a power source and/or other electronic equipment.

The system control unit 135 may control the operation of the system 100. In some embodiments, the system control unit 135 provides an interface between components of the system 100. The system control unit 135 may also supply power to the field generator 110 and/or control the field generator's 110 electromagnetic output. The system control unit 135 may also collect sensor data (via the sensor interface unit 130) and calculate sensor positions and orientations, such as is described below. The system control unit 135 then sends the position and orientation data to a host computer (see FIG. 2). Therefore, the system control unit 135 may also interface with the computer. The system control unit 135 may also provide visual status indications.

The sensor interface unit 130 is connected to the catheter 103. The catheter 103 includes a sensor 121 at its distal end. In some embodiments, the sensor 121 may be integrated with an intragastric device. The sensor 121 is an electromagnetic sensor. The sensor 121, which may be embedded in tools, is connected to the system control unit 135 via the one or more sensor interface units 130. If the electromagnetic sensor 121 is placed inside the measurement volume, the varying magnetic fields produced by the field generator 110 will cause a voltage to be induced in the sensors 121. The characteristics of the induced voltage depend on a combination of the sensor 121 position and orientation in the measurement volume, and the strength and phase of the varying magnetic fields.

Figure 2:
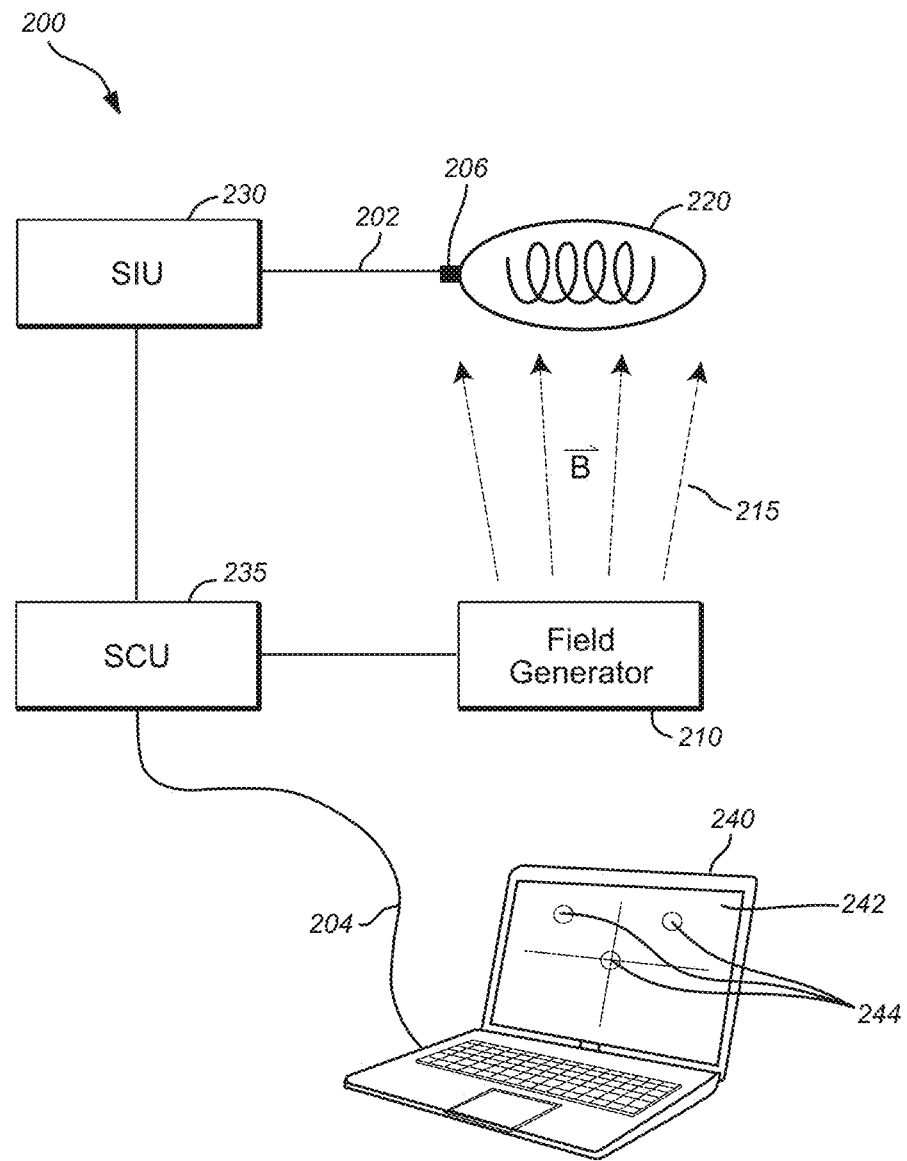
FIG. 2 depicts an embodiment of an electromagnetic tracking system 200 that uses a sensor 206 for locating an intragastric device 220.

FIG. 2 depicts an embodiment of an electromagnetic tracking system 200 with an electromagnetic sensor 206 for locating an intragastric device 220. The system 200 includes the intragastric device 220 (e.g., and intragastric balloon attached to an inflation catheter 202) coupled with a catheter 202 that includes one or more sensors 206. The system 200 further includes the sensor interface unit 230, the system control unit 235 and the field generator 210 in electrical communication with a computer 240.

As shown, the system 200 includes an intragastric device 220 that is non-toxic, does not cause sensitization, and is non-irritating. The intragastric device 220 may be any of the balloons or other intragastric devices as described herein.

The intragastric device 220 is connected to a catheter 202. The catheter 202 includes the electromagnetic sensor 206 at the distal end of the catheter 202 near the intragastric device 220. In some embodiments, the sensor 206 may be embedded with other features of the system 200, such as an intermediate connector between the catheter 202 and the intragastric device 220. The catheter 202 may be a small 2 Fr diameter catheter. The catheter 202 may include the sensor 206 as one or more small inductive sensors. In addition, external reference sensors (see FIG. 3A, 322) may be placed on the patient, such as on the skin or held there by a band around the patient's body or a garment worn by the patient. The external reference sensors are intended to provide an anatomical frame of reference between the field generator 210 and the patient. The catheter sensors 206 will provide location data as they travel through the esophagus across the GE junction and into the stomach. Data collected by the reference sensors and the catheter sensors 206 are then displayed on a laptop computer 240. The electromagnetic sensor 206 can be characterized for five or six degrees of freedom.

The catheter 202 is connected to a sensor interface unit 230. In some embodiments, the catheter 202 is connected directly to the sensor interface unit 230. In other embodiments, the catheter 202 is connected indirectly to the sensor interface unit 230 via an intermediate jumper cable. The sensor interface unit 230 amplifies and digitizes the electrical signals from the sensor 206. The sensor interface units 230 also provide an increased distance between the system control unit 235 and sensor 206, while minimizing the potential for data noise.

The system 200 includes the system control unit 235. The system control unit 235 is connected to the system interface unit 230 by a cable allowing for electrical communication therebetween. The system control unit 235 collects information from the system interface unit 230 and calculates the position and orientation of each sensor 206 and interfaces with the computer 240.

The system control unit 235 is connected to the field generator 210 by a cable allowing electrical communication therebetween. The field generator 210 generates a magnetic field 215, also denoted by $\bar{B}$. The magnetic field 215 encompasses the intragastric device 220 and the sensor 206 located near the intragastric device 220 in the catheter 202.

The interaction of the magnetic field 215 with the sensor 206 creates an electrical signal that is detected and transmitted to the system interface unit 230, which transmits a signal to the system control unit 235, which transmits a signal to the computer 240.

The computer 240 is connected to the system control unit 235 by a cable 204. The cable 204 allows for electronic communication between the computer 240 and the system control unit 235. The computer 240 includes a display 242. The display 242 shows identifiers, indicia or icons 244. The identifiers 244 indicate the locations of the various sensors located with the intragastric device 220 and the catheter 202. As shown, there are multiple identifiers 244 corresponding to the location of the sensor 206 on the intragastric device 220 as well as the location of other reference anatomical sensors, discussed in further herein, for example with respect to FIG. 3A

The system 200 can power on and detect the presence, motion, and changes in orientation of the catheter sensor 206. In some embodiments, the sensor 206 is detected when placed at a range of 30 cm from the center point of the field generator 210. In some embodiments, the range of detection for the sensor 206 is greater than 45 cm at the center point of the field generator 210. In some embodiments, the system 200 can locate with the distal sensor 206 the two lower corners of the field generator 210 within a ±2 cm boundary in the X-direction when placed at a range of 30 cm from the center point of the field generator 210.

FIG. 3A depicts an embodiment of an electromagnetic tracking system 300 for using a sensor to locate an intragastric device 320 inside the body of a human patient. The system 300 includes a field generator 310 mounted on a support 305. The support 305 may be a supporting structure formed from metal, plastic or other suitable materials. The support 305 may be adjustable in order to adjust the location of the field generator 310 relative to the location of a patient. In some embodiments, the support 305 can move up and down to accommodate varying heights of patients. In this manner, the field generator 310 may be positioned so that a magnetic field 311 is generated on a region of interest, for example the patient's upper body and abdomen.

As shown, the patient may stand in front of the field generator 310, which may be the field generator 210. The patient has ingested the intragastric device 320, which may be the intragastric device 220, and is now inside the patient's body. The intragastric device 320 is connected to a catheter 302, which may be the catheter 202. The catheter 302 includes the electromagnetic sensor (not shown) at its distal end and located near the intragastric device 320. Therefore, the field generator 310 will generate a magnetic field 311 that interacts with the electromagnetic sensor. The electromagnetic sensor is in electrical communication with a sensor interface unit 330, which may be the sensor interface unit 235. Electrical communication is provided by wiring connected to the sensor that extends through the catheter 302 to the sensor interface unit 330. Electrical signals generated by the electromagnetic sensor due to the presence of the magnetic field 311 are transmitted to the sensor interface unit 330.

The system 300 also includes external anatomical reference sensors 322. The external reference sensors 322 may provide an anatomical frame of reference between the field generator 310 and the patient. Small inductive currents are generated by the sensors 322 while they are inside the tracking volume. As illustrated, three anatomical reference sensors 322 are included but only two are shown in FIG. 3A. In some embodiments, there may be more or fewer than three anatomical reference sensors 322. The sensors 322 are connected to the sensor interface unit 330 by electronic cables 323. The sensors 322 are responsive to the magnetic field 311 generated by the field generator 310. In the presence of the magnetic field, the sensors 322 generate a current or other signal that is transmitted to the sensor interface unit 330.

The system 200 also includes a jumper cable 326. The jumper cable 326 contains a static read only memory ("SROM") chip which provides electrical continuity from the catheter 302 to the sensor interface unit 330. The jumper cable 326 may provide a connector gender changer to prevent misconnection between the sensor interface unit 330 and the catheter 302.

The system control unit 335 is connected to the computer 340 by a cable 304. The cable 304 allows for electronic communication between the system control unit 335 and the computer 340. The computer includes a display 342. The display 342 shows the location of a sensor identifier 344 as well as the locations of three anatomical identifiers 346. The sensor identifier 344 indicates the location of the sensor and the distal end of the catheter 302. The anatomical identifiers 346 indicate the locations of the anatomical reference sensors 322.

The anatomical reference sensors 322 are fixed on the patient (see FIG. 3B) and provide a frame of reference by which to locate the electromagnetic sensor. By having a fixed and known location, the anatomical reference sensors 322 may be used to accurately locate the electromagnetic sensor, and thus the intragastric device 320. The locations of the reference sensors 322 shows up on the display 342 as anatomical identifiers 346 while the electromagnetic sensor shows up on the display 342 as the sensor identifier 344. By knowing the location of the sensors 322 on the patient's body, and the relative location of the sensor identifier 344 relative to the anatomical identifier 346, the location of the electromagnetic sensor, and thus of the intragastric device 320, inside the body can be determined.

The computer 340, which may be a laptop computer, contains a system specific software program designed to provide the end user with a "real time" display of the catheter's 302 location, as well as the location of the reference sensors 322. The system 300 may be calibrated prior to each use. The sensor takes a background measurement of the ambient magnetic field during a calibration cycle and when the catheter 302 is brought within range, the sensor detects the change in the magnetic field and communicates the data to the software program residing in the computer 340. The software analyses the data and presents the location of the various sensors on the computer display 342. In some embodiments, no or little magnetic energy is generated by the sensor or the computer 340.

The intragastric device 320 is administered via a patient swallow of the balloon capsule that is adhered or attached to the swallowable catheter 302. The administration of the catheter can be done while visualizing the catheter 302 as it traverses the esophagus past the GE junction into the stomach. Instructions for use (not shown) may be provided with the system 300. The instructions may provide information on how to administer the catheter 302, what the patient should expect during and after administration, and how to retrieve the catheter 302 after completion of the procedure.

The intragastric device 320 connected to the catheter 302 is designed to be swallowed and tracked by the various sensors as it traverses to the stomach past the GE junction. The device 320 is designed to start outer capsule separation after being swallowed. In some embodiments, the device 320 starts outer capsule separation after being swallowed in approximately 2 minutes. Full placement and removal of the catheter 302 may take approximately 10 minutes for each swallow procedure. In some embodiments, patients may swallow three catheters, and therefore the total time of the swallow procedure for these subjects is approximately 30 minutes. After completion of each swallow procedure, the catheter 302 is removed by simply pulling it back through the mouth.

The system 300 may be controlled using an application program interface (API) (not shown). The API is a set of commands that allow configuration and requesting information from the system 300. The system 300 may return information only when requested by the computer 340. In some embodiments, the system 300 may return information automatically, for instance at set intervals or continuously.

When the system 300 is tracking the device 320, it returns information about the sensors to the computer 340. The system 300 may return the position of each sensor's origin, given in mm, in the coordinate system of the field generator 310. The system 300 may return the orientation of each sensor 320, given in quaternion format. The quaternion values are rounded off, so the returned values may not be normalized. The system 300 may return an error indicator value, between 0 and 9.9 (where 0 is the absence of error and 9.9 is the highest indication of error). The system 300 may return the status of each sensor, indicating whether the sensor 320 is out of the EM field volume, partially out of the volume, or missing. The system 300 may return the frame number for each sensor transformation. The frame counter starts as soon as the system 300 is powered on, and can be reset using API commands. The frame number returned with a transformation corresponds to the frame in which the data used to calculate that transformation was collected. The system 300 may return the system 300 status, which may include system errors.

The various sensors 320, 322 may be five degrees of freedom (5 DOF) or six degrees of freedom (6 DOF) sensors. Five degrees of freedom provides information on the three translation values on the x-, y- and z-axes and any two of the three rotation values—roll, pitch and yaw. Six degrees of freedom provides information on the three translation values on the x-, y- and z-axes and the three rotation values roll, pitch and yaw. In embodiments with only one sensor incorporated, the rotation around the sensor's longitudinal axis cannot be determined. As such, only five degrees of freedom (5 DOF) can be determined for single sensor embodiments. For example, the amount that a needle physically rolls is not as important as where it is pointing and where the tip is located. As such, a needle can be a 5 DOF tool, with only one sensor incorporated into its design.

In embodiments that incorporate two sensors fixed relative to each other and ideally orthogonal, the system 300 can determine six degrees of freedom (6 DOF). First, the system 300 determines 5 DOF information for each sensor. Next, the system 300 combines and compares this information, applies the fixed location data, and determines six degrees of freedom (6 DOF).

The field generator 310 may use a coordinate system with the origin located approximately on the surface of the field generator 310. This global coordinate system may be defined during manufacture. The system 301 may report the transformations in the global coordinate system. However, in some embodiments that use a reference tool (not shown), software can calculate and report transformations in the local coordinate system of the reference tool.

Each sensor 320, 322 has its own local coordinate system that is defined by an origin and three axes. Local coordinate systems are part of the measurement process. In some embodiments, there may be a single sensor. The single sensor's local coordinate system is based directly on that of the sensor. By default, the system 300 assigns the z-axis along the sensor's length, with an origin at the sensor's center. It is possible to move the origin along the z-axis. The x and y axes are not fixed, due to the inability to determine rotation about the z-axis.

In some embodiments, there may be dual sensors having 5 DOF. A dual 5 DOF sensor is essentially two single sensors joined to the same sensor body connector. As such, the sensor actually has two local coordinate systems, each based on one of the sensors incorporated into its design. These local coordinate systems are determined in the same way as that of a single sensor.

FIG. 3B is a rear view of the patient from system 200 shown in FIG. 3A. As shown in FIG. 3B, the patient has three external anatomical reference sensors 322 attached to the backside of the patient. The sensors 322 are arranged in a generally triangular configuration. In some embodiments, the sensors 322 may be arranged in different configurations, such as rectangular, circular, or others. The sensors 322 are connected by the cable 323 to other components of the system 300, such as the sensor interface unit 330. In some embodiments, the sensors 322 may be wirelessly connected to other components of the system 301. As further shown, the patient is standing directly in front of the field generator 310. In some embodiments, the patient need not be standing directly in front of the generator 310.

FIG. 3C depicts an embodiment of an electromagnetic tracking system 350 that includes a support 355 and that uses a sensor (not shown) to locate an intragastric device (not shown) inside the body of a human patient 351. The system 350 includes the patient 351 standing in front of a field generator 310, which may be the field generators 110, 210 described herein. The field generator 310 is coupled with an arm 370 that is adjustable. The arm 370 may be adjusted such that the field generator 310 is located next to the patient 351. The arm 370 may also adjust the field generator 310 such that it produces a magnetic field in the vicinity of the patient's 351 stomach. The arm 370 may adjust the field generator 310 vertically as well as horizontally. The arm 370 can also rotate the field generator 310, for example to accommodate patients who are lying down.

The system 350 includes the support 355 which supports a computer 340. The support 355 is adjustable in the vertical direction. In some embodiments, the support 355 may be adjustable in other directions, for example it may adjust in the horizontal direction, rotate, etc. The support 355 includes a surface upon which the computer 340 and other components of the system 350 may be placed or mounted. The support 355 also includes four wheels 366 that allow the support 355 to be rolled around. In some embodiments, the support 355 may include fewer or more than four wheels 366.

The support 355 may be designed to avoid tipping over. In some embodiments, the support 355 may withstand a 10° incline from a horizontal plane in any X or Y direction without tipping over. In some embodiments, the support 355 may withstand a load equal to 25% of total weight in any X or Y direction without tipping over.

Figure 4:
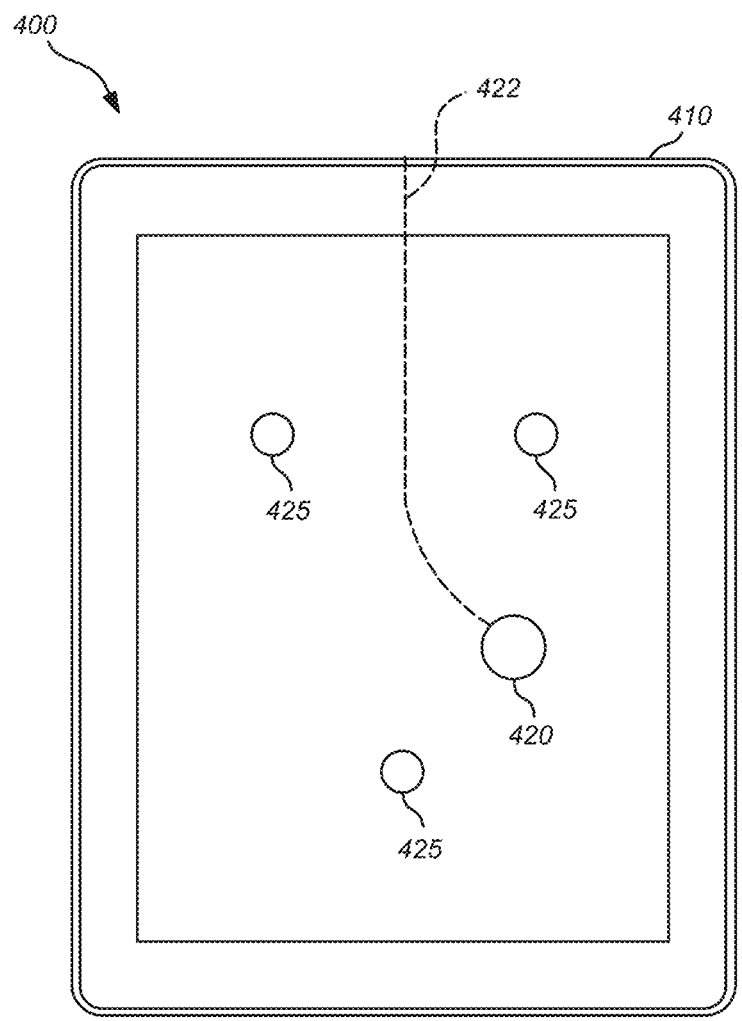
FIG. 4 depicts an embodiment of a display 400 that can be used with the systems of FIGS. 2-3C.

FIG. 4 depicts an embodiment of a display 400 that can be used with the systems of FIGS. 2-3C. The display 400 includes a screen 410. The screen 410 displays the locations of the various identifiers corresponding to the various sensors. The screen 410 may be a display on a computer. The screen 410 may also be on a variety of other machines.

As shown, the display 400 includes the locations of the identifiers 420 and 425. The identifier 420 corresponds to the location of the sensor coupled with the catheter. For example, the identifier 420 may correspond to the location of the electromagnetic sensor 206 and the catheter 202. The identifier 420 may also correspond to the location of the sensor coupled with the intragastric device 320 and the catheter 302.

The display 400 may also include a trace 422. The trace 422 may indicate the path that the identifier 420 has traveled over time. Therefore, the trace 422 may indicate the path that the sensor has travelled inside the patient's body. As shown, the trace 422 may have a vertical section followed by a bend near the bottom of the trace 422 as illustrated. In some embodiments, the bend in the trace 422 is indicative of the path of a sensor traveling through the GE junction into the stomach of a patient. Therefore, the path of the trace 422 may be indicative of the location of the sensor and therefore of the intragastric device.

The identifiers 425 may correspond to the locations of external anatomical reference sensors. For example, the identifiers 425 may correspond to the locations of the three anatomical reference sensors 322. As shown, the identifiers 425 form a generally triangular shape. This may correspond, for example, to a generally triangular configuration of the sensors 322 located on the back of the patient. By knowing the location of the identifiers 425 relative to the patient, and the relative location of the identifier 425 relative to the identifiers of 425, the location of the sensor and therefore the intragastric device inside the body may be determined. As shown in FIG. 4, the location of the identifier 420 may be indicative of an intragastric device being success successfully placed inside the stomach. The display 400 shown is merely one example and other suitable displays may be implemented. In some embodiments, the screen 410 may include markings or other reference points to facilitate locating the various identifiers.

Figure 5:
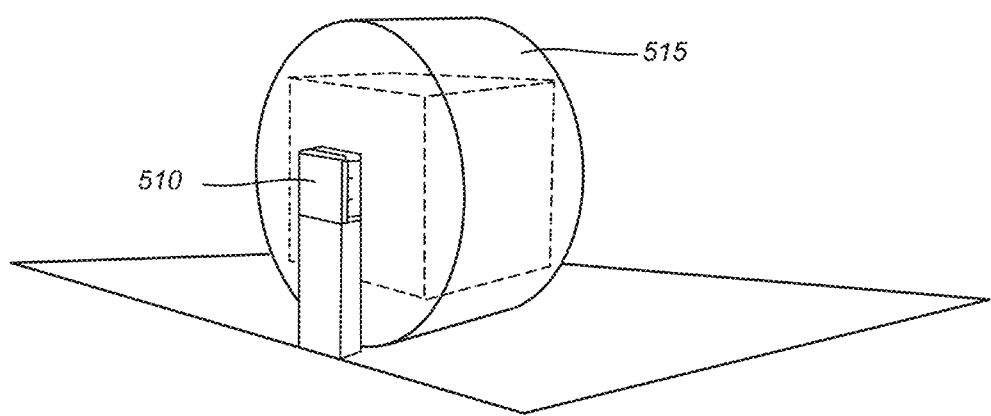
FIG. 5 depicts an embodiment a field generator 510 and corresponding magnetic field envelope 515 that may be used with the systems of FIGS. 1-3C.

FIG. 5 depicts an embodiment a field generator 510 and corresponding magnetic field envelope 515 that may be used with the systems of FIGS. 2-3C. The envelope 515 represents the volume in which the sensors may interact with the generated magnetic field from the field generator 510. The envelope 515 is shown in a generally cylindrical shape. In some embodiments, the envelope 515 may have a variety of shapes.

Figure 6A:
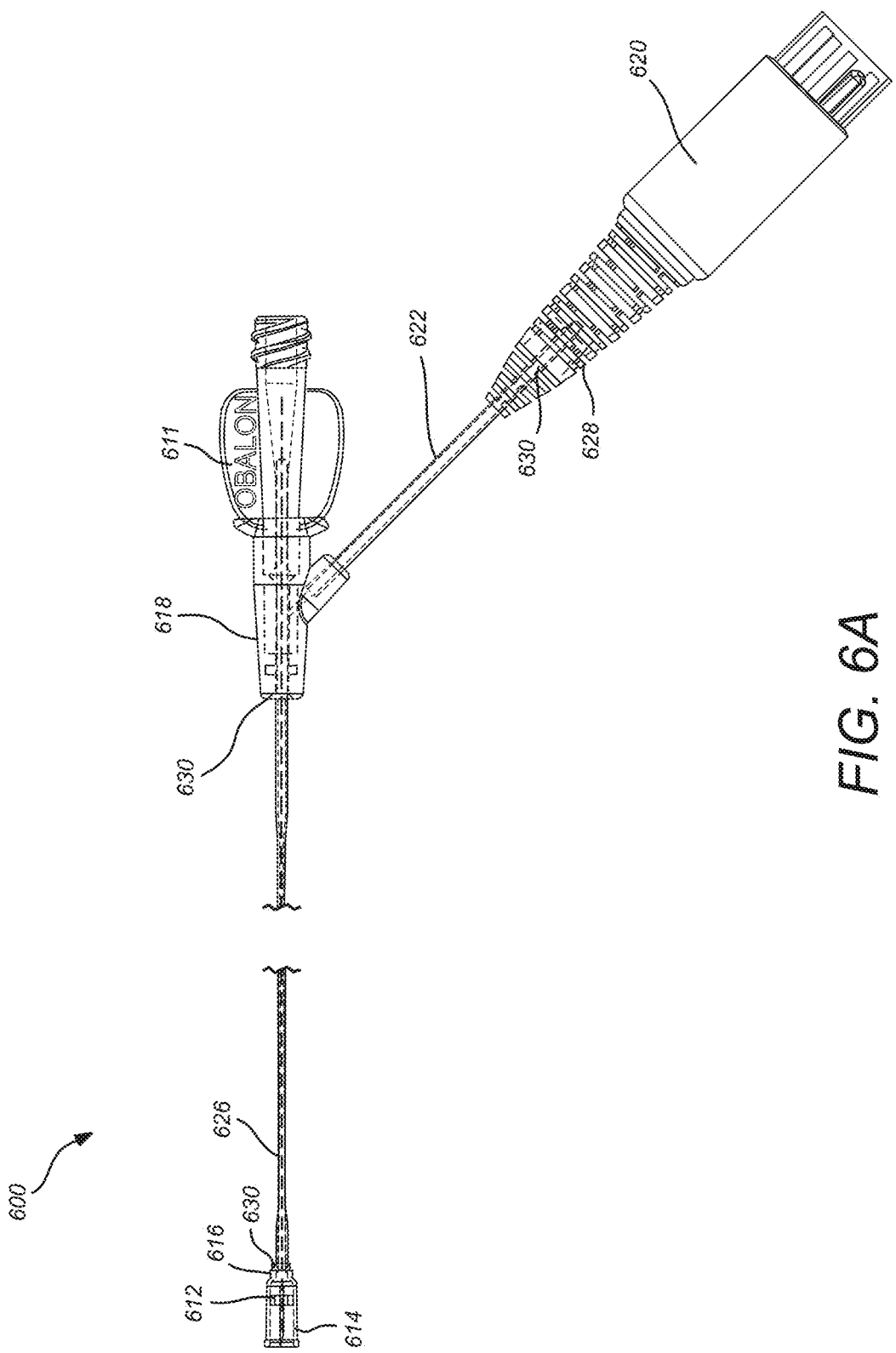
FIG. 6A depicts another embodiment of a catheter 600 and sensor 616 that may be used with the systems of FIGS. 2-3C.

FIG. 6A depicts an embodiment of a catheter 600 with an integrated sensor 616 that may be used with the systems of FIGS. 1-3C. The catheter 600 includes a shaft 626 that extends along the length of the catheter 600. The shaft 626 forms a hollow channel through which electrical wires may be extended to attach to the sensor 616. The catheter 600 may include a plug on the opposite end as the sensor 616. The plug may couple with the sensor interface unit, such as the sensor interface unit 230 or 330. In some embodiments, the plug 620 couples with a jumper cable that is attached to the system control unit.

In some embodiments, the catheter is a flexible, hydrophilic coated, 2-Fr catheter which contains a swallowable catheter (approximately 30 inches) which is bonded to approximately 40 inches of pellethane extension tubing to allow connection to the sensor interface unit. The distal end of the catheter 600 contains two small inductive sensors 616, one at the distal end and the second approximately 6 inches from the distal tip. As the sensors 616 within the catheter 600 move through the esophageal tract, through the GE junction, and into the stomach, the sensors 616 provide electrical signals to the sensor interface unit 230 or 330. The characteristics of these electrical signals are dependent on the distance and angle between a sensor 616 and the field generator 210 or 310.

In some embodiments, the distal end of the various catheters, such as the catheter 600, is sealed with an adhesive plug. Attached to the distal end of the catheter is a 31×12.41 mm pharmaceutical grade porcine gelatin capsule (see FIG. 9, 900) with a hydrophilic coating containing food-grade sugar. The catheter 600 may include a 2 Fr catheter shaft 626 formed from Pebax® (Polyether Block Amids) and Polyvinylpyrrolidone to provide a swallowable catheter 600 with a hydrophilic coating to provide lubricity. The catheter 600 may include sensors 616 that include a copper coil encased in epoxy to provide electrical signals for tracking the catheter 600. The catheter 600 may include an outer capsule 900 formed from a USP-grade hard porcine gelatin capsule supplied by Torpac, Inc. (New Jersey, USA) containing food grade sugar to mimic food bolus weight for swallowing. The outer capsule 900 may have a polyvinylpyrrolidone hydrophilic coating to provide lubricity. The catheter 600 may include a distal strain relief formed from a thermoplastic polyurethane elastomer to provide strength to hold the gelatin capsule 900 on the catheter shaft 626. The catheter 600 may include an extension tube 622 formed from a thermoplastic polyurethane elastomer to extend the length of the catheter 600 for attachment to the sensor interface unit 230 or 330. The catheter 600 may include a marker band (not shown) formed from stainless steel to provides visibility to the tip of the catheter 600 during visualization. The catheter 600 may include adhesive 630 that is UV curable for joining extruded components of the catheter 600 together and to seal the sensors 616 from fluid contact. The catheter 600 may include a 4-Pin connector 620 to provide communication between the catheter 600 and the sensor interface unit 230 or 330. The connector 620 may be formed from a polybutylene terephthalate ("PBT")-Steel-Brass material. The catheter 600 may include a heat shrink-connector 628 to provide a strain relief for attaching the 4-Pin connector 620 to the extension tube. The heat shrink-connector 628 may be formed from a fluoropolymer.

As shown in FIG. 6A, the catheter 600 may include a proximal luer hub 611. The luer hub 611 may allow for attaching peripheral components or for grasping the catheter 600. The catheter 600 may also include a catheter inner assembly or needle assembly 612 that includes a catheter needle, a monofilament thread, and a needle holder. The catheter 600 may also include a needle sleeve 614 that surrounds and protects the needle assembly 612. The catheter 600 is shown with a sensor 616. In some embodiments, the sensor 616 is a 0.3×13 mm 5 DOF sensor manufactured by Northern Digital Inc. in Ontario, Canada. However, other sensors may be implemented.

The catheter 600 may also include a Y-port 618. The Y-port 618 may be a splitter that connects various features of the catheter 600 together. In some embodiments, the Y-port 618 connects the luer hub 611 and a strain relief tubing 622 with a catheter bump tubing 626. The strain relief tubing 622 may extend off-axis from the Y-port 618 and connect with a connector 620. The connector 620 may include a connector spacer 628 and UV cure adhesive 630. The adhesive 630 may also be used in other locations of the catheter 600, for example at the interface of the sensor 616 and the catheter bump tubing 626, and elsewhere as shown.

The catheter 600 may have robust mechanical properties. In some embodiments, the catheter 600 can bend 180° over a 0.5 cm radius mandrel without kinking at the center portion of a Pebax catheter shaft. The intragastric device may separate from the catheter 600 when submerged in 37° C. water. The adhesive 630 bond between the needle sleeve 514 and the catheter 600 fails at more than 150 grams when preconditioned for twenty seconds in room temperature water. The adhesive 630 bond between the strain relief tube 622 and the catheter tubing 626 fails at more than one foot-pound. The bond between the catheter 600 and the marker band fails at more than one foot pound. The bond between the extension tube and the catheter tubing 626 fails at more than one foot pound.

Figure 6B:
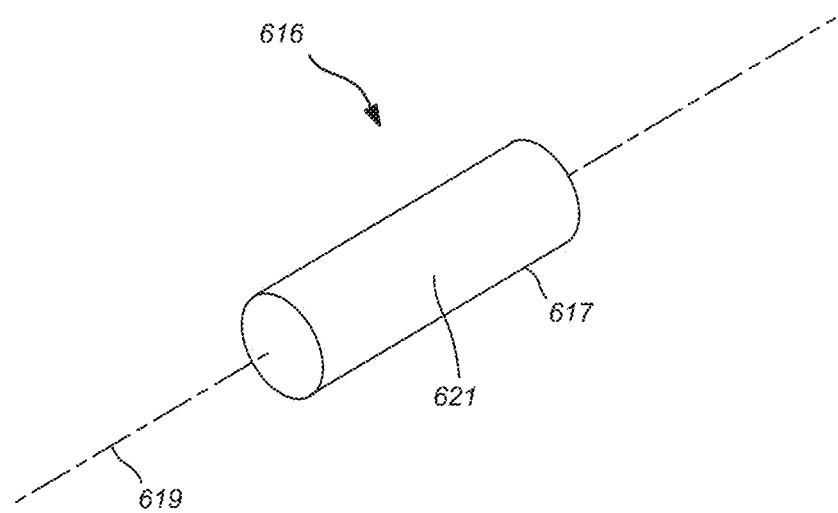
FIG. 6B depicts an embodiment of an electromagnetic sensor 616 that may be implemented with the catheter 600 of FIG. 6A.

FIG. 6B depicts an embodiment of the electromagnetic sensor 616 that may be implemented with the catheter of FIG. 6A. The sensor 616 includes a sensor body 617. The body 617 is elongated and generally cylindrical. However, the body 617 may have a variety of shapes. The body 617 is formed from a metal or other material that is responsive to an EM field. The body 617 is symmetric about a longitudinal 619. The body 617 includes a geometric center 621.

The sensor 616 has its own local coordinate system that is defined by the geometric center 621 and the longitudinal axis 619. The remaining two axes are orthogonal to the longitudinal axis 619 and intersect the center 621. In some embodiments, the z-axis extends along the sensor's length and thus corresponds with the longitudinal axis 619 as illustrated, with an origin at the sensor's center 621. However, it is possible to move the origin along the z-axis. With a 5 DOF sensor 616, the orthogonal X and Y axes are not fixed, due to the inability to determine rotation about the z-axis.

With a 5 DOF sensor 616, information may be provided on the three translation values on the x, y and z-axes and any two of the three rotation values—roll, pitch and yaw. However, the rotation around the sensor's longitudinal axis 619 cannot be determined. As such, only five degrees of freedom (5 DOF) can be determined for single sensor embodiments.

Figure 7:
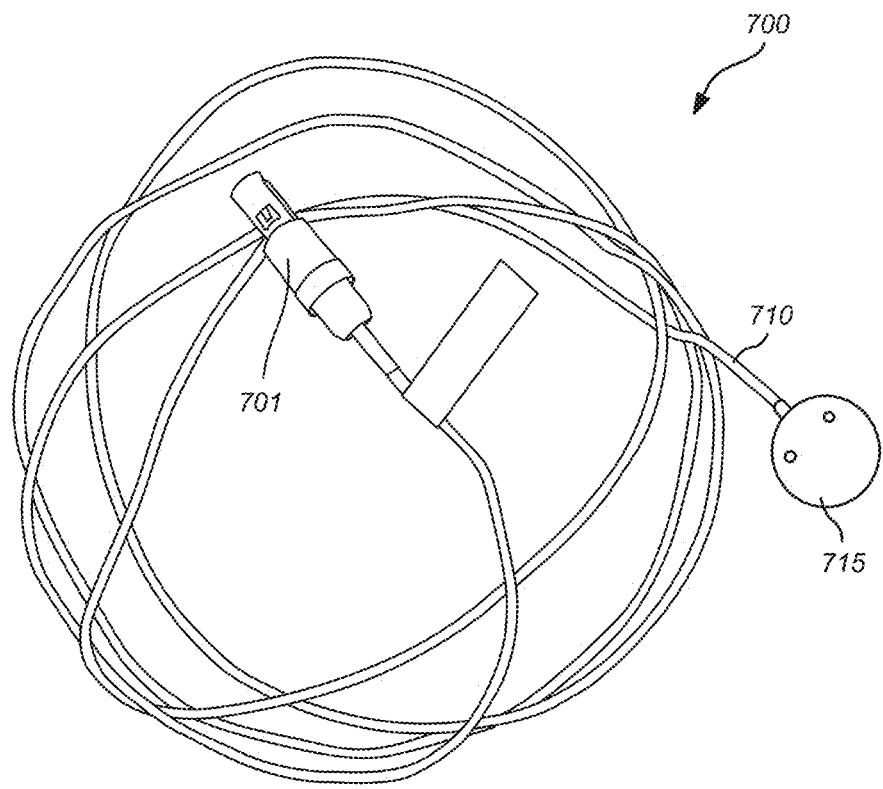
FIG. 7 depicts an embodiment of an external reference sensor 715 that may be used as anatomical reference markers with the systems of FIGS. 2-3C.

FIG. 7 depicts an embodiment of an external reference sensor assembly 700 that may be used as anatomical reference sensors 322 with the systems of FIGS. 3A-3C. The assembly 700 includes a sensor 715, e.g., a reference sensor, connected to a cable 710. On the opposite end of the cable 710 is a connector 701 for connecting the assembly 700 to the system control unit, such as the system control unit 235 or 335. The sensor 715 may attach to the back side of a patient and be fixed. The sensor 715 may be fixed to the patient with mechanical or other suitable means, for instance adhesive or clips for attachment to clothing. In some embodiments, the sensor 715 is fixed to the front side of the patient.

Figure 8A:
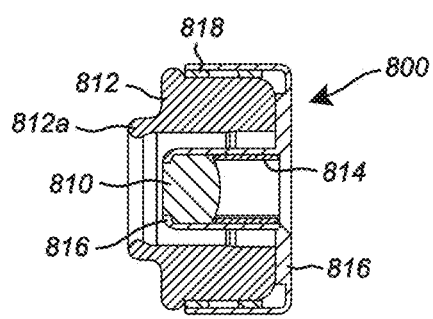
FIG. 8A depicts a cross section of a valve system 800 including a septum plug 810, head unit 812, ring stop 814, tube septum 816, and a retaining ring 818, wherein the cross section is taken along line 8A-8A of FIG. 8B.
Figure 8B:
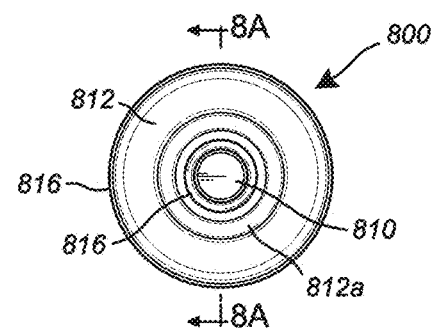
FIG. 8B is a top view of the valve system 800 of FIG. 8A.
Figure 8C:
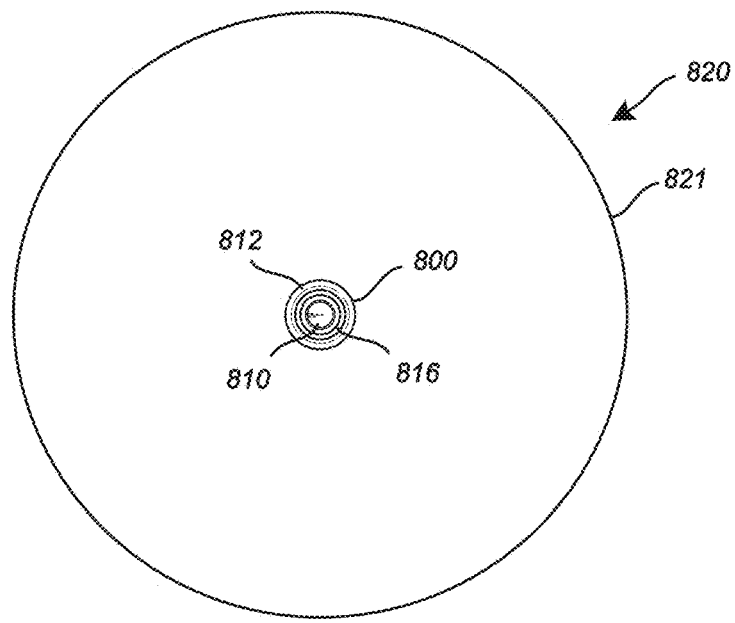
FIG. 8C is a top view of the valve system 800 of FIGS. 8A and 8B incorporated into the wall of an intragastric device 820.

FIGS. 8A-8C illustrate a self-sealing valve system 800 for use with a swallowable intragastric device 820 ("balloon"). Intragastric devices are described in greater detail below in the sections entitled "Swallowable Intragastric Device System."

Figure 9:
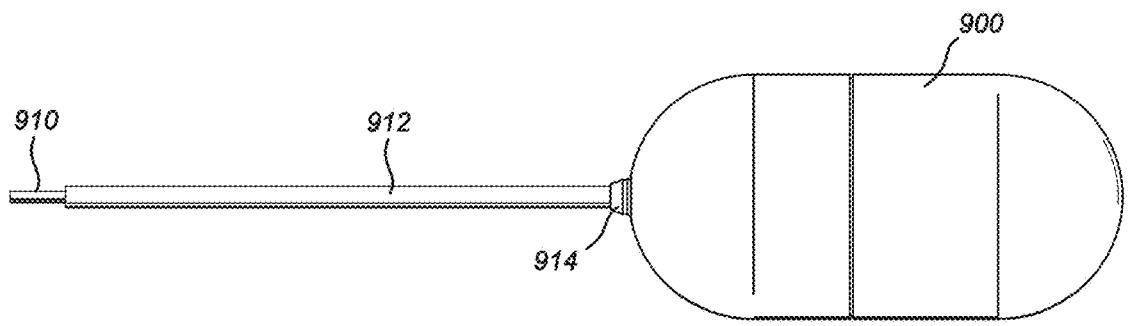
FIG. 9 depicts a gel cap 900 containing an intragastric device 820 of FIGS. 8A-8C in uninflated form (not shown). The gel cap 900 containing the uninflated intragastric device 820 is engaged via the valve system 800 of the intragastric device 820 to a dual catheter system comprising a 2 FR tube 910 and a 4 FR tube 912 via a press-fit connecting structure 914 incorporating an electromagnetic component.

FIG. 9 illustrates an encapsulated intragastric device, including a capsule 900 containing an intragastric device (not shown) in a compressed and compacted state for deployment. The intragastric device is attached to a catheter 912 via a needle sleeve 914. Encapsulated intragastric devices are described in greater detail below in the sections entitled "Swallowable Intragastric Device System."

FIGS. 10A-16 illustrate another electromagnetic tracking system 1000 for tracking a swallowed intragastric device in a patient 1005 in real time. The system includes a stationary field generator 210 or 310, a target sensor 1010 included in the swallowable portion of the system 1000, a reference sensor 1015 attached to the patient's body 1005, and a processor using software which implements an algorithm (described below) combined with data collected from the sensors 1010 and 1015 to determine the positions of the sensors 1010 and 1015 relative to a generated EM field. The user (e.g., physician) may hold the target sensor 1010 in front of the patient 1005 or move the target sensor 1010 over the patient's body so as to trace an outline thereof, such as is described in greater detail below. When it is swallowed, the target sensor 1010 moves down the patient's esophagus via peristaltic motion.

Each of the sensors 1010 and 1015 is an induction sensor configured to generate a small electrical current when exposed to an EM field. In some embodiments, at least one of the sensors 1010, 1015 has 6 DOF of movement in three-dimensional space. Thus, the 6 DOF sensor is free to move or change position as forward/backward, up/down, and left/right translation in three perpendicular axes (denoted as the x-, y-, and z-axes), in combination with changes in orientation by rotation about one or more of the three perpendicular x-, y-, and z-axes, which are shown and described in greater detail below, with respect to FIGS. 10A-10C. Thus, if a 6 DOF sensor is moved through 3D space, the sensor's movements can be described as a series of positions that can be described mathematically with respect to the x-, y-, and z-axes. In certain embodiments, the reference sensor 1015 is a 6 DOF sensor. In some embodiments, the target sensor 1010 is a 6 DOF sensor.

In some embodiments, at least one of the sensors 1010, 1015 has 5 DOF of movement in three-dimensional space. Movement of the 5 DOF sensor is also respect to the x, y, and z-axes, however, rotation about the axis that is parallel with the esophagus (e.g., the $Y_O$-axis of FIGS. 10A-10C) is not detected, and is therefore ignored when calculating movement of the 5 DOF sensor. In some embodiments, the target sensor 1010 is a 5 DOF sensor. It is foreseen that the reference sensor 1015 may be a 5 DOF sensor, in some circumstances.

As is described elsewhere herein, the system includes an EM field generator 210 or 310 that generates a detectable EM field. For example, the EM field is depicted as vectors $Z_F$ in FIG. 10B, which also represent the Z-axis discussed above. The EM field is directed at the patient's body 1005. For example, the patient 1005 stands in front of the field generator 210. 310. In some circumstances, the patient 1005 may face the field generator 210. 310. In other circumstances, the patient 1005 may face away from the field generator 210, 310. As described herein, the EM field $Z_F$ varies in strength as a function of position within the tracking volume (see FIG. 5, 515). The sensors 1010 and 1015 detect the generated EM field $Z_F$ as electrical current, which is fed into the system 1000 and thereby provides information or data regarding the positions of the sensors 1010 and 1015 relative to the EM field $Z_F$. Since the reference sensor 1015 is affixed to the patient's torso and the target sensor 1010 moving through the patient's torso, the aforementioned data are reflective of the sensors' 1010, 1015 positions with respect to the patient's torso and the EM field $Z_F$.

The processor receives the data (e.g., the electrical currents generated by the sensors 1010, 1015), and interprets the current levels so as to determine in 3D space the relationship between each of the sensors 1010, 1015 and the EM field $Z_F$. For example, the x-, y-, z-position of each of the sensors 1010, 1015 (e.g., its position in 3D space with respect to the x-, y-, and z-axes) and two of its orientations are determined or calculated, using the algorithm described below, thereby enabling the system to display the sensor icons 1060, 1065 (described below) in the correct spatial context in real time, such as in a coordinate system displayed on a monitor, display or screen. As used herein, the term "real time" means that the input data are processed so quickly, such as within milliseconds, that the results are available as feedback virtually immediately. Accordingly, the positions and/or movements of the sensor icons 1060, 1065 on the display, mirror the positions and/or movements of the actual sensors 1010, 1015 while the patient is swallowing the target sensor 1010.

The reference sensor 1015 is affixed to the patient's body 1005, such as but not limited to the chest (e.g., the patient's xiphoid process XP or sternum) or back, and therefore is effectively "stationary" with respect to the patient's body 1005. An exemplary reference sensor 700 is shown in FIG. 7 and described above. As noted above, in certain embodiments, the reference sensor 1015 is a 6 DOF induction sensor. Its position in 3D space may be described mathematically with respect to the x-, y-, and z-axes and rotation about those three perpendicular axes. It is foreseen that reference sensor 1015 may be a 5 DOF induction sensor in some circumstances.

The target sensor 1010 (e.g., the device sensor or mobile sensor) is incorporated into the intragastric device 1020, such as but not limited to an intragastric balloon or capsule 1020, an inflation catheter 1025 attached to the intragastric device 1020 or a component thereof. An exemplary inflation catheter 600 is shown in FIGS. 6A-6B and described in greater detail above. The inflation catheter 1010 may be referred to as a "navigation catheter" so as to distinguish it from a catheter that does not include a target sensor 1010. The target sensor 1010 may be either a 5 DOF induction sensor or a 6 DOF induction sensor, wherein rotation about the axis that is parallel with the esophagus may be ignored.

During a balloon administration procedure, which may be referred to as a "swallow," the swallowed target sensor 1010 moves through the patient's body 1005. If the patient 1005 moves (e.g., shifts body position, fidgets, turns or rotates, leans forward or backward or side to side, or jumps up and down) while in front of the EM field $Z_F$, the target and reference sensors, 1010 and 1015 respectively, are moved substantially the same amount and direction with respect to the EM field $Z_F$. In this way, a patient's movements during the balloon administration procedure will change the absolute location of the reference sensor 1015, but they will not affect the relative location of the target sensor 1010 with respect to the reference sensor 1015. Data captured during a balloon treatment session (e.g., administration) contains both position and orientation information coordinates and the rotation of the target sensor 1010 in the Z-axis with respect to the reference sensor 1015. The processor uses the aforementioned algorithm (described below) to process data received from the sensors 1010, 1015 and the EM field generator 210, 310 to correct for the relative movement of the body 1005 (e.g., translations and rotations), determine the location of the target sensor 1010 with respect to the patient's body 1005 (e.g., if it is outside the body 1005 or its location within the body 1005), and to provide a visual approximation 1030 (see FIGS. 4, 10C and 12-16) of the target sensor's 1010 location within the patient's body 1005. For example, the system 1000 may display this information on a display screen 1030 as X-Y coordinates and the rotation of the target sensor 1010 in the Z-axis with respect to the reference sensor 1015. In some embodiments, the system 1000 may include replay viewer software that replays data obtained during a balloon administration. For example, the replay viewer may read data files recorded and/or saved during a balloon treatment, and then display the position(s) of the target sensor 1010 throughout the treatment, thereby allowing the user to review a patient's previous balloon administration(s).

Figure 10A:
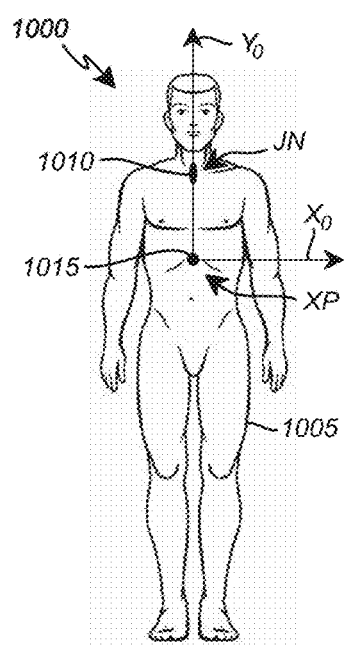
FIG. 10A is a cartoon of the front of a human 1005 illustrating a placement of a reference sensor 1015 at the xiphoid process XP, a placement of a target sensor 1010 at the jugular notch JN such as an encapsulated balloon attached to the distal end of an inflation catheter which includes a target sensor 1010, an $X_0$-axis, and a $Y_0$-axis.
Figure 10B:
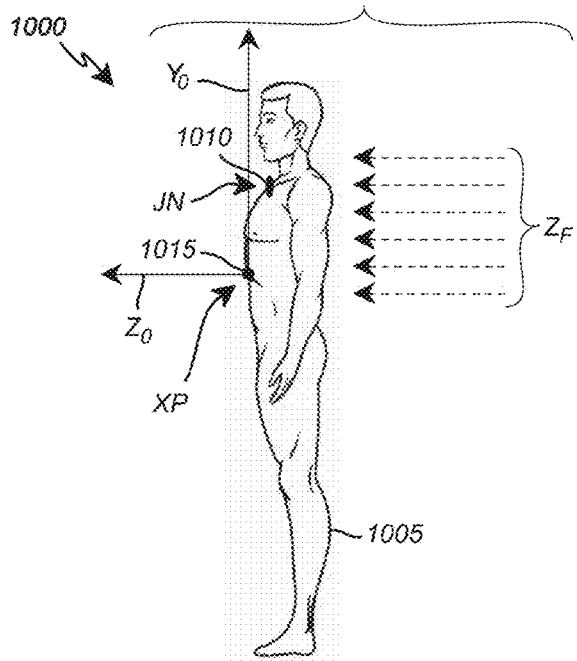
FIG. 10B is a side view of the human 1005 of FIG. 10A, showing the placement of the reference sensor 1015 at the xiphoid process XP, the placement of the target sensor 1010 at the jugular notch JN, the $X_0$-axis, and the $Y_0$-axis, and a plurality of $Z_F$ vectors parallel to the Z-axis (not shown).

Referring to FIGS. 10A-10B, the reference sensor 1015 includes a longitudinal axis (not shown) and is attached to the body 1005 such that longitudinal axis aligns with a preferred or known axis of the body 1005. For example, in some embodiments, it is convenient to substantially align the reference sensor 1015 with, e.g., is substantially parallel with, the vertical axis of the body 1005. To facilitate such orientation while positioning the reference sensor 1015 on the body 1005, the reference sensor 1015 may include orientation indicia 1035 or structure, such as an arrow, wording, shapes, icons and the like (see FIG. 11). The body of the reference sensor 1015 may be any shape, such as triangular, circular, hemispherical, or a diamond. The shape of the reference sensor 1015 may be selected so as to improve or assist in handling by the user. The reference sensor 1015 can be located on any convenient portion of the torso of the body 1005 so as to set the position of the reference sensor 1015 as the origin of a coordinate system used to calculate the position of the intragastric device 1020 in relation to the reference sensor 1015. The reference sensor 1015 could be placed, for example, on the sternum, or on the base of the throat. The arms, legs and head of the body 1005 are not selected to attach the reference sensor 1015 as the patient could move them with respect to his/her torso. After calibration is complete, since the reference sensor 1015 is attached to the torso, the axes move with the patient and not the point of view of the image(s) displayed or shown on the display/screen 1030 (i.e., the "projection").

The reference sensor 1015 can have a wired or wireless connection to the processor or other computing device that is employed in operating the software, for calculating the location(s) of the target sensor 1010. The reference sensor 1015 can be temporarily affixed to the patient 1005 using a medical grade adhesive pad, taped into place, or otherwise secured on the patient. In certain embodiments, the reference sensor 1015 can be incorporated into a garment that is placed on the patient 1005, e.g., attached directly to a vest, or a band placed about the patient's chest, or placed in a pocket or by Velcro or other attachment to the garment. The reference sensor 1015 can be disposable (configured for a single use), or reusable.

Calibration of the System

FIGS. 10A and 10B illustrate placement of the target and reference sensors 1010, 1015 on the patient prior to and during calibration, as well as the X, Y and Z-axes (e.g., $X_0$, $Y_0$, $Z_0$) that are used in calculating the positions and orientations of the sensors. The three axes are perpendicular to each other. During calibration, the X and Z-axes are parallel with the floor and the Y-axis is perpendicular to the floor (e.g., see FIG. 5, 520). After calibration, such as during the balloon administration procedure, these axes may move with the patient 1005. The reference sensor 1015 is placed, applied, adhered or attached to/on the patient's body 1005, so that the longitudinal axis of the reference sensor 1015 is aligned with the longitudinal axis of the patient's body or the esophagus. For example, the reference sensor 1015 may be attached to the patient's chest in a position that aligns the sensor's longitudinal axis (e.g., $Y_0$-axis) with the patient's esophagus or is vertical with respect to the floor of the room in which the balloon is administered. It is convenient to place the reference sensor 1015 over the patient's xiphoid process XP, as the xiphoid process XP is easily palpated and does not move with respect to the patient's torso. In some embodiments, a strap, belt or band, such as an elastic band about the patient's chest, or a garment such as a vest, jacket or shirt, can be used to hold the reference sensor 1015 over or near the xiphoid process XP. Positioning the sensors 1010, 1015 in this configuration enables the system to define the vertical Y-axis, which runs vertically (e.g., perpendicular to the floor) through the reference sensor 1015 and parallel with the longitudinal axis of the target sensor 1010. The X-axis runs parallel with the floor. It is foreseen that they system 1000 may be configured such that the X, Y and Z-axes are in an alternative orientation, such as, for example, if the patient 1005 is in a prone or supine position. After calibration, the axes may move if the patient moves his/her torso (e.g., leans forward, b Referring now to FIG. 10C, with the sensors 1010, 1015 in position, calibration is conducted in order to create a graphical or virtual representation 1030 of the location(s) of the target sensor 1010 with respect to the reference sensor 1015 that is correlated with or is representative of the physical locations of the sensors 1010, 1015 with respect to the body of the patient 1005. Calibration of the system 1000 can be done by positioning or holding the target sensor 1010 on various locations at the surface of the patient's body 1005 (e.g., such as holding the capsule 1010 at the jugular notch JN, FIGS. 10A-10B). In other embodiments, the user can manually trace an "outline" 1040 of the patient's body 1005 with the target sensor 1010, such as is indicated by the arrows 1045 depicted in FIG. 11. In the example of FIG. 11, with the reference sensor 1015 attached to the patient's sternum, the user or other user holds the capsule 820 and moves the capsule 1020 up one side of the patient 1005, over the patient's head, and down the other side of the patient 1005, such as is indicated by the dashed line 1040 and the arrows 1045. The user can optionally move the intragastric device 1020 (e.g., target sensor 1010) over the patient in the sagittal plane (front to back), e.g., in two or three vertical lines along the patient's front, etc. In certain embodiments, the intragastric device 1020 can be moved for purposes of calibration by a mechanical apparatus, e.g., a robotic arm for rapid and precise motion (not shown). The position of the capsule 1020 (e.g., the target sensor 1010) relative to the reference sensor 1015 is recorded and the computing device or other processor uses this information to draw or displayed indicia or icons 1050 on a display device 1055, such as is described elsewhere herein. The displayed indicia 1050 may include, but are not limited to, a first virtual representation, icon, indication or indicia 1060 associated with the position of the reference sensor 1015, a second virtual representation or icon 1065 of the target sensor 1010, a third virtual representation 1070, or trace, of the movement of the target sensor 1010 relative to the position of the reference sensor 1015, a three-dimensional virtual representation of the patient's body (not shown), reference lines or a reference grid 1075, alpha-numeric symbols 1076 to indicate the left and right sides of the patient's body with respect to the reference grid 1075, and the like. In certain embodiments, the process of positioning the capsule 1020 or tracing the outlines of the patient 1005 can be facilitated by providing the patient a garment, e.g., a vest, shirt, or robe, with visible indicia that guide the user in placing or moving the capsule 1020 over the patient's body for calibration purposes.

The target sensor 1010, also referred to as a device sensor, can be any sensor suitable for ingestion by the patient (in vivo use). Electromagnetic detection systems for use in conjunction with intragastric devices are described in U.S. Pat. Publ. No. 2016/0278662 A1, incorporated by reference herein in its entirety. Electromagnetic detection systems for use in conjunction with intragastric devices are described in U.S. Pat. Publ. No. 2016/0100970 A1, incorporated by reference herein in its entirety. The location devices attached to the intragastric balloon or catheter as disclosed in these published applications can be employed as the device sensor in the methods of the embodiments. Prior to ingestion, the device sensor can be moved over the patient's body as a calibration step, then ingested and the location monitored using the external sensor (affixed to the patient) as the reference sensor.

Referring now to FIGS. 10C-16, in some embodiments, when the patient 1005 swallows the intragastric device 1020 and navigation catheter 1025, one of which includes the target sensor 1010, the computing device of the system 1000 uses the data from the calibration to display on a monitor (e.g., 1030) a representation of the target sensor 1010 situated in an appropriately sized display indicia 1050 (FIG. 12), such as but not limited to a body representation 1005a, that the doctor can use as a reference for deciding the location of the swallowed target sensor 1010 is located in the body 1005 at any point in time during the procedure. When the display indicia 1050 include an outline of the body, the outline can be two dimensional (e.g., a simple outline), or three dimensional (e.g., a shaded or wire frame depiction of the surface of the patient's body 1005). In other embodiments, the monitor 1030 may display a grid (see FIG. 10C, 1075) with a body model or representation 1005a that may include a representation 1015a of the reference sensor 1015. The body model 1005a may move so as to mirror movements of the patient 1005. For example, if the patient 1005 leans forward, the body model 1005a also leans forward on the display 1050.

In some embodiments, the computing device can store biometric data obtained from a population of individuals relating to esophagus and stomach placement based on the patient's height, or other dimension(s) (e.g., distance from base of throat to umbilicus, or from shoulder blade to hip bone, etc.), and can provide an overlay on the display of the outline of the patient's body showing estimated locations of the esophagus, stomach, or other internal physiological structures (e.g., an outline of the esophagus and/or stomach). The target sensor 1010 can be depicted on the display as an icon 1065 that shifts location in the outline or grid 1075 as it moves through the patient's body. For example, the target sensor icon 1065 may be a 2D or 3D capsule, a circle, an oval, a square, or the like. In certain embodiments, the target sensor icon 1065 may change color or shape upon arriving at a location believed to be the stomach, or a visual alert. (e.g., text display stating, "positioning complete") or audible alert (tone or computer-generated speech) can be provided. Once the target sensor icon 1065 is deployed in the stomach, the intragastric device can be inflated by usual procedures described elsewhere herein.

One reference sensor 1015 can be employed, as described above, or multiple reference sensors 1015 (not shown) can be employed to provide enhanced accuracy of location, redundancy in the event of failure of one of the reference sensors 1015, or simpler calibration. For example, the patient can be provided with a vest comprising an array of reference sensors 1015 providing coverage over the patient's body or a portion thereof, e.g., the chest and abdomen. The array (e.g., two or more) of reference sensors 1015 can provide data for calculation of an estimate of the contours of the patient's body 1005 and the location of the device sensor 1010 within those contours without the need for calibration by moving the device sensor 1010 over the surface of the patient 1005 relative to a single fixed reference sensor 1015.

Figure 11:
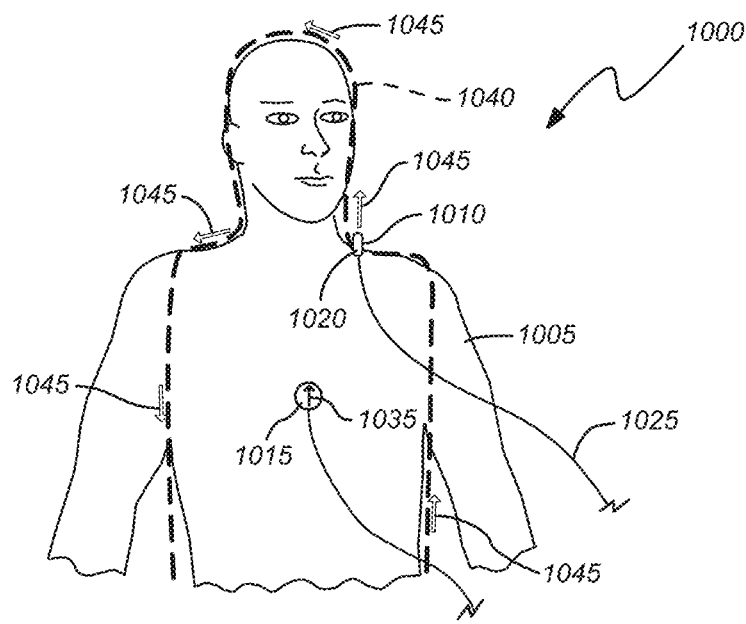
FIG. 11 depicts a patient 1005 with a system 1000 for determining a location of an intragastric device 1020 during swallowing. The patient 1005 stands in the path of a generated electromagnetic field (EM field, not shown) with a 6-degrees of freedom reference sensor 1005 attached to his body 1005. The reference sensor 1015 detects the EM field. A user, e.g., a physician or other health care provider (not shown), moves a 6-degrees of freedom target sensor 1010, which also detects the field and is incorporated into the intragastric device 1020, the catheter 1025 or a component thereof, about the patient's body 1005, such as is indicated by the dashed line 1040 and arrows 1045.
Figure 12:
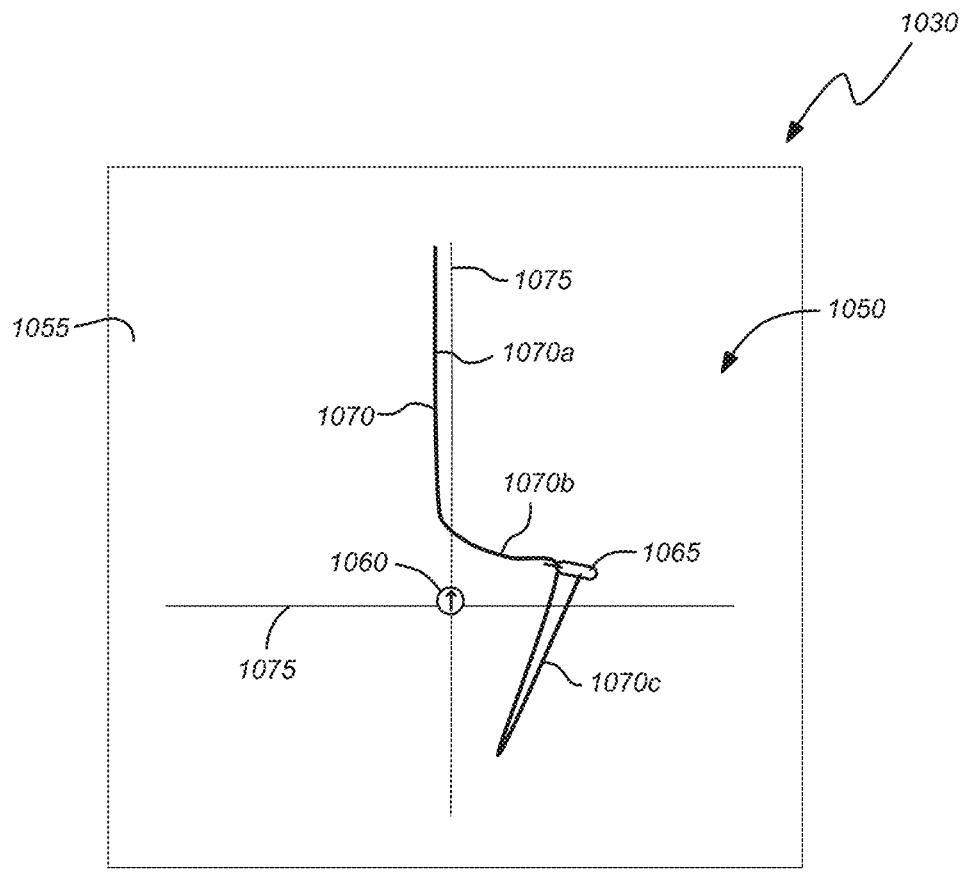
FIG. 12 depicts a visual approximation 1030 of the position of the target sensor 1010 of FIG. 11 within respect to the reference sensor 1015 of FIG. 11.

Referring to FIGS. 11-12, in an exemplary embodiment, a method for electromagnetically locating an intragastric device 1020 inside the body 1005 of a patient 1005 is provided (see FIGS. 10A-10B). Prior to administering a balloon, the electromagnetic location system 1000 is calibrated. For example, the intragastric device 1020 may be an intragastric balloon attached to a navigation catheter 1025 (e.g., catheter 600, FIGS. 6A-6B). The method includes the steps of placing a reference sensor 1015 on a fixed location on a surface of a patient's body 1005, such as at the xiphoid process XP, and then holding the encapsulated balloon 1020 attached to the navigation catheter 1025, which incorporates the target sensor 1010, at another location on the patient's body, such as at the jugular notch JN. Alternatively, the user may move the target sensor 1010 on a path 1040 along a surface of the patient's body 1005. For example, the user may move the capsule 1020 over the outline, e.g., line 1040, of the patient's body 1005. The reference sensor 1015 senses an EM field 215, 311 directed at the patient 1005, and produces a signal, e.g., the reference sensor signal, in response to the sensed EM field 215, 311; the reference sensor signal is associated the position or location of the reference sensor 1015 on the patient's body 1005. The processor (not shown) uses an algorithm (described below) to process the reference sensor signal and thereby generates data associated with the reference sensor's 1015 position or location. The target sensor 1010 also senses the EM field 215, 311. In response to the EM field 215, 311, the target sensor 1010 produces or generates a target sensor signal that is associated with the target sensor's location and orientation. The processor uses the algorithm to process the target sensor signal and thereby generates data associated with the position and orientation of the target sensor 1010. If the target sensor 1010 is moved along the path 1040, the generated data is associated with the position of the target sensor 1010 with respect to its position along the path 1040. The processor processes the signal and/or data to generate or create indicia 1050 that are associated with the locations of the reference and target sensors, 1015 and 1010 respectively, with respect to the patient's body 1005. These indicia 1050 are displayed, so that the user may use them to determine where the intragastric device 1020 is in the body 1005, for example to decide whether the intragastric device 1020 is in the stomach. These indicia 1050 may include but are not limited to one or more of a graphical or virtual representation of the patient's body, vertical or horizontal lines 1075, a graph, quadrants, icons, symbols and alphanumeric characters.

When the system 1000 has been calibrated and the reference indicia, e.g., 1050, 1060 and 1075, are displayed, an intragastric device 1020 is introduced into the patient's body 1005, via swallowing, for example while drinking a glass of water. The target sensor 1010 is releasably coupled with the intragastric device 1020. For example, the target sensor 1010 may be coupled with or incorporated into the navigation catheter 1025, which is releasably and fluidly coupled to the intragastric device 1020. Accordingly, as the patient 1005 swallows the intragastric device 1020, and therefore also the navigation catheter 1025 (e.g., catheter 600), the target sensor 1010 generates an electrical signal associated with a plurality of locations of the intragastric device 1020 within the body 1005, such as but not limited to in the mouth (see FIG. 13), in the esophagus (see FIG. 14), and in the stomach (see FIGS. 10C and 15-16). The current position of the target sensor 1010, and thus the intragastric device 1020, may be displayed on the display 1055, such as an icon 1065 or cartoon, wherein the position(s) of the target sensor 1010 on the display 1055 is relative to the indicia 1060 of the reference sensor 1015 and correlates with the position(s) of the target sensor 1010 within the body 805 relative to the position of the reference sensor 1015 on the body 1005, such as for example how the reference and target sensors, 1015 and 1010, are positioned with respect to one another in three-dimensional space at any given time and/or over a period of time.

In preferred embodiments, the position(s) of the target sensor 1010, as it progresses from the mouth to the stomach, are displayed or plotted as a trace 1070, a line, a series of dots, or the like. If, for example, the reference sensor 1015 is attached to the skin of the patient 1005 over or at the xiphoid process XP and oriented or pointed toward the patient's head, the reference sensor indicia 1060 may be displayed in the middle of the display 1055. When the target sensor 1010 is swallowed, its physical position correlates with the position of the target sensor icon 1065 on the display 1055. Accordingly, the target sensor icon 1065 appears to move downwardly from near the top of the display 1055 and toward the reference sensor indicia 1060. When the target sensor 1010 reaches the gastro esophageal junction (e.g., GEJ), the target sensor 1010 may appear to move quickly in a sideways direction, such as toward the right side of the display 1055, and then appear to move or bob up and down adjacent to the reference indicia 1060 and 1075, thereby indicating that the target sensor 1010 is within or inside of the stomach. To further determine whether the target sensor 1010, and thus the intragastric device 1020 is in the stomach, the user may ask the patient to breathe deeply, or take a deep breath, so as to cause the intragastric device 1020 to move up and down within the body 1005. Such up and down movements of the intragastric device 1020 may be displayed as the target sensor icon 1065 moving down and back up while (e.g., at the same time as) the patient takes and releases the deep breath.

When the target sensor icon 1065 is displayed in a position relative to the indicia 1060, 1075, wherein the displayed position is indicative of the intragastric device 1020 being in the stomach, the user may decide to inflate the intragastric device 1020. The intragastric device 1020 may be inflated in the usual way, such as by introducing an initial fill fluid into the intragastric device lumen through the releasable fluidly coupled navigation catheter 1025. Once the intragastric device 1020 is inflated, the navigation catheter 1025, and thus the target sensor 1010 are disconnected, or decoupled, from the intragastric device 1020 and removed from the body 1005. The inflated intragastric device 1020 remains in the stomach and is exposed to the in vivo intragastric environment for a useful life or treatment period of at least 30 days. In some embodiments, the treatment period of at least 90 days. In more preferred embodiments, the treatment period is at least 6 months. In some select preferred embodiments, the treatment period is at least 9 months, at least 10 months, at least 11 months or at least 12 months.

In another exemplary embodiment, the system 1000 software displays the movement of the target sensor 1010 with respect to the reference sensor applied to the patient's skin so that the image displayed on the screen is independent of patient movement in the tracking volume, which may occur while capturing and recording the data. For example, the patient may move side to side, fidget, or turn while swallowing the intragastric balloon. For example, since the reference sensor is attached to the patient's body, it moves the same way that the patient does (e.g., side to side, vertically, rotating, leaning forward or backward). The data captured during a balloon treatment session contains both position and orientation information for each frame. The system 1000 displays this information on the touch screen as X-Y coordinates and the rotation of the navigation catheter sensor in the Z-axis with respect to the reference sensor. The system 1000 may include a replay viewer that replays data obtained during a balloon administration. This replay viewer reads data files recorded during a treatment, and displays the position of the sensor throughout the treatment allowing the user to review a patient's previous balloon administration(s).

In certain embodiments, the intragastric balloon (described below) is administered by a healthcare professional (e.g., the user) in an outpatient setting. The balloon administration (placement) procedure requires no sedation. Administration takes place in an outpatient setting, optionally with access to endoscopic services in the event an endoscopic removal of the balloon is desired. Use of the electromagnetic detection system 1000 of the certain embodiments does not require digital radiography for placement. Once swallowed, the balloon capsule begins to dissolve and continues dissolution with exposure to water and gastrointestinal fluids in the stomach. As the capsule dissolves, the balloon begins to unfold. Once the capsule has partially dissolved it separates and begins to release the balloon.

The system 1000 includes a navigation console with a display that is used during the balloon administration procedure to visualize the capsule transit during the swallow. The reference sensor 1015 is connected at one end to the SIU port and is placed on the patient. The patient is centered in front of the EM field generator such that the center of the generator posteriorly aligns with the distal aspect the sternum or Xiphoid process XP. The system operator then calibrates the navigation catheter sensor by holding the capsule in front of the patient's jugular notch JN while ensuring it is within the sensing field.

Figure 13:
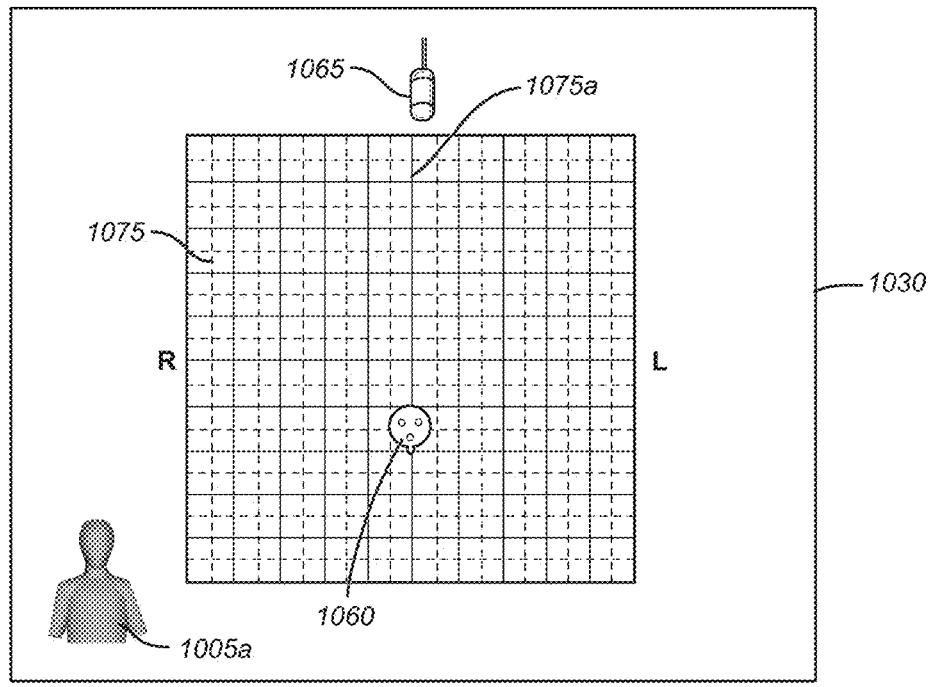
FIG. 13 illustrates a display 1030 with various indicia showing a position of the target sensor at the beginning of a balloon administration procedure, after calibration of the system and prior to swallowing the encapsulated balloon (e.g., "the swallow"). The target sensor is depicted as a capsule 1065 and a portion of an inflation catheter, an indication 1060 associated with the position of the reference sensor, and a 3D body model 1005a corresponding with the patient (not shown). The reference sensor indicia 1060 is depicted at the midline 1075a of a grid 1075 which may assist the user with determining the location of the swallowed target sensor.
Figure 14:
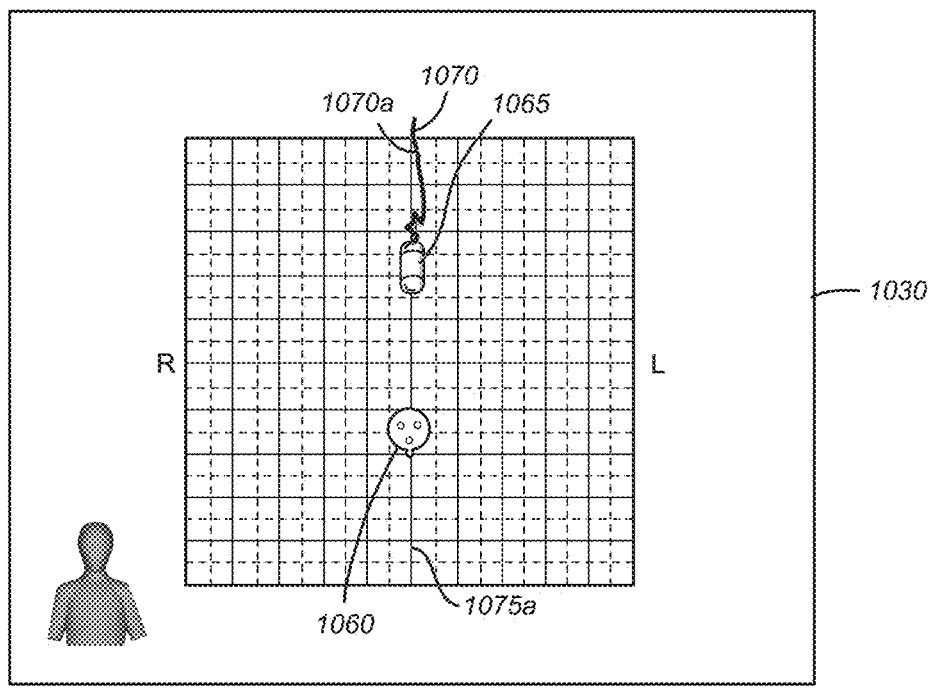
FIG. 14 shows the display 1030 of FIG. 13, including a typical trace 1070 corresponding to the path 1069a of the capsule early in the swallowing process, wherein the capsule is located within an upper portion of the patient's esophagus, in an orientation substantially parallel with the $Y_0$-axis of FIGS. 10A-10B.

FIG. 13 is an image of the console screen 1030 when calibration is complete and the patient is attempting to swallow the capsule. The reference sensor icon 1060 is displayed on the midline 1075*a*, and the capsule icon 1065 is displayed near the top of the screen 1030, above the grid 1075. A body model 1005*a* is shown in the lower right-hand corner of the display 1030 and mirrors the patient's body (e.g., on the side corresponding to the patient's right side). Once the patient swallows the balloon capsule the capsule icon 1065 will move down the midline 1075*a* on the screen 1030 as it descends in the esophagus as shown in FIG. 14. The path of the moving capsule (e.g., or target sensor 1010) will be plotted as a progressively growing trace 1070 that reflects, mirrors, corresponds to or correlates with the capsule's downward movement through the esophagus.

Figure 15:
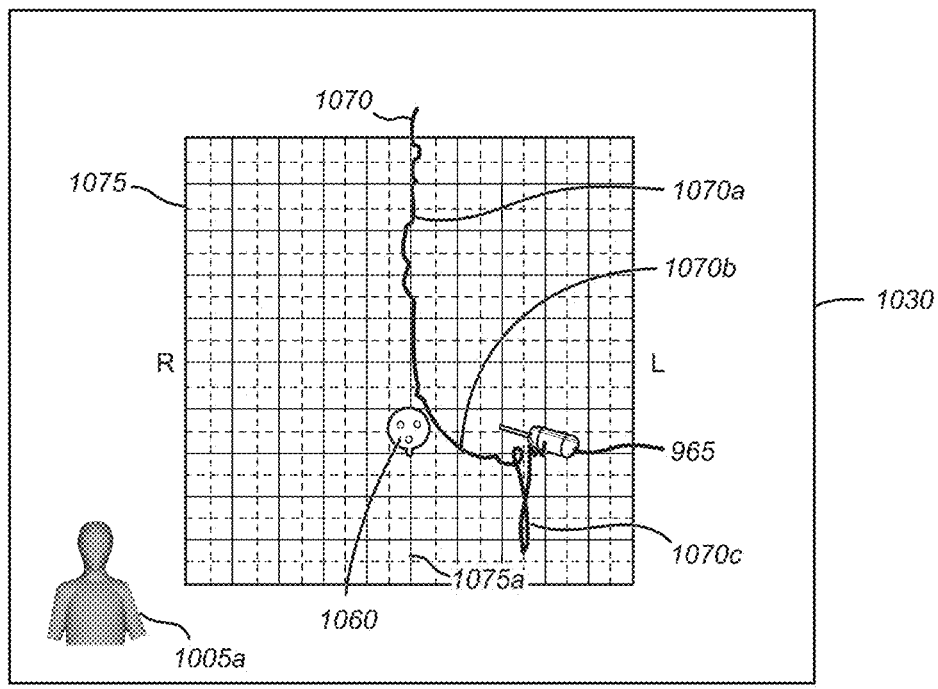
FIG. 15 shows the display 1030 of FIG. 13, wherein the trace 1070 shows that the corresponding capsule has passed from the patient's esophagus, through the GE junction, and into the stomach. The capsule indicia 1065 has offset left of lateral, or the midline 1075a, has rotated to a horizontal position, and has demonstrated vertical movement with patient respiration.
Figure 16:
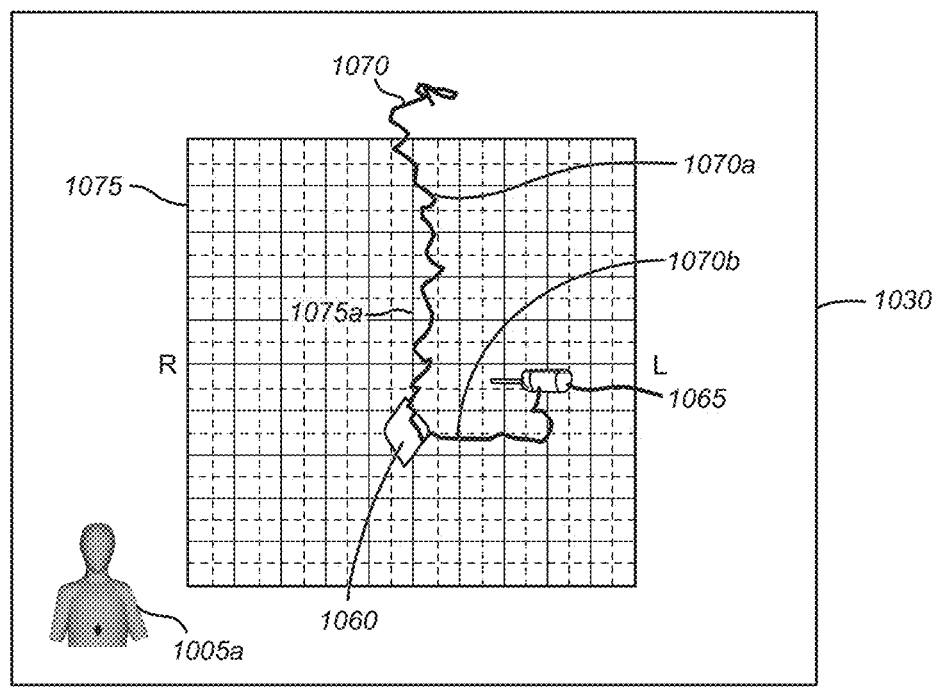
FIG. 16 illustrates a trace 1070 of another capsule swallow procedure, wherein the capsule indicia 1065 has moved left of the midline 1075a and rotated to a horizontal position, but the patient has not yet taken a deep breath to show vertical movement with respiration.

FIG. 15 is a representative image of the console screen 1030 in which the capsule track 1070 has moved into the stomach. The capsule icon 1065 has offset left of lateral, has rotated to a horizontal position, and has demonstrated vertical movement with patient respiration. The capsule icon 1065 may be displayed as 3D image, to ensure that the user can detect if the capsule had rotated forward or backward within the patient's stomach. Once the balloon is verified to be in the patient's stomach, the balloon may be inflated.

The body model 1005*a* on the screen 1030 mirrors the patient's upper body motion during balloon administration. This provides the user with additional patient movement information during replay of recorded administrations and provides assurance to the user that the capsule trace 1070 is providing accurate information of capsule behavior despite any patient movement within the EM field.

In some embodiments, an on-screen timer (not shown) is added to the display 1030, such as to the right-hand portion of the display near the recording controls, so as to capture the elapsed time of the recorded balloon administration on the screen 1030 and in saved videos of the balloon administrations. An on-screen timer provides a reference for the timing of capsule behaviors and any other information of note such as patient movement.

In some embodiments, shoulder sensors may be used to orient the 'midline 1075a' reference sensor 1015 during calibration to ensure that the sensor can accurately trace the capsule path through the patient's esophagus and into the stomach.

In some embodiments, the reference sensor calibration method or procedure provides calibration with only one reference sensor placed on the patient's xiphoid process XP, thus removing the requirement for shoulder sensors. The orientation of the single reference sensor 1015 is tracked by the software during the balloon swallow and provides the patient orientation information that is used to indicate patient movement on the body model 1005a described above.

Algorithm for Calibrating the System

During a balloon administration procedure, the system 1000 of certain embodiments provides a method of determining when a swallowable intragastric balloon reaches a patient's stomach after travelling through the upper torso digestive tract. The system 1000 includes software that uses an algorithm to process data collected from a reference sensor 1015 and a target sensor 1010 and the EM emission system described herein. Using the processed data, the system infers the location of an intragastric balloon within the patient's upper torso when the patient swallows an encapsulated balloon by normal peristaltic motion.

In certain embodiments, the system provides a technique to accurately infer when a swallowable intragastric balloon reaches the patient's stomach without the aid of an imaging system, such as an x-ray device or an ultrasound or an endoscopic system. For example, by observing the location and behavior of the target sensor 1010, which is depicted on a display 1030 as a capsule icon 1065 or other indicia, the user can accurately infer the location of the encapsulated balloon, such that the user can determine when the encapsulated balloon has passed from the esophagus and into the patient's stomach, where the balloon may be safely inflated.

The system 1000 of certain embodiments employs an algorithm that takes input from the orientation of two sensors tracked through an electromagnetic tracking system. The first sensor, referred as the target sensor 1010, is located in or on the swallowable encapsulated intragastric balloon and/or in the distal end of an attached navigation catheter. The second sensor, referred as the reference sensor 1015, is located on the patient's body, such as on the xiphoid process XP near the sternum. The algorithm is used to process data received from the sensors 1010, 1015, so as to display the position of the sensors on a 3D coordinate system of a computerized system 1000. The system 1000 uses the algorithm to calculate, find or determine a projection that provides the user a point of view that is relevant from a clinical point of view. The inputs are the two orientations of the sensors 1010, 1015 with respect to the field generator provided as Hamiltonian or Eulerian coordinates.

With reference to FIGS. 10A-16, the algorithm is described as follows. Let $\vec{e}^F = (\vec{X}_F, \vec{Y}_F, \vec{Z}_F)$ be the magnetic field generator coordinate orthonormal basis with $\vec{Z}_F = (0, 0, 0)$ parallel to the ground and $X_F$ and $Y_F$ free to rotate around $Z_F$. The reference sensor coordinates respect to $\vec{e}_F$ are retrieved as three translations and a quaternion $[\vec{T}^R, \vec{Q}^R] = [T_x^R, T_y^R, T_z^R, Q_0^R, Q_x^R, Q_y^R, Q_z^R]$. The target sensor coordinates respect to $\vec{e}_F$ are retrieved as three translations and a quaternion $[\vec{T}^T, \vec{Q}^T] = [T_x^T, T_y^T, T_z^T, Q_0^T, Q_x^T, Q_y^T, Q_z^T]$.

Prior to the patient swallowing the intragastric balloon, the system 1000 is calibrated. During initial calibration of the system 1000, the reference sensor 1015 is positioned on the patient's body 1005, in the proximity of the xiphoid process XP, such as described elsewhere herein (see FIGS. 10A-10C). Additionally, the target sensor 1010 is positioned in the proximity of the jugular notch JN on the patient's body.

Let $\vec{RT}_0 = \vec{T}_0^T - \vec{T}_0^R$, be the direction vector between the reference and the target sensor during the initial calibration, and let $\vec{Y}_0$ be the vector rejection of $\vec{RT}_0$ from $\vec{Z}_F$.

Given a unit quaternion in the form $q = q_0 + q_x \vec{i} + q_y \vec{j} + q_z \vec{k}$ the three dimensional rotation matrix is given by the matrix $$Q = \begin{bmatrix} (1 - 2q_y^2 - 2q_z^2)(2q_xq_y - 2q_zq_0)(2q_xq_z + 2q_yq_0) \\ (2q_xq_y + 2q_zq_0)(1 - 2q_z^2 - 2q_z^2)(2q_y2_z - 2q_xq_0) \\ (2q_x - 2q_yq_0)(2q_yq_z + 2q_xq_0)(1 - 2q_x^2 - 2q_z^2) \end{bmatrix}$$

Let $\vec{R}_0^N = Q^R \vec{Z}_F$ be the normal vector of the reference sensor; let $\vec{Z}_0$ be the rejection of $\vec{R}_0^N$ from $\vec{Y}_0$, let $\vec{X}_0 = \vec{Y}_0 \vec{B} \vec{Z}_0$, let $\vec{e}_0 = \vec{X}_0, \vec{Y}_0, \vec{Z}_0$ be the initial calibration orthonormal basis, let $M_0$ the orthonormal matrix having for rows the coordinates of $\vec{e}_0$, and let $Q_0$ be the quaternion derived from $M_0$.

The calibration rotation in quaternion that need to be applied to the coordinates of the target sensor and other reference sensor to gather the display coordinates is provided by formula (1).

$$q_{cal} = Q_0 \cdot Q_0^R \tag{1}$$

Once the initial calibration rotation is calibrated, the display transformation matrix which needs to be applied to the sensor coordinate $[\vec{T}, \vec{Q}]$ following the transformation to an identity matrix: such as rotation of $\vec{Q}$, translation of $\vec{T} - \vec{T}^R$, and rotation of $q_{cal} \overline{Q^R}$, wherein $\overline{Q^R}$ is the conjugate of the reference sensor quaternion formula (2).

$$\text{sensor}_{display} = (QI + (\vec{T} - \vec{T}_R)) \cdot q_{cal} \overline{Q^R} \tag{2}$$

By ignoring the translation components of the reference sensor by adopting formula (3), it is possible to approximate the rotations of the patent.

$$\text{body}_{display} = q_{cal} Q^R \overline{(q_{cal} Q_0^R)} \tag{3}$$

The algorithm (4) approximates the distance traveled by the capsule once swallowed by taking the sums of all detected movements between subsequent positions:

$$d = \Sigma_{t=0} |\vec{T}_t - \vec{T}_{t-1}|$$ (4)

In certain embodiments, the computer device or processor, and software are used in conjunction with the EM tracking device to implement the algorithm (4) described above. The system 1000 displays the inputs by projecting them on an external device, such as a monitor 1030, by adopting the algorithm (4) above. The system 1000 may be configured to display or project the inputs in either 2D or 3D space. The system 1000 uses software with the algorithm (4) to infer movements of the patient's body and displays the inferred movements on the screen/display 1030, such as via projecting the movements as a body model 1005*a* that mirrors the patient's body movements. In some embodiments, the system 1000 stores the inputs of the system 1000 for further analysis and/or for replay.

In certain embodiments, the system 1000 may be characterized by software with an initial calibration routine. The system 1000 is configured to identify the initial patient orientation by using a calibration routine. During the initial calibration, the system 1000 may identify if the patient is moving, if the sensors 1010, 1015 are not positioned correctly, or if the patient is not positioned correctly with respect to the EM field generator (e.g., EM emitter). Once calibration is completed, the system 1000 may compensate for patient movements, such as translations and rotations. The system 1000 may also compensate for movements of the EM field generator. After calibration, the system 1000 displays the location/position of the capsule 1010 (e.g., movement of the target sensor 1010) relative to the location/position of the reference sensor 1015, which is fixed with respect to the patient's body, in 3-dimensional space. The system 1000 combines the inputs from the reference sensor 1015 to display a model representation 1005*a* of the patient's body and display its movements on the screen 1030.

Using the algorithm (4) and software, the system 1000 calculates the positions of the capsule 1010 with respect to the reference sensor 1015, which are displayed as a tracking line 1070 that is formed by plotting the sequential positions of the capsule 1010 as it progresses through the patient's esophagus and into the stomach.

In clinical trials, it has been observed that, due to patient anatomy, the capsule undergoes at least one of four characteristic movements as it passes through the GE junction and into the stomach. Since the capsule is tracked on the display 1030 through the swallow process, the user may use these movements to determine or infer if or when the intragastric balloon has passed from the esophagus and into the stomach. These four movements include capsule offset from midline 1075*a*, capsule rotation from a vertical orientation toward a horizontal orientation, capsule acceleration, and deep breath movements.

Figure 10C:
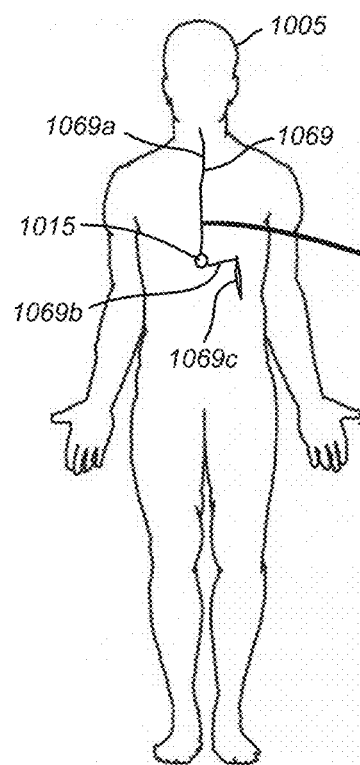
FIG. 10C illustrates a correspondence between the path of the swallowed capsule (e.g., the intragastric device and the target sensor 1010) and a trace 1070, of the capsule's path 1069 through the body 1005, shown or projected on a display 1030. The path 1069 through the patient's body includes an upper first portion 1069a, a second portion 1069b and optionally a third portion 1069c. These portions of the path 1069 correspond with the trace 1070 on the display 1030. When the patient swallows the target sensor 1010, in conjunction with the encapsulated intragastric device, a first portion of the trace 1070, denoted by 1070a, is observed (on the display 1030) to be drawn, to grow, or to be displayed moving downward toward the reference sensor icon 1060. This first portion 1070a is associated with passage of the target sensor 1010 through the patient's esophagus and is generally parallel with the $Y_0$-axis and/or the midline 1975a. The second portion of the path, denoted by 1069b, is associated with passage of the target sensor 1010 from the esophagus, through GE junction and into the stomach. As the target sensor passes through the GE junction, the second portion 1070b will be drawn and depicted on the display 1030 as a lateral shift left of the midline 1017a. While passing through the GE junction, the capsule 1065 may be observed to rotate about 45° or more, or at least 45°, from the vertical orientation of trace portion 1070a to or toward a horizontal orientation (e.g., parallel with the $X_0$-axis). Additionally, as the target sensor 1010 passes through the GE junction, the capsule 1065 may be observed to accelerate or move faster. The third portion of the path 1069, denoted by 1069c, is associated with the patient taking a deep breath (e.g., upon instruction by the physician). When the patient breaths deeply, the stomach moves down and then back up. Accordingly, if the target sensor 1010 is in the stomach (e.g., with the intragastric device), the capsule 1065 will appear to move down and then up, thereby producing trace 1070c.
Figure 10C:
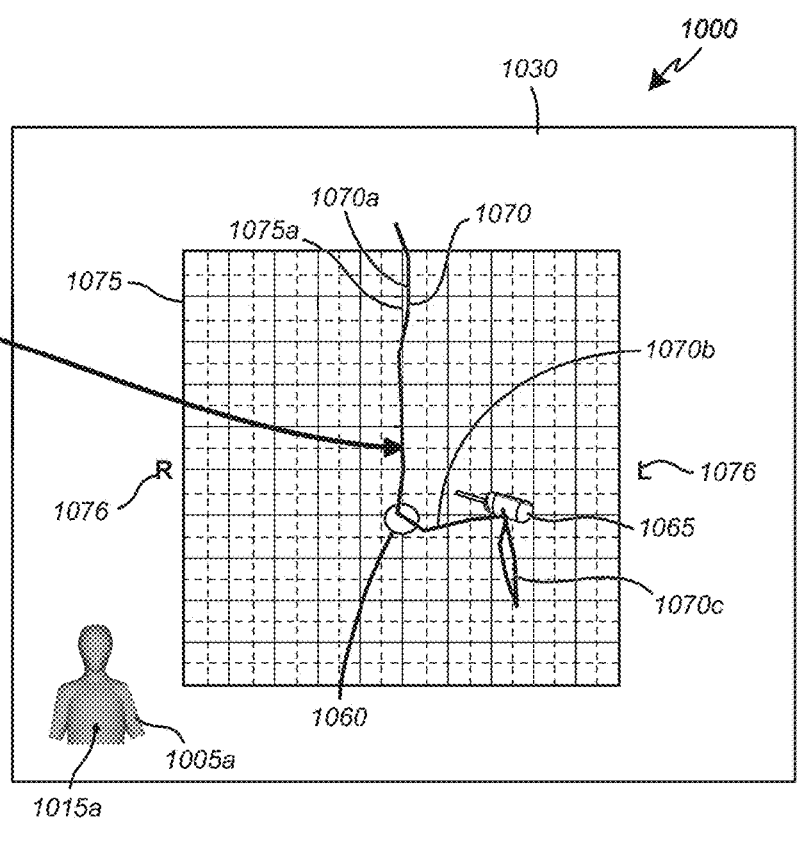

FIG. 10C illustrates the path of a capsule through a patient's body torso (see line 1069) and how those movements are displayed on a monitor 1030 of the system of an embodiment. In a normal human body 1005, wherein the body is standing vertically on the floor, the esophagus is vertical at or near the midline 1075*a*, and the stomach is located on the left side of the body.

Before the patient swallows the capsule (e.g., the target sensor 1010), such as during calibration, the capsule 1065 appears at the top of the display 1030 (see FIGS. 10C-13). As the capsule is swallowed, it travels down the esophagus (see line 1069*a*). When traveling down the esophagus the capsule generally presents itself in a vertical orientation. This movement through the body 1005 is displayed as a generally vertical line 1070*a* of increasing length at the patient's midline 1075*a*, which is parallel with the $Y_0$ axis shown in FIGS. 10A-10B. As the swallow progresses, the track 1070*a* lengthens toward the reference sensor indicia 1060 (see FIGS. 10C and 14). This movement will be observed in all successful swallows. Lack of vertical movement is indicative of the capsule being stopped or stuck in the esophagus.

If the patient successfully swallows the capsule 1010, it will pass through the GE junction and into the stomach. Since the stomach is to the left of the esophagus, the capsule 1010 moves to the left of the patient's midline 1075*a*. This movement may be referred to as being offset left of lateral. On the display 1030, as shown in FIG. 10C, the capsule icon 1065 will appear to move significantly to the left of the lateral line, from the initial $\vec{RT_0}$ direction. Accordingly, the track 1070*a* will move or lengthen toward the left adding portion 1070*b*. It is noted that while a left of lateral offset 1070*b* may be observed during most balloon administrations, it is not observed with all patients.

As the capsule passes through the GE junction, the capsule 1010 cannot stay in a vertical orientation. After entry into the stomach, the capsule 1010 rotates as it rests on the stomach fluid. The rotation of the capsule 1010, when entering the stomach, is more than 45 degrees toward a horizontal orientation. This rotation may occur over a period of time that varies between patients and may take only a few seconds, or it could occur over a few minutes. Accordingly, on the display, the capsule icon 1065 may appear to rotate about 45-degrees (FIG. 15) to about 90-degrees (FIG. 16) counter-clockwise. It is foreseen that in some patients, the capsule icon 1065 may appear to remain in a vertical orientation or to rotate in a clockwise direction.

In clinical trials, it has been observed that as the capsule travels through the GE junction and falls into the stomach, it may accelerate. The system 1000 is configured to detect such as acceleration via the aforementioned algorithm (4) and displays this movement of the display. For example, when near the reference sensor icon 1060, the capsule icon 1065 may appear to suddenly move rapidly or shoot from the esophagus (see line 1070*a*) to the patient's left (see line 1070*b*). This accelerated rate of movement may not be observed during all balloon administrations.

By one or more of the aforementioned movements, the user may infer that the capsule 1010 has entered the stomach. However, to increase the level of safety, the user may confirm capsule location in the stomach by performing a confirmation procedure. During the confirmation procedure, while observing the capsule icon 1065 movements on the screen 1030, the user asks the patient to take a deep breath. Since the stomach is located just below the diaphragm, the stomach will be moved up and down (see FIG. 10C, line 1070*c*) when the patient takes a deep breath (e.g., deep respiration). If the capsule 1010 is in the stomach, the capsule icon 1065 will move up and down on the screen 1030, as is illustrated by line 1070*c*. From this affirmative confirmation, the user may infer or decide that the capsule 1010 is indeed in the patient's stomach, and that it is safe to inflate the balloon. If the system 1000 does not display the up and down line 1070*c* when the patient breaths deeply, the user may infer that the capsule 1010 is not in the patient stomach (e.g., still in the esophagus). In such a situation, the user may ask the patient to drink some water, so that the peristaltic movements of swallowing the water move the capsule 1010 from the esophagus and into the stomach. Then, the confirmation procedure could be performed again. If, after drinking water, the confirmation procedure shows the capsule icon 1065 moving up and down movement (line 1070*c*), the user may proceed to balloon inflation. If the capsule 1010 still does not appear to be in the stomach, the user may again perform the confirmation procedure. The user may choose to repeat the confirmation procedure several times, before deciding that the capsule 1010 has not been successfully swallowed.

If the user infers that the capsule 1010 has not been swallowed successfully, the user may have the capsule 1010, and thus the uninflated balloon, endoscopically removed from the patient 1005.

During a balloon administration procedure, a variety of problems may occur. For example, the power cord may be inadvertently disconnected from the power source, the one of the sensors may be disconnected from the system, the reference sensor might fall off of the patient, or the patient may move out of the tracking volume. In certain embodiments, the system can recover from any type of sensor disconnection, power discontinuity or the like. For example, the system may store calibration data to allow the user to use previous calibration data to recalibrate the system. In another example, the system may be recalibrated using a recalibration tool, such as described below.

In another embodiment, for each sensor, there is provided a translation vector T ($T_x$, $T_y$, $T_z$) and a quaternion Q($Q_x$, $Q_y$, $Q_z$, $Q_0$) with respect to the field generator coordinate system. When displayed, each sensor is shown in such a way that the projection plane is identified during the calibration phase. The directions of the body line and a line parallel to ground are inferred from the local axis of the sensor. After the initial calibration, the projection plane is obtained by applying a rigid body transformation that will transform the sensor back to its calibrated position. The projection plane preserves relative distances with respect to the reference sensor. The approach that was adopted to determine a suitable transformation is based on the Change of Basis Theorem of Linear Algebra, wherein S=($e_1$ $e_2$ ... $e_n$) is a basis for a vector space V and v is another vector in V. When A is the matrix whose column vectors are the vector of the basis ($e_1$ $e_2$ ... $e_n$), then [Vs]=$A^{-1}$v.

To determine the inverse of an orthogonal matrix theorem, let A be an orthogonal matrix, where its columns are the vectors of an orthonormal basis. Then its inverse is its transposition: $A^{-1}=A^T$.

Assuming that $R_{XYZ}$ are the local coordinates of the reference sensor 1015, and that $F_{XYZ}$ are the local coordinates of the field generator, then ($e_1$, $e_2$, $e_3$) is the orthonormal basis for transformation, which is a coordinate set for the patient's body 1005. For example, $e_2$ is the component vertical to the ground, of vector joining midline sensor (e.g., reference sensor 1015) and capsule sensor 1010. This vector is obtained during the calibration procedure by placing the target sensor 1010, such as on the attached distal end of the navigation catheter, on the patient jugular notch JN. Next, the normal to the reference sensor $R_Z$ is obtained by transforming the Z vector by the $Q_R$ quaternion. Then, $e_3$ is the component of the normal to the reference sensor on the plane $F_z$–$e_1$. Also, $e_1$ the normalized cross product between $e_2$ and $e_3$ and ($e_1$, $e_2$, $e_3$) is the orthonormal basis of transformation used for the projection.

Rigid body transformation: After calibration, the transformation that will rotate the body to its calibrated position is obtained by quaternion algebra and specifically is composed by two rotations: the current sensor rotation, and the differential rotation (quaternion division) between the initial calibrated rotation and the current midline 875*a* sensor rotation.

Recalibration Tool

In some circumstances, the reference sensor 1015 may inadvertently be disconnected from the system, a tracking session may be inadvertently discontinued, or the system 1000 may lose power, after capsule tracking has begun.

In embodiments wherein shoulder sensors (see FIG. 3B, 322*a*) are used for reference sensor calibration and the system experiences a loss in power, the reference sensor 1015 (or midline sensor 322*b*) can be recalibrated when power is restored since the shoulder sensors are still present.

When a single reference sensor 1015 is used (e.g., no shoulder sensors 322*a*), the user initially uses the navigation catheter to calibrate the single reference sensor 1015. The system 1000 or the reference sensor 1015 can be recalibrated after the initial calibration and the patient has already swallowed the balloon, such as after loss of power loss, using a "recalibration tool" of the certain embodiments. The recalibration tool allows the user to recalibrate the system 1000 with respect to the reference sensor 1015. The recalibration tool includes a dummy capsule with an electromagnetic induction sensor similar to the reference sensor 1015. The recalibration tool sensor may be a 6 DOF sensor or a 5 DOF sensor. In some embodiments, the recalibration tool sensor is attached to an electrical cable with a connector that is compatible with the sensor interface unit 230, 330. In other embodiments, the recalibration tool is configured as a navigation catheter 600, 1025 with the dummy capsule (with recalibration tool sensor) connected to the distal end.

To use the recalibration tool, the user disconnects the navigation catheter 1025 from the console SIU and connects the recalibration tool connector to the console SIU (e.g., upon system power up and initiation). The system 1000 is then calibrated with the recalibration tool in the same manner as the original calibration utilizing the navigation catheter attached to the encapsulated balloon. For example, the user holds the recalibration tool at the patient's jugular notch JN such that the longitudinal axis of the recalibration tools sensor is aligned with the $Y_0$-axis of FIG. 10A. Then the user initiates calibration of the system (i.e., "recalibration"). During the recalibration with the recalibration tool, the system 1000 determines a vertical axis (e.g., $Y_0$-axis, FIGS. 10A-10B), with respect to the reference sensor 1015 that is attached to the patient 1005 (described above). Once recalibration is complete, the user disconnects the recalibration tool from the SIU, reconnects the navigation catheter, and then continues with the balloon administration. If the patient has finished swallowing the balloon, the system 1000 will display the capsule (e.g., capsule icon 1065) as being located in the patient's stomach. In certain embodiments, the accuracy of the target sensor 1010 is not impacted by the recalibration procedure. Since the target sensor 1010 is disconnected during recalibration and then reconnected to resume tracking the progress of the balloon into the stomach, there is no significant change to the relative accuracy between the reference sensor 1015 and target sensor 1010.

After recalibration and reconnection of the navigation catheter 1025, the capsule track 1070 will begin from the current, new or most recent capsule location. For example, after reconnection of the navigation catheter 1025, the capsule icon 1065 may appear (on the display 1030) to be in the esophagus or in the stomach. If the capsule is believed to be in the stomach, the user ensures that the capsule icon 1065 is significantly offset left of lateral from the center of the screen and/or that the capsule icon 1065 has rotated from a vertical to a horizontal orientation. Additionally, the user may have the patient take a deep breath and monitor the track 1070 of the capsule icon 1065 for vertical movement aligned with respiration.

Replaying a Previously Recorded Administration

Prior to administering an additional balloon (e.g., a second or third balloon), the user may wish to view the events of an earlier balloon administration. To facilitate this process, the system 1000 of an embodiment saves the data collected during a balloon administration for later play-back. For example, during balloon administration, the movement and orientation of the capsule icon 1065 in relation to the reference icon 1060 is displayed on the display 1030. The motion/progress of the capsule icon 1065 is graphically represented by a solid line 1070 that shows the current position of the capsule icon 1065 within the tracking volume. After the live tracking process has completed, the system 1000 saves the collected data and generates screen capture video as a data file or an event file. The files may be saved onto permanent or removable storage media. At a later time, the user can reload the data, from the storage media, back into the system memory to be replayed on the display, thereby enabling the user to review the recorded balloon administration. During replay of the data, the trace 1070 and capsule icon 1065 are displayed such that the trace 1070 shows the historical position of the capsule icon 1065 within the tracking volume by overlaying the trace 1070 and location of the capsule icon 1065 on the background grid 1075, with patient upper body movement during the recorded session are represented by the body model 1005*a*.

Swallowable Intragastric Device System

According to selected preferred embodiments, a swallowable intragastric device system is provided for use in conjunction with the electromagnetic locating and tracking system of an embodiment. The swallowable intragastric device system includes a swallowable and inflatable intragastric device, such as an intragastric balloon ("balloon"), and an inflation system for inflating the balloon when in the stomach. Referring to FIGS. 8A-9, the balloon 820 includes the following components: a volume-occupying subcomponent 821 comprising a wall with inner and outer surfaces defining a lumen, a self-sealing valve system ("valve system" 800) and an outer container ("capsule" 900). The volume-occupying subcomponent 821 and the valve system 800 are provided in a deflated and compacted state within the capsule 900, which is sized and shaped so as to be swallowable by normal peristalsis. The valve system 800 provides for addition of the inflation fluid, such as a gas or liquid, to the lumen of the balloon. A detailed description of intragastric devices and inflation dispensers for use with the system of the embodiments can be found in U.S. Pat. No. 8,647,358, issued Feb. 11, 2014, U.S. Patent Publication No. 2013/0226219 A1, published Aug. 29, 2013, U.S. Pat. No. 8,292,911, issued Oct. 23, 2012, U.S. Pat. No. 8,202,291, issued Jun. 19, 2012, and U.S. Patent Publication No. 2018-0110640 A1, published Apr. 26, 2018, each of which is incorporated herein in its entirety.

Balloons 820 according to the preferred embodiments are intended for ingestion by a patient (e.g., via peristalsis) and deployment without the need to resort to invasive methods. However, in certain embodiments, methods such as endoscopic placement can also be employed. The balloon 820 of the embodiments can be operable to conform to a compact delivery state which can be swallowed by a patient via normal peristalsis and with minimal discomfort. Once in the stomach, it is desirable for the balloon 820 to assume a substantially larger deployed state. In order to achieve the transition from a delivery state to a deployed state the balloon 820 is subjected to inflation.

Balloon

Referring to FIGS. 8A-9, in certain preferred embodiments, the volume-occupying subcomponent 821 of the balloon 820 is filled with a fluid (e.g., a gas or a liquid) using tubing which is subsequently detached and pulled away from the volume-occupying subcomponent 821. One end of the volume-occupying subcomponent 821 has a port connected to tubing of sufficient length that when unwound can span the entire length of the esophagus, from mouth to stomach. For example, in some embodiments, the volume-occupying subcomponent 821 has a self-sealing valve 800 at one end, which is connected to an inflation catheter for inflation of the balloon 820. An exemplary catheter 912 for use with the system of an embodiment is described above with respect to FIG. 9. Another exemplary catheter 600 for use with the system of an embodiment is described above with respect to FIG. 6A. The catheter 600, 912 can tear away or disconnect from the self-sealable valve 800 or septum 810, which self-seals once the volume-occupying subcomponent 821 is inflated. In an example, a user, e.g., a physician or other health care professional, secures one end of the catheter 600, 912 as the patient swallows the balloon 820 within the capsule 900. Once the balloon 820 is residing within the stomach, the user uses the catheter 600, 912 to transmit a fluid, such as air, nitrogen, $SF_6$, perfluorinated compounds, argon, other gas(es), vapors, saline solution, pure water, a liquid or vapor under external ambient conditions (e.g., room temperature) that forms a vapor or gas, respectively, at in vivo temperatures (e.g., $SF_6$), or the like, into the volume-occupying subcomponent 821 and thereby inflate it. The fluid may be or include a variety of other fluid or non-fluid materials as well, including physiologically acceptable fluids, such as aqueous fluids, e.g., water, water with one or more additives (e.g., electrolytes, nutrients, flavorants, colorants, sodium chloride, glucose, etc.), saline solution, or the like. After the volume-occupying subcomponent 821 is fully inflated, the catheter 600, 912 is released from the valve 800 and can be pulled out from inside the patient. The catheter 600, 912 may be released from the valve 800 in a number of manners, such as by applying a gentle force, or tug, on the catheter 800, or by an ejection mechanism that applies hydrostatic pressure to break the attachment between the catheter 600, 912 and the valve 800. The volume-occupying subcomponent 821 of the preferred embodiments is generally formed of a flexible material forming a wall with exterior and interior surfaces and which defines an interior cavity or lumen. Various of the herein-described subcomponents may be either incorporated into the wall or interior cavity of the volume-occupying subcomponent. The volume-occupying subcomponent 821 can vary in size and shape according to the patient's internal dimensions and the desired outcome. Spherical, spheroidal, oblate spheroidal or ellipsoidal volume-occupying subcomponents 821 are preferred in certain embodiments. The volume-occupying subcomponent 821 may be engineered to be semi-compliant, allowing the volume-occupying subcomponent 821 to stretch or expand with increases in pressure and/or temperature. Alternatively, in some embodiments, a compliant wall offering little resistance to increases in volume may be desirable. In some embodiments, the wall is noncompliant, so as to prevent stretching or expansion of the volume-occupying subcomponent 821.

It is advantageous for the wall of the volume-occupying subcomponent 821 to be both high in strength and thin, so as to minimize the compacted volume of the device 820 as it travels the esophagus of the patient. In certain embodiments, the volume-occupying subcomponent wall materials are manufactured with a biaxial orientation that imparts a high modulus value to the volume-occupying subcomponent 821.

The balloon composite wall materials can be of similar construction and composition as those described in U.S. Pat. No. 9,072,583 B2 to Brister et al., U.S. Pat. No. 8,647,358 B2 to Brister et al., U.S. Publication No. 2013/0226219 A1 to Brister et al., U.S. Pat. No. 8,292,911 B2 to Brister et al., and U.S. Pat. No. 8,202,291 B2 to Brister et al., the contents of each which is hereby incorporated by reference in its entirety. The materials are able to contain a fluid, preferably in compressed or non-compressed gas form, such as, e.g., $N_2$, Ar, $O_2$, $CO_2$, or mixture(s) thereof, or atmospheric air (composed of a mixture of $N_2$, $O_2$, Ar, $CO_2$, Ne, $CH_4$, He, Kr, $H_2$, and Xe) that simulate gastric space concentrations. In certain embodiments, the balloon is able to hold the fluid (gas) and maintain an acceptable volume for up to 6 months, preferably for at least 1 to 3 months after inflation. In some preferred embodiments, the balloon is able to hold the fluid (gas) and maintain an acceptable volume for about 8 months, about 9 months, about 10 months, about 11 months, about 12 months or longer than 12 months. Particularly preferred fill gases include non-polar, large molecule gases that can be compressed for delivery.

The preferred shape for the inflated balloon 820 in final assembly is ellipsoid, preferably spheroid or oblate spheroid, with nominal radii of from 1 inch (2.5 cm) to 3.5 inches (8.89 cm), a nominal height of from 0.25 inches (0.6 cm) to 3 inches (7.6 cm), a volume of from 90 $cm^3$ to 350 $cm^3$ (at 37° C. and at internal nominal pressure and/or full inflation), an internal nominal pressure (at 37° C.) of 0 psi (0 Pa) to 15 psi (103421 Pa), and a weight of less than 15 g (e.g., when filled with a gas). When the balloon is filled with liquid, the weight of the filled balloon will include the weight of the liquid filling the balloon. For example, if the fill fluid is 250 $cm^3$ of saline, the saline-filled balloon will weigh less than about 266 g. The balloon is configured to retain more than 75% of the original nominal volume for at least 25 days or more, or at least 30 days, preferably for at least 90 days when residing in the stomach. In more preferred embodiments, the balloon is configured to retain more than 75% of its original nominal volume for at least 6 months, at least 7 months, at least 8 months, at least 9 months, at least 10 months, at least 11 months or at least 12 months. In another preferred embodiment, balloon is configured to retain more than 80% of its original nominal volume for at least 6 months, more preferably at least 9 months, at least 10 months, at least 11 months or at least 12 months. In another preferred embodiment, the balloon is configured to retain more than 85%, more than 90% or more than 95% of its original nominal volume for at least 6 months. The inflatable balloon is configured for inflation with an appropriate mixture of gases so as to deliver a preselected volume profile over a preselected time period (including one or more of volume increase periods, volume decrease periods, or steady state volume periods).

Outer Container

The balloon 820 is preferably provided in a deflated and folded state in a capsule 900 (FIG. 9) or other retaining, containing or coating structure ("outer container"). The outer container is preferably in the form of a standard push-fit gelatin capsule, with the push-fit relied upon for containing the deflated/folded balloon; however, a gelatin wrap can advantageously be employed in certain embodiments. The outer container is sized and shaped to enable the patient to swallow the balloon via normal peristalsis and with minimal discomfort. Preferably, the outer container has a length (longest dimension) of from about 0.95 inches (2.4 cm) to 2.5 inches (6.3 cm) and a diameter or width of from about 0.35 inches (0.9 cm) to about 0.9 inches (2.4 cm). The volume of the inner container is preferably from about 1.2 ml to about 8.25 ml. In a preferred embodiment, the outer container is a capsule 900. When swallowed, the outer capsule degrades (e.g., separates, dissolves, or otherwise opens) due to contact with ingested fluid (e.g., water intake) and/or gastric fluid and preferably degrades within 5 minutes or less, more preferably within 2 minutes or less, so as not to cause discomfort to the patient while the balloon/catheter tube is in place.

Self-Sealing Valve System

Referring to FIGS. 8A-8C, in preferred embodiments, a self-sealing valve system 800 which contains a self-sealing septum 810 housed within a metallic concentric cylinder 816 is provided. In the inflatable configuration of the intragastric device, or intragastric balloon 820 the self-sealing valve system 800 is preferably adhered to the underside, or inner surface, of the wall material such that only a portion of the valve 800 protrudes slightly outside of the balloon exterior surface to ensure a smooth exterior surface. The septum 810 is inserted or otherwise fabricated into the smaller cylinder of the concentric metallic retaining structure 816 that is preferably cylindrical in shape. When attaching the catheter 600, 912 (FIGS. 6A and 9, respectively) to the intragastric device 820, the smaller cylinder within the larger cylinder controls alignment of the catheter needle sleeve/needle assembly 612 with the septum (described below), provides a hard barrier so that the catheter needle 612 does not pierce the balloon material (needle stop mechanism), and provides compression such that the valve/septum 810 re-seals after inflation and subsequent needle withdrawal.

The concentric valve system 800 can also provide radio opacity during implantation and is preferably titanium, gold, stainless steel, MP35N (nonmagnetic, nickel-cobalt-chromium-molybdenum alloy) or the like. Non-metallic polymeric materials can also be used, e.g., an acrylic, epoxy, polycarbonate, nylon, polyethylene, PEEK, ABS, or PVC or any thermoplastic elastomer or thermoplastic polyurethane that is fabricated to be visible under x-ray (e.g., embedded with barium).

The concentric valve system 800 can also provide radio opacity during implantation and is preferably titanium, gold, stainless steel, MP35N (nonmagnetic, nickel-cobalt-chromium-molybdenum alloy) or the like. Non-metallic polymeric materials can also be used, e.g., an acrylic, epoxy, polycarbonate, nylon, polyethylene, polyetheretherketone ("PEEK"), acrylonitrile butadiene styrene ("ABS"), or polyvinyl chloride ("PVC") or any thermoplastic elastomer or thermoplastic polyurethane that is fabricated to be visible under x-ray (e.g., embedded with barium).

A larger, outer cylinder 816 of the concentric valve housing 816 contains a slightly harder durometer material 812 than the inner cylinder (50 Shore A or greater), but is also preferably silicone. The purpose of using a harder durometer material 812 is to ensure sealing when connected to the needle sleeve 614, 914 for inflation. The silicone 812 located in the outer ring of the concentric valve 800 is adhered to the balloon 820 from the inside surface. The entire outer cylinder is filled and a small circular lip 812a of this same material is provided that is slightly larger than the diameter of the inner cylinder and extends to the outside surface of the balloon. The lip 812a is compatible with the bell-shaped needle sleeve 614, 914 and provides sealing to enhance connection of the valve 800 to the catheter 600, 912 to withstand the inflation pressures applied and also increases the tensile force of the catheter. This silicone lip 812a preferably does not protrude past the balloon surface more than 2 mm to ensure that the balloon surface (e.g., outer or exterior surface) remains relatively smooth and does not cause abrasion or ulcerations of the mucosa. It is designed to provide compressive forces against the needle sleeve 614, 914 of the catheter 600, 912 for inflation and detachment whereby when connected to the needle sleeve 614, 914 of the inflation catheters 600, 912, the connection force during the inflation process can withstand up to 35 PSI. The seal is then broken during detachment using hydrostatic pressure that is more than 40 PSI and less than 250 PSI to break the connection force. In one exemplary embodiment, the seal is broken when the hydrostatic pressure is from about 160 PSI to about 210 PSI, from about 170 PSI to about 200 PSI, or from about 180 PSI to about 190 PSI. Two additional retaining rings 818, preferably made of the same material as concentric valve, are included in the valve system 800 to further enhance the seal between the metal and the valve silicone 812 and provide additional mechanical support to ensure proper mechanical fit and are intended to disrupt slippage of the silicone material 812 from the hard (metallic) valve system 800 (causing an increase in tensile force).

The valve structure 800 for the inflatable intragastric balloon uses a mechanical fit mechanism to provide the functions of the self-sealable valve 800 for inflation by the catheter 600, 912 and subsequent catheter detachment; however, primer and/or adhesive may be used to provide additional support in maintaining the assembly. The configuration can be modified by modifying the surfaces of the metal components, making them more sticky or slippery to provide the desired mechanical/interference fit. The interference fit between the valve 800 and the catheter 600, 912 can be modified to change the pressure requirements for inflation and/or detachment. Additional assemblies can include overmolding the metallic portions or the concentric system in silicone such that additional support rings to ensure the mechanical fit and the tensile strength and forces required to sustain the assembly during catheter inflation and detachment can be omitted. The valve system 800 is preferably attached to the inner surface of the balloon 820 such that a force greater than 9 lbs. (40 N) is required to dislodge the valve system. In exemplary embodiments, the valve system is attached to the balloon inner surface such that a force greater than 5 lbs. (22.24 N), greater than 6 lbs. (26.69 N), greater than 7 lbs. (32.14 N) or greater than 8 lbs. (35.59 N) is required to dislodge the valve system.

Inflation Fluid Container

The inflation fluid container is employed to control the amount or volume of fluid placed inside of the balloon. This can be in the form of a canister of, e.g., PVC, stainless steel, or other suitable material. The container can also be in syringe form. The materials employed are able contain a fluid, preferably in gas form, e.g., compressed or non-compressed $N_2$, Ar, $O_2$, $CO_2$, or mixture(s) thereof, or compressed or non-compressed atmospheric air (a mixture of $N_2$, $O_2$, Ar, $CO_2$, Ne, $CH_4$, He, Kr, $H_2$, and Xe). In certain embodiments, the inflation fluid is an inert gas, such as but not limited to nitrogen, as well as $SF_6$, $C_2F_6$, $C_3F_8$, $C_4F_{10}$, $C_4F_8$, $C_4F_8$, $C_3F_6$, $CF_4$, and $CC-F_2-CF_3$. The balloon composite wall materials and respective diffusion gradients and gas permeability characteristics are used to select a fluid for inflation of the intragastric balloon, so as to provide a desired volume profile over time for the inflated balloon. The inflation fluid container materials are selected to ensure no or minimal diffusion or leakage of the fluid before it is connected to the y-arm connector or valve of the inflation catheter. The inflation fluid container preferably incorporates a pressure gauge and a connector. It can also contain a smart chip that notifies the healthcare professional of whether inflation is successful or if the balloon should be detached due to an error in the system.

To maintain "swallowability" of the balloon and to ensure comfort of the patient during the procedure, it is preferred to minimize the amount of time the catheter is placed in the mouth/esophagus. Timing of inflation is can be selected so as to minimize time in place. The outer container-catheter assembly, once swallowed, takes approximately 4-8 seconds to reach the stomach. Once in the stomach, the Inflation source container can be attached to the valve or port of catheter system. Inflation timing can be controlled by selecting the length of catheter, diameter of the catheter tube, the starting temperature, and the starting pressure. Using the Ideal Gas Law for nitrogen and Boyle's Law ($P_1V_1=P_2V_2$) the amount of starting volume/pressure can be derived, where temperature is controlled inside the inflation source container to match that of the body. It is desired to have an inflation time after swallow of less than 5 minutes, and preferably 2-3 minutes, before balloon detachment and catheter withdrawal. The inputs use to derive inflation of the balloon (preferably in less than 3 minutes) include inflation container volume, type of inflation fluid (preferably a compressed gas or compressed gas mixture), starting pressure, catheter length and diameter, and desired end volume and pressure of the balloon. Thus, due to differences in diameter, a 2 French catheter system requires a higher starting pressure to achieve the same target balloon volume and pressure in the same time frame, assuming use of the same compressed gas formulation. In general, it is understood that starting with a higher pressure with the same flow rate/volume can decrease the inflation time.

The inflation source container provides feedback to the end user based on a pressure decay system. Where there is an expected starting pressure and expected ending pressure to indicate whether the balloon is inflated properly, there is no need for endoscopic visualization. Each scenario of expected pressure outputs can have its own tolerances around it to reduce possibilities of false positives, and the inflation fluid container can provide feedback based on these tolerances as to the status of balloon inflation and detachment. This is derived based on the Ideal Gas Law, where there is an expected end pressure based on the fixed volume of the balloon. If the pressure remains high and doesn't decay as expected, this can indicate a failure in the system (e.g., the balloon outer container did not dissolve, or the balloon is expanding in the esophagus because there is, e.g., a kink in the tube or other failure in the catheter system). For example, for a successful decay using nitrogen only as the inflation fluid, the starting pressure is 22 PSI to inflate a balloon to 250 cc and 1.7 psi (0.120 kg/cm$^2$) for a nylon-based material. To indicate successful balloon inflation, a math chip can be added to the inflation source container that provides at least one of a visual, audible, or tactile notification, or otherwise transmits a notification to a healthcare professional or administrator of whether inflation is successful or if there is an error in the system based on the pressure curve and a set of predetermined pressure tolerances and expected timing of inflation.

Another method for detection of any degree of constraint that the balloon may be experiencing (e.g., capsule dissolved but balloon is in the esophagus or duodenum, or balloon is in the stomach and the capsule has not dissolved by reading the gauge output is to employ an inflation canister that has at least two reservoirs (one large and one small) and at least two gauges, with one or more valves that allow for selection of gas release into the second reservoir or into the balloon itself. With two reservoirs, the larger reservoir can contain the total amount of fluid required to fill the balloon. A small amount of fluid can be released from the larger reservoir into the smaller reservoir first to determine the location of the balloon and its readiness for full inflation. If the small amount of fluid in the smaller reservoir is released into the balloon catheter and the feedback on the gauge of the smaller reservoir indicates that the pressure is high, this indicates that the balloon is still contained in the capsule and it is not ready to be inflated. When the gauge reads back a medium pressure level (e.g., 1-4 psi), this indicates that the balloon is in a constrained space, such as the esophagus or duodenum, and should not be inflated. When the balloon catheter's feedback as read on the gauge is approximately 1 psi, this indicates that the balloon is in the stomach and ready to be inflated. If the feedback is at 0 psi, this indicates is a leak in the balloon valve catheter system and that the device should be retrieved. Once the balloon is detected in the stomach space, then the larger reservoir is opened and the balloon is inflated to its desired pressure.

Alternatively, the balloon can be filled based on a starting pressure by using a spring mechanism, a balloon-within-balloon mechanism, or other pressure source. These mechanisms can potentially result in more predictable/consistent pressure decay curves, and again can have accompanying, predetermined tolerances for feedback back to the end user.
Exemplary Embodiments and Aspects Directed to Systems and Methods Alternatively, the balloon can be filled based on a starting pressure by using a spring mechanism, a balloon-within-balloon mechanism, or other pressure source. These mechanisms can potentially result in more predictable/consistent pressure decay curves, and again can have accompanying, predetermined tolerances for feedback back to the end user.

System 1: A system for electromagnetically locating an intragastric device in three dimensional space, in real time, the system comprising: an electromagnetic field generator configured to generate an electromagnetic field; a removably attachable inductive reference sensor adapted to be removably attached to a body positioned within the electromagnetic field, whereby a reference sensor signal is generated and the reference sensor signal carries reference sensor position information associated with a position of the reference sensor within the electromagnetic field at an instance in time; a swallowable target sensor adapted to be positioned within the electromagnetic field, whereby a target sensor signal is generated and the target sensor signal carries target sensor position information associated with a position of the target sensor within the electromagnetic field at the instance in time; a processor adapted to be in electronic communication with the reference sensor and the target sensor, so as to receive the reference sensor signal and the target sensor signal; wherein the processor processes the reference sensor signal so as to create one or more reference indicia associated with the position of the reference sensor at the instance in time; and the processor processes the target sensor signal so as to create one or more target indicia associated with the position of the target sensor at the instance in time; and a display adapted to be in electronic communication with the processor and configured to display the one or more reference indicia and the one or more target indicia.

System 2: System 1, wherein the instance in time comprises a plurality of instances in time.

System 3: System 2, wherein the processor iteratively processes the received reference sensor signal information associated with the plurality of instances in time, so as to generate a first series of indicia associated with each of the plurality of instances in time, the processor iteratively processes the received target sensor position information associated with the plurality of instances in time, so as to generate a second series of indicia associated with each of the plurality of instances in time; and the display displays the first series of indicia and the second series of indicia.

System 4: System 1, wherein the one or more reference indicia and/or the one or more target indicia comprise at least one of: a graphical representation associated with the body, and a reference sensor icon.

System 5: System 1, wherein the position of the target sensor inside the body is the stomach.

System 6: System 1, further comprising a swallowable intragastric device comprising the target sensor.

System 7: System 6, wherein, when the target sensor is swallowed, the target sensor position information is associated with the locations of the target sensor at each of the plurality of instances in time.

System 8: System 6, wherein the swallowable intragastric device comprises a swallowable inflatable intragastric balloon and an inflation catheter.

System 9: System 6, wherein the swallowable intragastric device comprises an inflation catheter, wherein a distal end of the inflation catheter comprises the target sensor.

System 10: System 6, wherein the swallowable intragastric device comprises an intragastric balloon.

System 11: System 10, wherein the intragastric balloon comprises a polymeric wall comprising one or more layers, wherein the polymeric wall is configured to have, under in vivo conditions, a permeability to $CO_2$ of more than 10 $cc/m^2/day$, and wherein the polymeric wall is configured such that, in vivo, the balloon is configured to gain in volume and in pressure during a useful life of the intragastric balloon when filled with the initial fill gas; a valve system configured for introducing the initial fill gas into the balloon in vivo; and an initial fill gas consisting of one or more inert gasses selected from the group consisting of nitrogen, $SF_6$, $C_2F_6$, $C_3F_8$, $C_4F_{10}$, $C_4F_8$, $C_4F_8$, $C_3F_6$, $CF_4$, and $C(ClF_2)$—$CF_3$.

Method 12: A method for electromagnetically locating an intragastric device inside the body of a patient, the method comprising: a) placing a reference sensor on a fixed location on a surface of a patient's body, wherein the reference sensor is configured to: i) sense an electromagnetic field directed at the body of a patient, and ii) produce a reference sensor signal in response to the sensed electromagnetic field, wherein ii) the reference sensor signal is associated with the reference sensor location; c) positioning a target sensor on the patient's body, wherein the target sensor: i) senses the electromagnetic field, and ii) produces a target sensor signal in response to the sensed electromagnetic field, wherein iii) the target sensor signal is associated with a plurality of target sensor locations along the path; d) creating one or more indicia by processing the signal associated with the locations of the reference and target sensors with a processor; e) introducing an intragastric device into the body of the patient, via swallowing, wherein the target sensor is releasably coupled with the intragastric device; f) producing a target sensor signal associated with a plurality of intragastric device locations within the patient's body; g) confirming a location of the intragastric device inside the patient's body based on the signal associated with the plurality of intragastric device locations within the patient's body; and h) displaying, on a display, the one or more indicia and an icon indicative of a current location of the intragastric device.

Method 13: Method 12, wherein the one or more indicia comprises at least one of: a graphical representation associated with the patient's body, and a reference sensor icon.

Method 14: Method 12, wherein confirming a location of the intragastric device inside the patient's body based further comprises at least one of: on a display, observing one or more target sensor indicia offsetting left of lateral from an initial vertical track; on the display, observing the track suddenly accelerate left of lateral; on the display, observing rotation of the one or more target sensor indicia rotation from a vertical configuration to a horizontal configuration; and on the display, observing vertical movement of the one or more target sensor indicia upon patient deep respiration.

Method 15: Method 12, wherein the location of the intragastric device inside the patient's body is the patient's stomach.

Method 16: Method 12, further comprising: a) when the icon is displayed in a position relative to the one or more indicia, wherein the displayed position is indicative of the intragastric device being in the patient's stomach, introducing an initial fill fluid into a lumen of the intragastric device through a releasable fluidly coupled catheter, whereby the intragastric device is inflated; and b) exposing the inflated intragastric device to the in vivo intragastric environment for a useful life of at least 30 days.

Method 17: Method 16, wherein the polymeric wall of the inflated intragastric device in the in vivo gastric environment has a permeability to $CO_2$ of more than 10 $cc/m^2/day$, and comprises a three layer $CO_2$ barrier material comprising a nylon layer, a polyvinylidene chloride layer, and a polyethylene layer.

Method 18: Method 16, wherein the polymeric wall of the inflated intragastric device in the in vivo gastric environment has a permeability to $CO_2$ of more than 10 $cc/m^2/day$, and comprises a three layer $CO_2$ barrier material comprising a nylon layer, an ethylene vinyl alcohol layer, and a polyethylene layer.

Method 19: Method 16, wherein the polymeric wall of the inflated intragastric device in the in vivo gastric environment has a permeability to $CO_2$ of more than 10 $cc/m^2/day$, and comprises a two layer $CO_2$ barrier material comprising a nylon layer and a polyethylene layer.

Method 20: Method 16, wherein the polymeric wall of the inflated intragastric device in the in vivo gastric environment has a permeability to $CO_2$ of more than 10 $cc/m^2/day$, and comprises a $CO_2$ barrier material comprising an ethylene vinyl alcohol layer.

Method 21: Method 16, wherein the initial fill fluid comprises $SF_6$ in one or more of liquid form, vapor form, or gaseous form.

Method 22: Method 16, wherein the initial fill fluid comprises gaseous $N_2$ and gaseous $SF_6$.

Method 23: Method 16, wherein the polymeric wall of the inflated intragastric device has, under conditions of an in vivo gastric environment, a permeability to $CO_2$ of more than 50 $cc/m^2/day$.

Method 24: Method 16, wherein the target sensor is coupled with the catheter.

Any of the features of an embodiment of the exemplary methods and systems is generally applicable (i.e., independently combinable with any of the aspects, embodiments, systems, or methods identified herein). Moreover, any of the features of an embodiment, aspect, system, or method identified herein is independently combinable, partly or wholly, with embodiment, aspect, system, or method described herein in any way, e.g., one, two, or three or more embodiments, aspects, systems, or methods identified herein may be combinable in whole or in part. Further, any of the features of any embodiment, aspect, system, or method identified herein may be made optional to other embodiments, aspects, systems, or methods identified herein. Any aspect or embodiment of a method can be performed by a system or apparatus of another aspect or embodiment, and any aspect or embodiment of a system or apparatus can be configured to perform a method of another aspect or embodiment.

The present invention has been described above with reference to specific embodiments. However, other embodiments than the above described are equally possible within the scope of the invention. Different method steps than those described above may be provided within the scope of the invention. The different features and steps of the invention may be combined in other combinations than those described. The scope of the invention is only limited by the appended patent claims.

All references cited herein are incorporated herein by reference in their entirety. To the extent publications and patents or patent applications incorporated by reference contradict the disclosure contained in the specification, the specification is intended to supersede and/or take precedence over any such contradictory material.

To the extent publications and patents or patent applications incorporated by reference herein contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, unless otherwise expressly stated, should be construed as open ended as opposed to limiting. As examples of the foregoing, the term 'including' should be read to mean 'including, without limitation' or the like; the term 'comprising' as used herein is synonymous with 'including,' 'containing,' or 'characterized by,' and is inclusive or open-ended and does not exclude additional, unrecited elements or method steps; the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise. In addition, as used in this application, the articles 'a' and 'an' should be construed as referring to one or more than one (i.e., to at least one) of the grammatical objects of the article. By way of example, 'an element' means one element or more than one element.

The presence in some instances of broadening words and phrases such as 'one or more', 'at least', 'but not limited to', or other like phrases shall not be read to mean that the narrower case is intended or required in instances where such broadening phrases may be absent.

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches. Where a range of values is provided, it is understood that the upper and lower limit, and each intervening value between the upper and lower limit of the range is encompassed within the embodiments.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A system for electromagnetically locating an intragastric device in three dimensional space, in real time, the system comprising:
    an electromagnetic field generator configured to generate an electromagnetic field;
    a removably attachable inductive reference sensor adapted to be removably attached to a patient's upper body positioned within the electromagnetic field, whereby a reference sensor signal is generated and the reference sensor signal carries reference sensor position information associated with a position of the reference sensor within the electromagnetic field at an instance in time, wherein the reference sensor is at least a 5 degrees of freedom sensor;
    a swallowable target sensor adapted to be positioned within the electromagnetic field, whereby a target sensor signal is generated and the target sensor signal carries target sensor position information associated with a position of the target sensor within the electromagnetic field at the instance in time, wherein the target sensor is at least a 5 degrees of freedom sensor;
    a processor adapted to be in electronic communication with the reference sensor and the target sensor, so as to receive the reference sensor signal and the target sensor signal; wherein
        the processor processes the reference sensor signal so as to create one or more reference indicia associated with the position of the reference sensor at the instance in time;
        the processor processes the target sensor signal so as to create one or more target indicia associated with the position of the target sensor at the instance in time; and
        the processor processes data received from the target sensor, the reference sensor and the electromagnetic field generator to generate a 3D body model that mirrors the patient's upper body to correct for relative movement of the patient's upper body, and to determine a location and orientation of the target sensor with respect to the patient's upper body; and
    a display adapted to be in electronic communication with the processor and configured to display the one or more reference indicia and the one or more target indicia and the generated 3D body model, and to provide a visual approximation of the target sensor's location within or outside of the patient's body,
    wherein the system is calibrated while the target sensor is outside of the patient's upper body,
    wherein the one or more reference indicia comprise a reference sensor icon and the one or more target indicia comprise a target sensor icon,
    wherein the processor is further configured to cause the display to plot a path of the target sensor icon as a progressively growing trace on the display that corresponds to the path taken by the target sensor as the target sensor moves through the patient's upper body in real time, and
    wherein the target sensor icon is a 2D or 3D capsule.

2. The system of claim 1, wherein the instance in time comprises a plurality of instances in time.

3. The system of claim 2, wherein:
    the processor iteratively processes the received reference sensor signal information associated with the plurality of instances in time, so as to generate a first series of reference indicia associated with each of the plurality of instances in time,
    the processor iteratively processes the received target sensor position information associated with the plurality of instances in time, so as to generate a second series of target indicia associated with each of the plurality of instances in time; and
    the display displays the first series of reference indicia and the second series of target indicia.

4. The system of claim 1, wherein the position of the target sensor inside the patient's upper body is the stomach.

5. The system of claim 1, further comprising a swallowable intragastric device, wherein the target sensor is a component of the swallowable intragastric device.

6. The system of claim 5, wherein, when the target sensor is swallowed, the target sensor position information is associated with the locations of the target sensor at each of the plurality of instances in time.

7. The system of claim 5, wherein an inflatable intragastric balloon and an inflation catheter are additional components of the swallowable intragastric device.

8. The system of claim 5, wherein an inflation catheter is an additional component of the swallowable intragastric device, wherein a distal end of the inflation catheter is the target sensor.

9. The system of claim 5, wherein an intragastric balloon is an additional component of the swallowable intragastric device.

10. The system of claim 9, wherein the intragastric balloon comprises a polymeric wall comprising one or more layers, wherein the polymeric wall is configured to have, under in vivo conditions, a permeability to $CO_2$ of more than 10 cc/m²/day, and wherein the polymeric wall is configured such that, in vivo, the intragastric balloon is configured to gain in volume and in pressure during a useful life of at least 30 days of the intragastric balloon when filled with an initial fill gas; a valve system configured for introducing the initial fill gas into the intragastric balloon in vivo; and the initial fill gas consisting of one or more inert gasses selected from the group consisting of nitrogen, $SF_6$, $C_2F_6$, $C_3F_8$, $C_4Fio$, $C_4F_8$, $C_4F_8$, $C_3F_6$, $CF_4$, and $C(ClF_2)$—$CF_3$.

11. The system of claim 1, further comprising replay viewer software, wherein the software, when executed, replays data obtained during a balloon administration.

12. The system of claim 1, wherein color of the 2D or 3D capsule changes upon arrival in the stomach of the patient.

13. A system for electromagnetically locating an intragastric device in three dimensional space, in real time, the system comprising:
- an electromagnetic field generator configured to generate an electromagnetic field;
- a removably attachable inductive reference sensor adapted to be removably attached to a patient's upper body positioned within the electromagnetic field, whereby a reference sensor signal is generated and the reference sensor signal carries reference sensor position information associated with a position of the reference sensor within the electromagnetic field at an instance in time, wherein the reference sensor is at least a 5 degrees of freedom sensor;
- a swallowable target sensor adapted to be positioned within the electromagnetic field, whereby a target sensor signal is generated and the target sensor signal carries target sensor position information associated with a position of the target sensor within the electromagnetic field at the instance in time, wherein the target sensor is at least a 5 degrees of freedom sensor;
- a processor adapted to be in electronic communication with the reference sensor and the target sensor, so as to receive the reference sensor signal and the target sensor signal; wherein
  - the processor processes the reference sensor signal so as to create one or more reference indicia associated with the position of the reference sensor at the instance in time;
  - the processor processes the target sensor signal so as to create one or more target indicia associated with the position of the target sensor at the instance in time; and
  - the processor processes data received from the target sensor, the reference sensor and the electromagnetic field generator to generate a 3D body model that mirrors the patient's upper body to correct for relative movement of the patient's upper body, and to determine a location and orientation of the target sensor with respect to the patient's upper body; and
- a display adapted to be in electronic communication with the processor and configured to display the one or more reference indicia and the one or more target indicia and the generated 3D body model, and to provide a visual approximation of the target sensor's location within or outside of the patient's upper body, wherein the system is calibrated while the target sensor is outside of the patient's upper body, wherein the one or more reference indicia comprise a reference sensor icon and the one or more target indicia comprise a target sensor icon, and wherein the processor is further configured to cause the display to plot a path of the target sensor icon as a progressively growing trace on the display that corresponds to the path taken by the target sensor as the target sensor moves through the patient's upper body in real time, wherein the path taken by the target sensor inside the patient's upper body further comprises:
- movement to the left of lateral from an initial vertical trace portion; and
- acceleration left of lateral and rotation from a vertical configuration to a horizontal configuration.

14. The system of claim 13, wherein the instance in time comprises a plurality of instances in time.

15. The system of claim 13, further comprising a swallowable intragastric device, wherein the target sensor is a component of the swallowable intragastric device.

16. The system of claim 15, wherein, when the target sensor is swallowed, the target sensor position information is associated with the locations of the target sensor at each of the plurality of instances in time.

17. The system of claim 15, wherein an inflatable intragastric balloon and an inflation catheter are additional components of the swallowable intragastric device.

18. The system of claim 15, wherein an inflation catheter is an additional component of the swallowable intragastric device, wherein a distal end of the inflation catheter is the target sensor.

19. The system of claim 15, wherein an intragastric balloon is an additional component of the swallowable intragastric device.

20. The system of claim 19, wherein the intragastric balloon comprises a polymeric wall comprising one or more layers, wherein the polymeric wall is configured to have, under in vivo conditions, a permeability to $CO_2$ of more than 10 cc/m²/day, and wherein the polymeric wall is configured such that, in vivo, the intragastric balloon is configured to gain in volume and in pressure during a useful life of at least 30 days of the intragastric balloon when filled with an initial fill gas; a valve system configured for introducing the initial fill gas into the intragastric balloon in vivo; and the initial fill gas consisting of one or more inert gasses selected from the group consisting of nitrogen, $SF_6$, $C_2F_6$, $C_3F_8$, $C_4Fio$, $C_4F_8$, $C_4F_8$, $C_3F_6$, $CF_4$, and $C(ClF_2)$—$CF_3$.

* * * * *